(12) United States Patent (10) Patent No.: US 12,670,701 B1
Zhang et al. (45) Date of Patent: Jun. 30, 2026

(54) SYSTEMS AND METHODS FOR LABELING TRAINING DATA FOR INFORMATION EXTRACTION SYSTEMS

(71) Applicant: American International Group, Inc., New York, NY (US)

(72) Inventors: Lei Zhang, Rego Park, NY (US); Chuanni He, Chamblee, GA (US)

(73) Assignee: American International Group, Inc., New York, NY (US)

( * ) Notice: Subject to any disclaimer, the term of this patent is extended or adjusted under 35 U.S.C. 154(b) by 0 days.

(21) Appl. No.: 19/397,798

(22) Filed: Nov. 21, 2025

(51) Int. Cl.
  *G06V 10/774* (2022.01)
  *G06V 30/41* (2022.01)
(52) U.S. Cl.
  CPC .......... *G06V 10/7753* (2022.01); *G06V 30/41* (2022.01)
(58) Field of Classification Search
  None
  See application file for complete search history.

(56) References Cited

U.S. PATENT DOCUMENTS

2024/0160900 A1* 5/2024 Smith .................... G06N 3/047
2025/0111169 A1* 4/2025 Srinivasan .............. G06N 3/08

* cited by examiner

*Primary Examiner* — Andrew W Bee
*Assistant Examiner* — Christine Zhao
(74) *Attorney, Agent, or Firm* — Foley & Lardner LLP

(57) ABSTRACT

A system for extracting a number of data elements from one or more data sources. The system increases the size of training examples that can be used to test, score, and generate the extraction procedure by generating additional training examples. The additional training examples are generated by automatically labeling unlabeled examples and augmented the labeled training examples with the unlabeled examples for which a ground truth value has been estimated. The system queries a number of language models to extract the information from the unlabeled examples and uses an algorithm to estimate the ground truth value from the values estimated by the ensemble of language models. A flag is also generated indicating those unlabeled examples of particular difficulty which may have high uncertainty and require supplemental validation of the estimated ground truth value. The system can populate an ontological data store using the extraction procedure developed using the additional training examples.

20 Claims, 11 Drawing Sheets

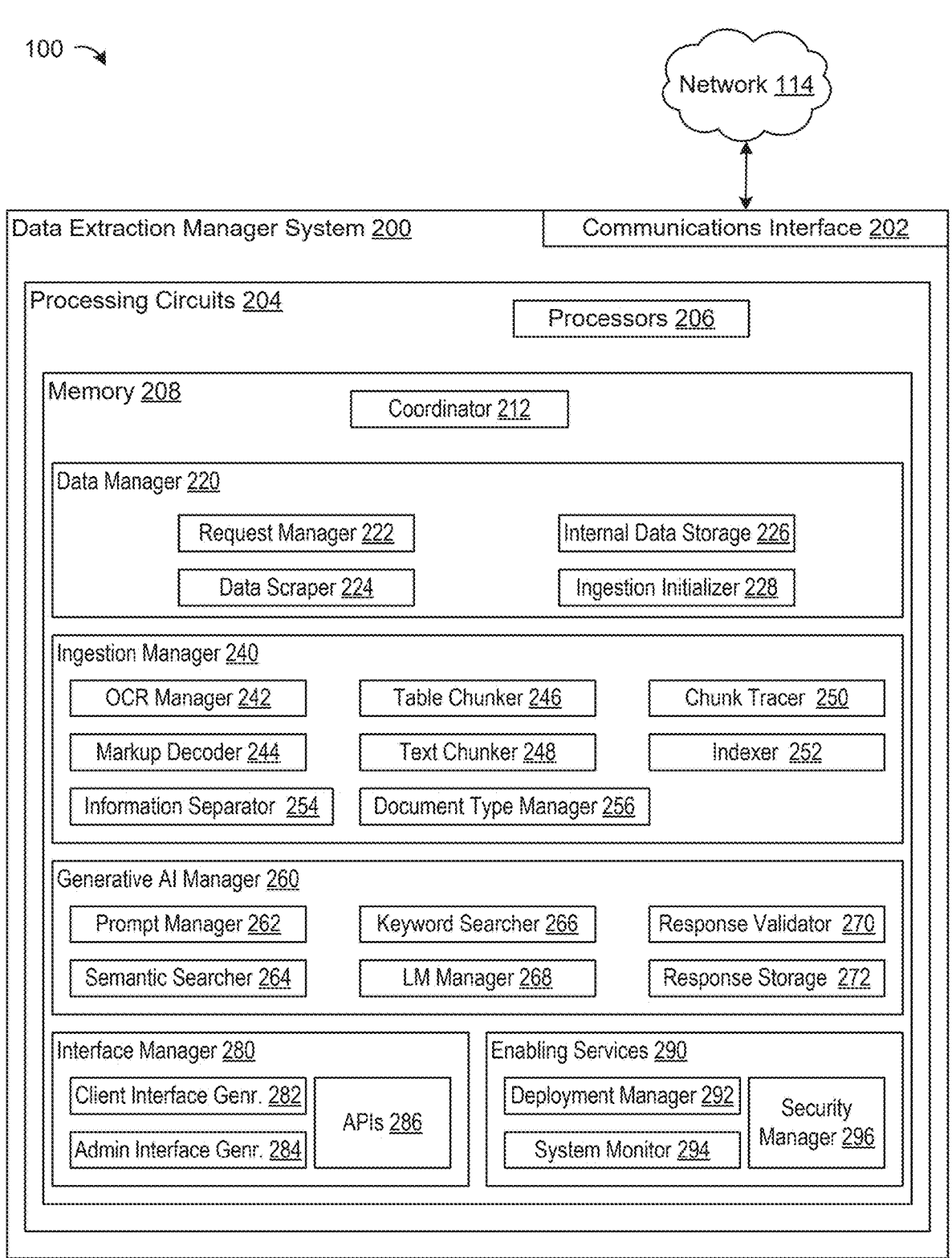

100

Network 114

Data Extraction Manager System 200    Communications Interface 202

Processing Circuits 204

Processors 206

Memory 208

Coordinator 212

Data Manager 220

Request Manager 222    Internal Data Storage 226

Data Scraper 224    Ingestion Initializer 228

Ingestion Manager 240

OCR Manager 242    Table Chunker 246    Chunk Tracer 250

Markup Decoder 244    Text Chunker 248    Indexer 252

Information Separator 254    Document Type Manager 256

Generative AI Manager 260

Prompt Manager 262    Keyword Searcher 266    Response Validator 270

Semantic Searcher 264    LM Manager 268    Response Storage 272

Interface Manager 280

Client Interface Genr. 282    APIs 286

Admin Interface Genr. 284

Enabling Services 290

Deployment Manager 292    Security Manager 296

System Monitor 294

FIG. 2

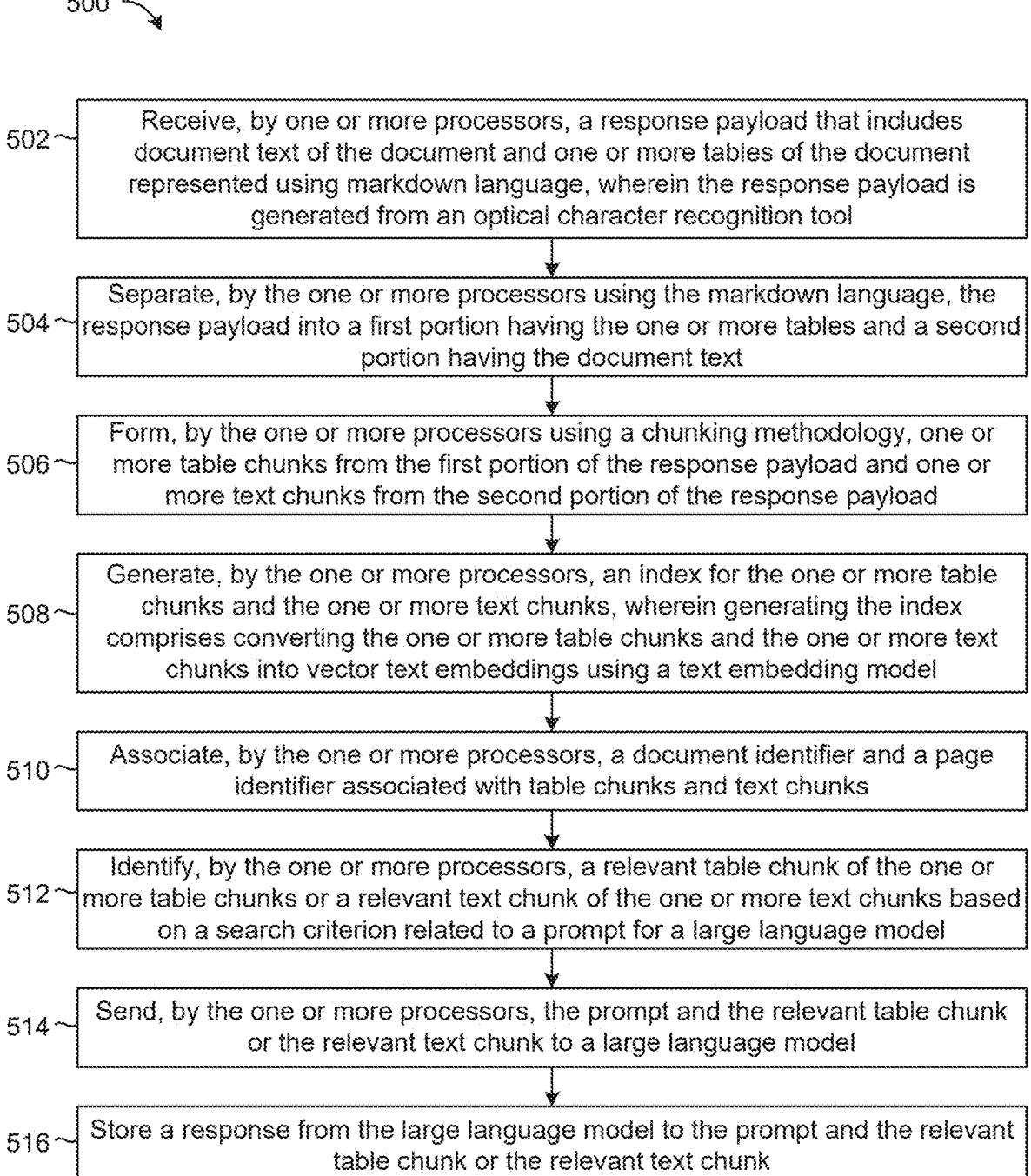

500

502 — Receive, by one or more processors, a response payload that includes document text of the document and one or more tables of the document represented using markdown language, wherein the response payload is generated from an optical character recognition tool 504 — Separate, by the one or more processors using the markdown language, the response payload into a first portion having the one or more tables and a second portion having the document text 506 — Form, by the one or more processors using a chunking methodology, one or more table chunks from the first portion of the response payload and one or more text chunks from the second portion of the response payload 508 — Generate, by the one or more processors, an index for the one or more table chunks and the one or more text chunks, wherein generating the index comprises converting the one or more table chunks and the one or more text chunks into vector text embeddings using a text embedding model 510 — Associate, by the one or more processors, a document identifier and a page identifier associated with table chunks and text chunks 512 — Identify, by the one or more processors, a relevant table chunk of the one or more table chunks or a relevant text chunk of the one or more text chunks based on a search criterion related to a prompt for a large language model 514 — Send, by the one or more processors, the prompt and the relevant table chunk or the relevant text chunk to a large language model 516 — Store a response from the large language model to the prompt and the relevant table chunk or the relevant text chunk

FIG. 4

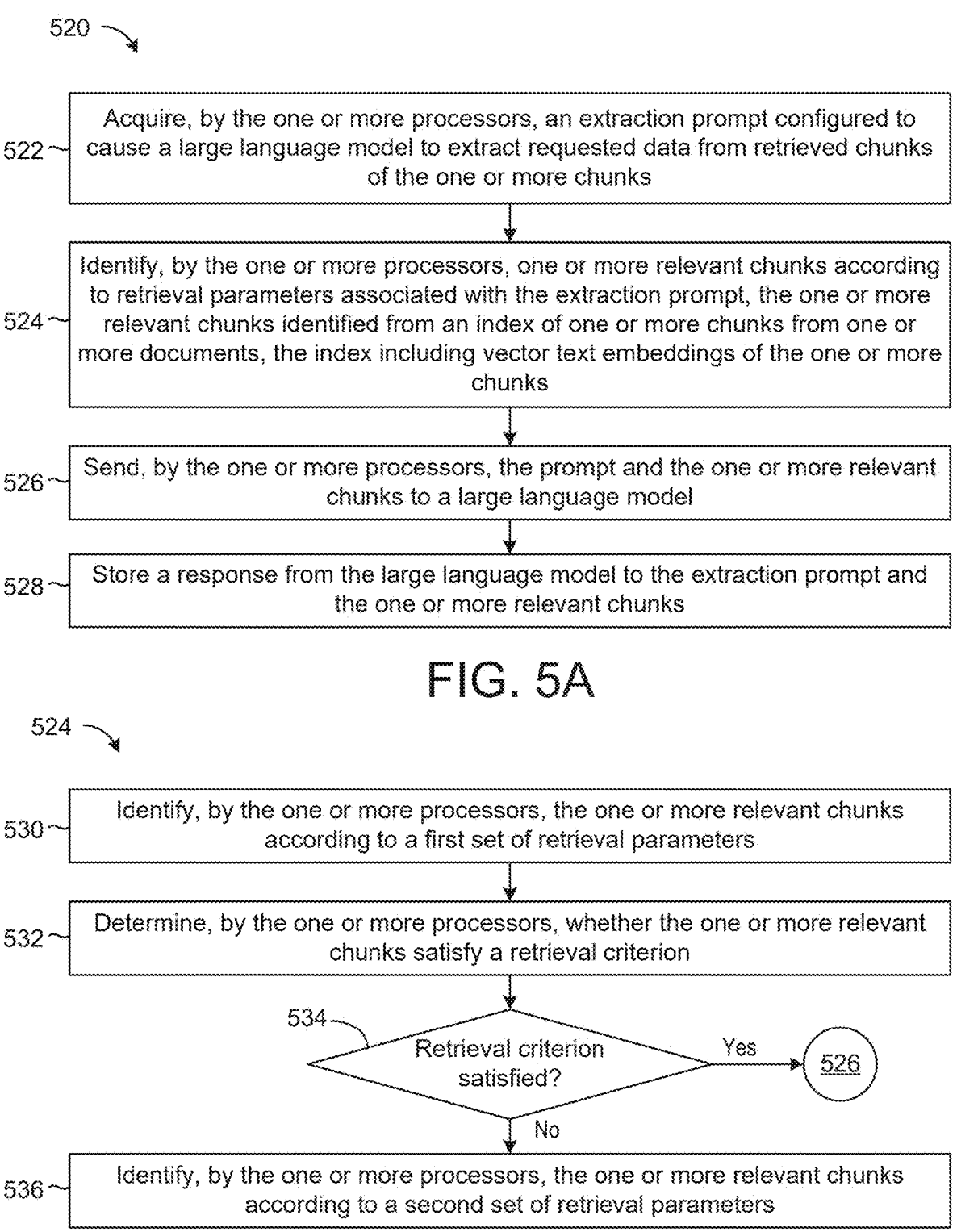

520

522 — Acquire, by the one or more processors, an extraction prompt configured to cause a large language model to extract requested data from retrieved chunks of the one or more chunks 524 — Identify, by the one or more processors, one or more relevant chunks according to retrieval parameters associated with the extraction prompt, the one or more relevant chunks identified from an index of one or more chunks from one or more documents, the index including vector text embeddings of the one or more chunks 526 — Send, by the one or more processors, the prompt and the one or more relevant chunks to a large language model 528 — Store a response from the large language model to the extraction prompt and the one or more relevant chunks

530 — Identify, by the one or more processors, the one or more relevant chunks according to a first set of retrieval parameters 532 — Determine, by the one or more processors, whether the one or more relevant chunks satisfy a retrieval criterion 534 — Retrieval criterion satisfied?          Yes → 526

No

536 — Identify, by the one or more processors, the one or more relevant chunks according to a second set of retrieval parameters

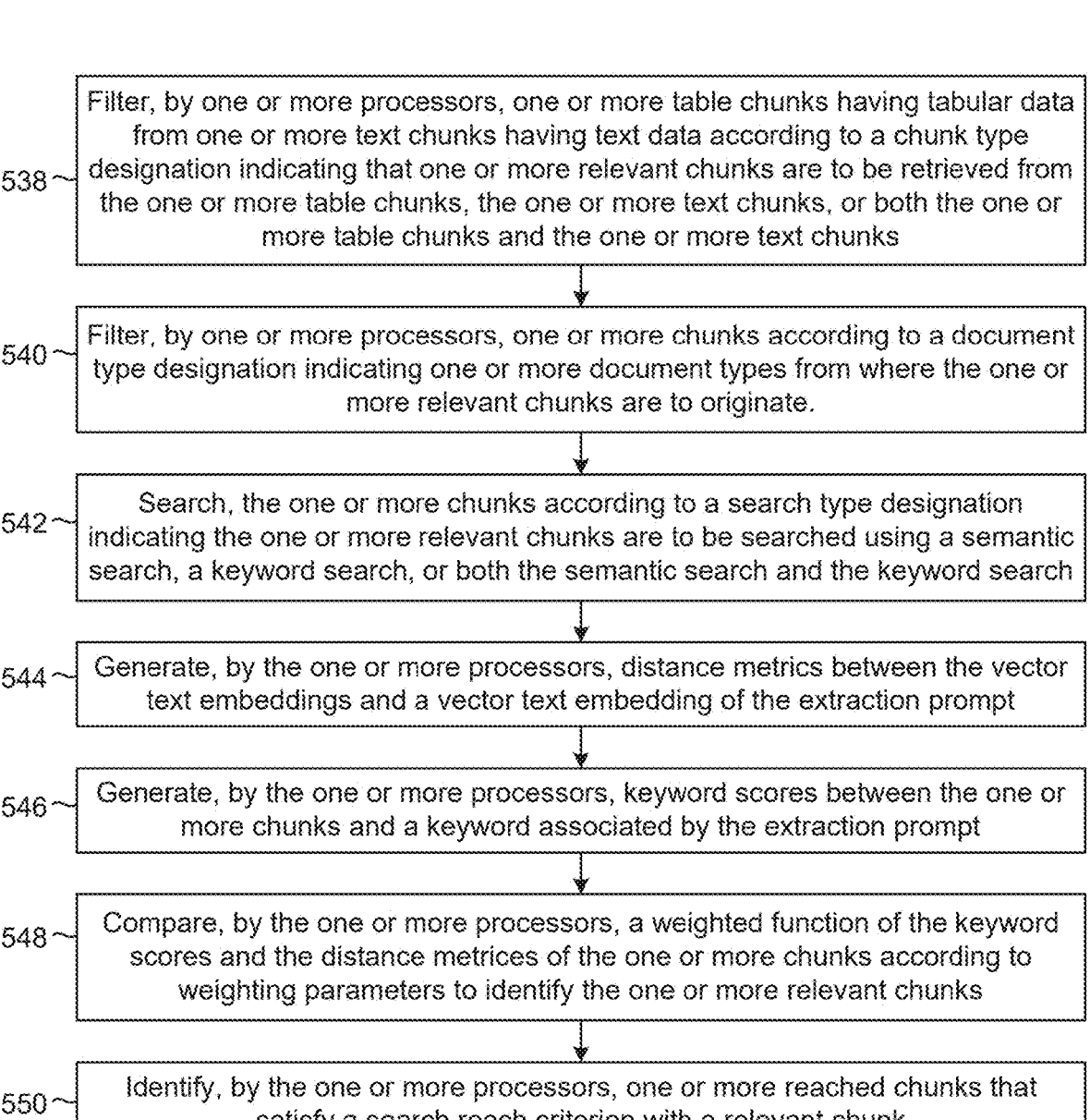

538 — Filter, by one or more processors, one or more table chunks having tabular data from one or more text chunks having text data according to a chunk type designation indicating that one or more relevant chunks are to be retrieved from the one or more table chunks, the one or more text chunks, or both the one or more table chunks and the one or more text chunks 540 — Filter, by one or more processors, one or more chunks according to a document type designation indicating one or more document types from where the one or more relevant chunks are to originate.

542 — Search, the one or more chunks according to a search type designation indicating the one or more relevant chunks are to be searched using a semantic search, a keyword search, or both the semantic search and the keyword search 544 — Generate, by the one or more processors, distance metrics between the vector text embeddings and a vector text embedding of the extraction prompt 546 — Generate, by the one or more processors, keyword scores between the one or more chunks and a keyword associated by the extraction prompt 548 — Compare, by the one or more processors, a weighted function of the keyword scores and the distance metrics of the one or more chunks according to weighting parameters to identify the one or more relevant chunks 550 — Identify, by the one or more processors, one or more reached chunks that satisfy a search reach criterion with a relevant chunk

FIG. 5C

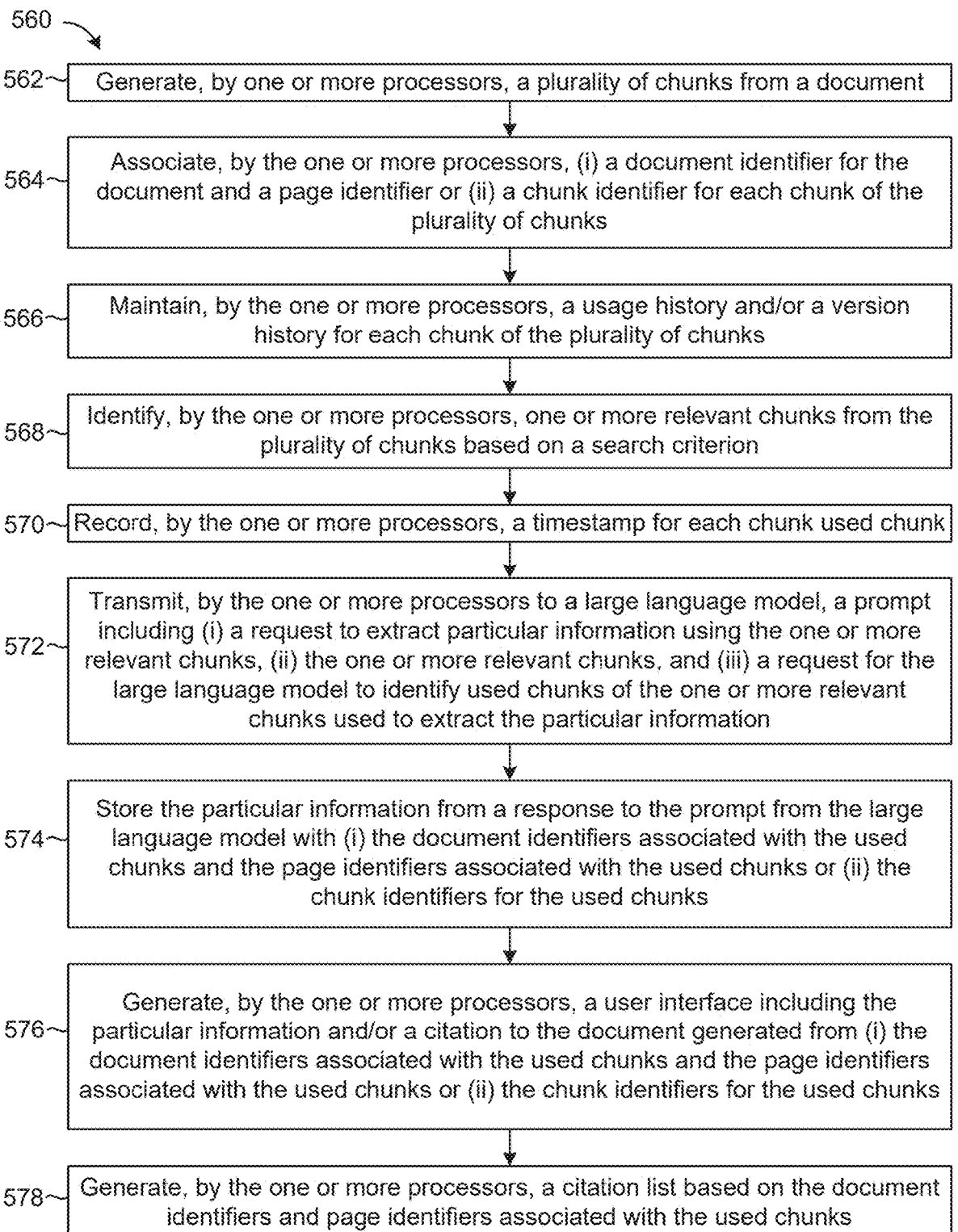

560

562~ Generate, by one or more processors, a plurality of chunks from a document

564~ Associate, by the one or more processors, (i) a document identifier for the document and a page identifier or (ii) a chunk identifier for each chunk of the plurality of chunks 566~ Maintain, by the one or more processors, a usage history and/or a version history for each chunk of the plurality of chunks 568~ Identify, by the one or more processors, one or more relevant chunks from the plurality of chunks based on a search criterion 570~ Record, by the one or more processors, a timestamp for each chunk used chunk 572~ Transmit, by the one or more processors to a large language model, a prompt including (i) a request to extract particular information using the one or more relevant chunks, (ii) the one or more relevant chunks, and (iii) a request for the large language model to identify used chunks of the one or more relevant chunks used to extract the particular information 574~ Store the particular information from a response to the prompt from the large language model with (i) the document identifiers associated with the used chunks and the page identifiers associated with the used chunks or (ii) the chunk identifiers for the used chunks 576~ Generate, by the one or more processors, a user interface including the particular information and/or a citation to the document generated from (i) the document identifiers associated with the used chunks and the page identifiers associated with the used chunks or (ii) the chunk identifiers for the used chunks 578~ Generate, by the one or more processors, a citation list based on the document identifiers and page identifiers associated with the used chunks

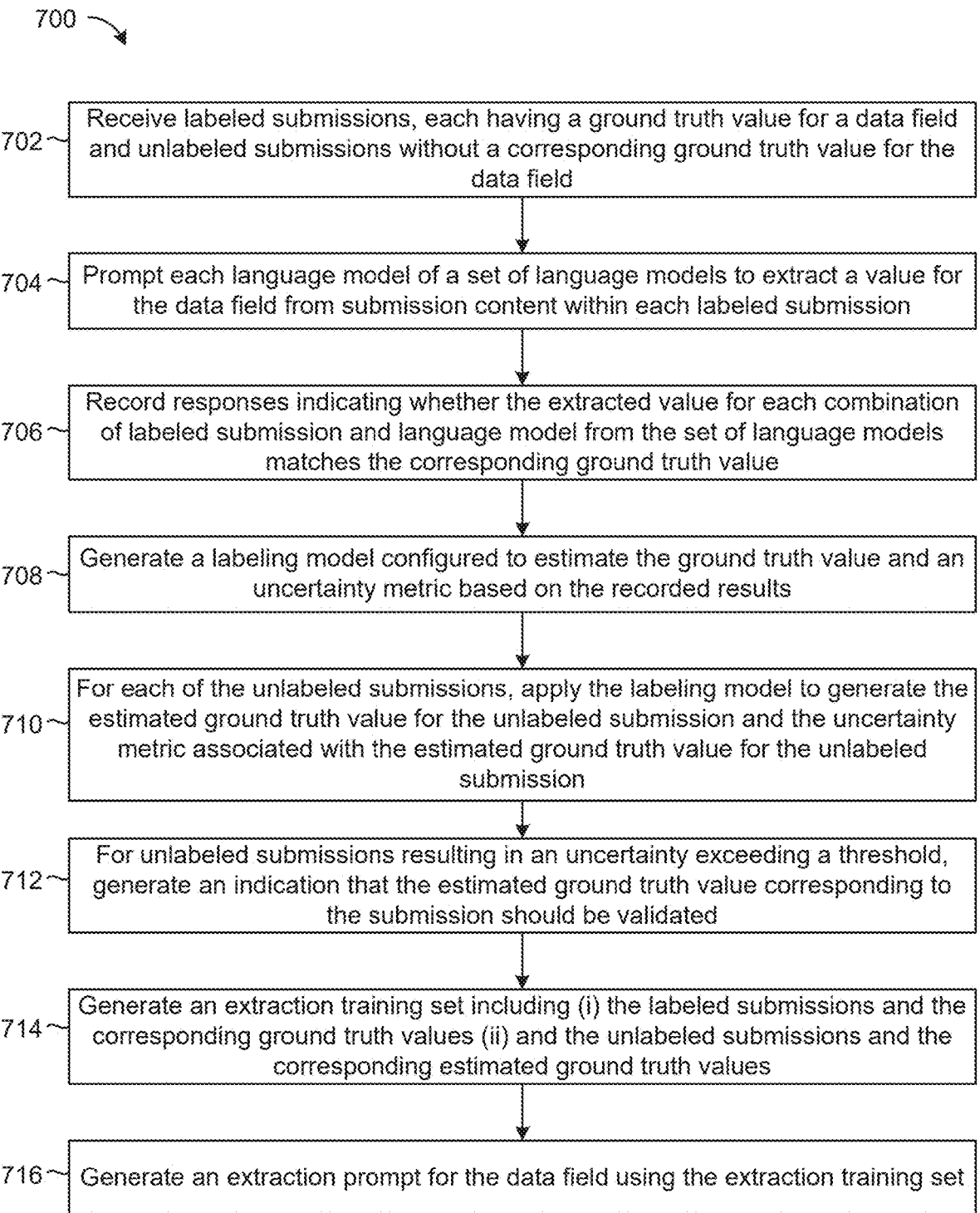

700

702　Receive labeled submissions, each having a ground truth value for a data field and unlabeled submissions without a corresponding ground truth value for the data field 704　Prompt each language model of a set of language models to extract a value for the data field from submission content within each labeled submission 706　Record responses indicating whether the extracted value for each combination of labeled submission and language model from the set of language models matches the corresponding ground truth value 708　Generate a labeling model configured to estimate the ground truth value and an uncertainty metric based on the recorded results 710　For each of the unlabeled submissions, apply the labeling model to generate the estimated ground truth value for the unlabeled submission and the uncertainty metric associated with the estimated ground truth value for the unlabeled submission 712　For unlabeled submissions resulting in an uncertainty exceeding a threshold, generate an indication that the estimated ground truth value corresponding to the submission should be validated 714　Generate an extraction training set including (i) the labeled submissions and the corresponding ground truth values (ii) and the unlabeled submissions and the corresponding estimated ground truth values 716　Generate an extraction prompt for the data field using the extraction training set

FIG. 10

SYSTEMS AND METHODS FOR LABELING TRAINING DATA FOR INFORMATION EXTRACTION SYSTEMS

FIELD

This disclosure generally relates to using language models to extract information.

BACKGROUND

Retrieval augmentation generation (RAG) is a technique by which a prompt for information is augmented with relevant content to provide additional context to a language model. RAG systems use embedding models to create an embedding vector that can serve as a key in an index of content that may be used to augment the prompt. A RAG system may search the index based on the prompt to retrieve relevant content. Relevant information may be stored in questionnaires or similar forms including multiple-choice questions, fill-in-the-blank questions, Likert scales, etc.

Multi-modal language models (MMLMs) are configured to process prompts related to multiple types of input, including additional text, images, audio, and other modalities. MMLMs can interpret both the content and the structural or visual cues that provide additional meaning and/or context. MMLMs can analyze text of a document alongside other visual elements, improving semantic understanding and thereby generating improved responses to prompts.

SUMMARY

An embodiment of the present disclosure relates to a method for labeling ground truth values for data fields within submission content. The method includes prompting, by one or more processors, a plurality of language models to extract a value for a data field from the submission content for a plurality of labeled submissions having a ground truth value for the data field. The method also includes generating, by the one or more processors, a data structure including an entry for each combination of a submission from the plurality of labeled submissions and a language model of the plurality of language models, the entry indicating whether the value for the data field extracted by the language model from the submission content of the submission matches the ground truth value corresponding to the data field for the submission. The method also includes determining, by the one or more processors, parameters for a labeling model configured to generate an estimated ground truth value and an uncertainty metric based for the data field on inputs including the value extracted by each of the plurality of language models. The method also includes generating, by the one or more processors, the estimated ground truth value and the uncertainty metric for an unlabeled submission by applying the labeling model to values for the data field extracted by each language model of the plurality of language models from the submission content for the unlabeled submission and responsive to the uncertainty metric for the unlabeled submission satisfying an uncertainty threshold, generating, by the one or more processors, an indication to validate the estimated ground truth value for the unlabeled submission. This summary is illustrative only and not intended to be limiting.

BRIEF DESCRIPTION OF THE DRAWINGS

The features and advantages of the present disclosure will become more apparent from the detailed description set forth below when taken in conjunction with the drawings, wherein like numerals represent like elements.

FIG. 2 is a schematic block diagram of a coordinating system managing operations of the system of FIG. 1, according to some embodiments.

FIG. 4 is a flow of operations for coordinating data extraction and population, according to some embodiments.

FIG. 5A is a flow of operations for coordinating data extraction and population using retrieval parameters associated with a prompt, according to some embodiments.

FIG. 5B is a flow of operations for retrieval augmentation using hierarchical retrieval parameters associated with a prompt, according to some embodiments.

FIG. 5C is a flow of operations for retrieval augmentation using multiple retrieval parameters associated with a prompt, according to some embodiments.

FIG. 6 is a flow of operations for providing traceability and citation of documents used in retrieval augmentation, according to some embodiments.

FIG. 10 is a flow of operations for labeling unlabeled submission and using the submission for training data in generating an extractor, according to some embodiments.

DETAILED DESCRIPTION

Figure 1:
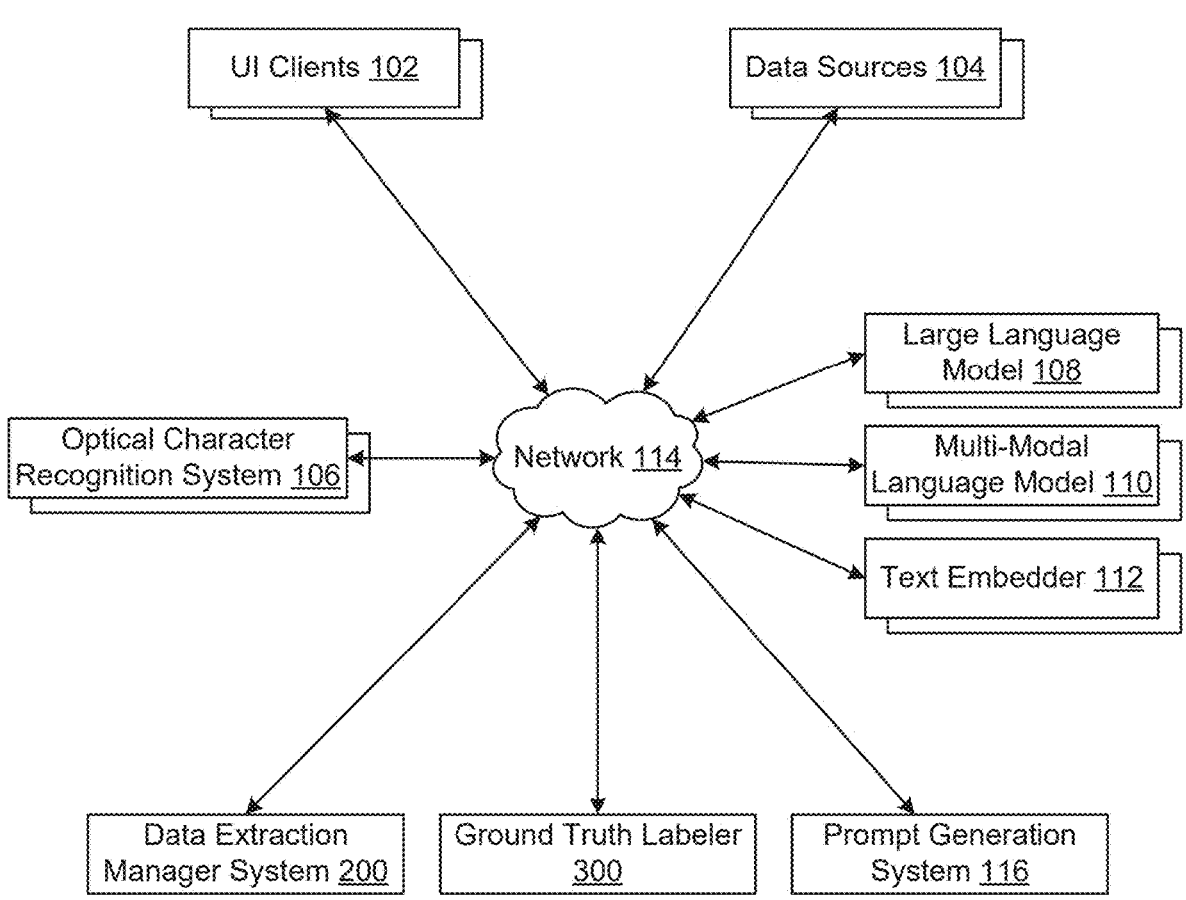
FIG. 1 is a schematic block diagram of a system for data extraction and population using large language models, according to some embodiments.

Different types of businesses often carefully curate and extract a large volume of documents. For example, a large set of insurance documents or accounting documents (in the form of images and/or PDFs) may be sent to an insurance broker or a tax preparer, who then has the task of identifying and extracting relevant information from the accounting documents. To provide more efficiency, businesses have tried to automate this workflow by incorporating template-based optical character recognition (OCR). Businesses have also used rigid, specific rule-based methods. For example, businesses often perform optical character recognition that uses the expected positioning of text on a document to both identify the document type and to further extract and annotate data from that document.

Template-based OCR often includes trained humans to create each template. A human with detailed knowledge of the OCR system and document variability must review every document to specifically create sets of rules detailing exactly how to extract data from each of the documents. Template-based OCR also usually requires trained humans to maintain each template. However, templates often degrade in performance as documents change. While some variability can be explicitly declared in the template, any unaccounted-for changes usually require humans to modify a template to account for the differences or to create a new template.

Language models may be used to extract information from unstructured text. For example, the name of a data field, a short description of the data field, and content from which a value of the data filed may be extracted can be provided to a language model along with a request to extract or determine the value for the data field using the submission content as context where the value may be found. In such situations the format of the information sent to the language model may directly affect the accuracy of the results. Determining a proper (or best) format for the content and the request can fall under the practice of prompt engineering. The artificial intelligence models offer greater adaptability than template-based methods, but their success often requires effective prompt engineering and the availability of quality training data that can be used to engineer the prompts. Without quality training examples representing a variety of real-world scenarios, even state-of-the-art models may yield suboptimal results in online applications.

Prompt engineering requires a large, robust, and diverse set of examples (e.g., submissions) that can be used to test and/or score the performance of any extraction process. Without diverse data an extraction procedure may perform well on the training data, but fail on the live system when data is in a different form that the data that was provided during training. Further, to test or score the performance of the extraction procedure, the training examples itself must be labeled, that is the actual value (e.g., the ground truth value) for each data field for which the training example will be used to test or score performance. Labeling the data by reading through all the submission documents and finding the value for the data field manually takes considerable effort, may be error prone, and represents a barrier to the adoption of language model-powered extraction systems.

The present disclosure improves upon current systems for language model based extraction systems by reducing data required to develop information extraction procedures. For example, the system described herein may use a small number of labeled training submissions and generate additional training examples that can be used along with the labeled training submissions having diversity representative of real-world submissions that will be received for later extraction. For example, the additional training examples may be of actual submissions that were not labeled. The combined training samples can be used to improve (e.g., tune, update, enhance, etc.) any portion of the extraction procedure including portions of content retrieval used to find relevant documents to provide to the language model (e.g., keywords for search, ranking for relevance, etc.) and the instructions within the extraction prompt that is sent with the relevant documents or portion thereof.

The systems and methods described herein use unlabeled examples and an ensemble of extraction variants (e.g., different prompts, different language models, etc.) to label the unlabeled examples. The unlabeled examples with the generated (e.g., estimated labels) make up the additional training examples used to test or score performance, thereby allowing prompt engineering to be performed using unlabeled examples as well as the labeled examples. Advantageously, the prompts provided to the ensemble of different language models need not be refined; it is possible to rely on redundancy provided by multiple language models and/or prompts to label the unlabeled samples. The labeled ground truth values can then be used to develop an efficient (e.g., fewer tokens, etc.) and an accurate extraction procedure (e.g., retrieval keywords and prompts) for a single language model resulting in improved computational efficiency during online extraction.

Moreover, the present disclosure provides a system for identifying unlabeled submissions that that were difficult to label and may require secondary or supplemental validation. The systems and methods described generate an uncertainty metric for the unlabeled submissions. Submissions for which the uncertainty is high (e.g., greater than a particular threshold) are subjected to the supplemental validation. Supplemental validation may include providing the unlabeled submissions to additional language models or using alternate prompts in order to generate a greater consensus among the ensemble. Supplemental validation may additionally or alternatively include providing unlabeled submissions with high uncertainty to a human validator. Advantageously, the validator can focus their time on submission for which the ensemble cannot generate a consensus. Even when human-based supplemental validation is recommended, the language models can supply the validator with excerpts from the submission content for that may be relevant, significantly reducing the validation time.

System Overview

FIG. 1 shows a data extraction and population system 100 configured to leverage a language models (LM), for example, one or more large language models (LLMs) 108, one or more multi-modal language models (MMLMs) 110, etc. to extract data from documents and populate data elements (e.g., of a data model, ontological data store, etc.) according to some embodiments. The data extraction and population system 100 is shown to include one or more UI clients 102, one or more data sources 104, an OCR system 106, one or more LLMs 108, one or more MMLMs 110, one or more text embedders 112, a prompt generation system 116, a data extraction manager system 200, and a ground truth labeler 300 communicably connected via a network 114. FIG. 1 shows a non-limiting example of a possible configuration of the data extraction and population system 100. It is contemplated that the various components of the data extraction and population system 100 may be distributed across discrete systems and/or hardware in different ways. For example, a large language model 108 and a text embedder 112 may be configured within the same hardware or same node in a computer cluster or the data extraction manager system 200 may be distributed across multiple elements of computer hardware.

In some embodiments, the general operation of the data extraction and population system 100 is to extract data from documents and populate various data elements, according to some embodiments. The data extraction manager system 200 may gather documents from the one or more data sources 104 and generate a searchable index of documents or portions thereof from the one or more data sources 104 using the text embedder 112. The index generation may be based on the semantic meaning of the documents from the one or more data sources 104, allowing comparison between the entries of the index and a prompt for data (e.g., the prompt also embedded by the text embedder 112). To populate the data elements, the data extraction manager system 200 may generate prompts for the data, identify relevant portions of the documents by searching the index, and provide both the prompt and the relevant portions of the documents to an LM (e.g., the one or more LLMs 108 and/or the one or more MMLMs 110). The LM may then process the prompt with the provided portions of the document to extract (e.g., identify, parse, summarize, combine, generate, etc.) the data requested by the prompt so that the data extraction manager system 200 can store the data (e.g., in an object, a data model, ontological model, an ontological data store, etc.).

In some embodiments, the index is created (e.g., documents from the one or more data sources 104 are ingested) using the OCR system 106 and the text embedder 112. These documents, however, may have significant information included within the context of the text. For example, information may be included in the text layout, the relationship between the text and figures, markings, or other visual data, tabular data, etc. After retrieval, the data extraction and population system 100 may be configured to prompt a MMLM of the one or more MMLMs 110 with the document or portion thereof that was determined to include relevant text. In some embodiments, the data extraction and population system 100 stores an indication (e.g., flag, etc.) with the text used to generate the index that indicates if the text is to be processed by an LLM of the one or more LLMs 108 or by an MMLM. Indicating certain text to be processed by the one or more MMLMs 110 or the one or more LLMs 108 provides additional efficiency for the hybrid RAG approach by using the more computationally expensive MMLM only when required.

In some embodiments, the data extraction and population system 100 gathers large amounts of data from the one or more data sources 104. The one or more data sources 104 may be internal (e.g., on the company intranet) or external (e.g., stored on another company's web server). The one or more data sources 104 may include dedicated databases for particular types of data or webpages from which documents may be compiled, scraped, etc. The one or more data sources 104 may include documents (e.g., files, records, reports, articles, forms, data, etc.). The documents in the database may contain text, tables, columns, rows, charts, graphics, images, and/or other content. The documents may include PDF files or other image-based files for which the text of the document is not readily available for searching, copying, etc. Such image-based files may be processed by the OCR system 106 prior to processing by other components of the data extraction and population system 100. The documents may include a variety of content such as, for example, in the insurance industry, applications, broker correspondence, financials, summary of claims, historical claims filed under business insurance policies ("Loss Run"), questionnaires, forms, applications, and historical claim losses.

The one or more data sources 104 may include image-based documents. Image-based documents may include text, tables, columns, rows, charts, graphics, images, and/or other content. The content of an image-based document may include location information. The location information may relate to a layout indicating the visual appearance of the document and the respective content. For example, image-based documents may include document images (e.g., photographs of documents, scans of documents, bitmap images, portable network graphics, screenshots, etc.), digital documents that include visual content (e.g., PDFs, word-processing documents, webpages, tables, spreadsheets, etc.), and/or digital documents that are entirely or mostly text but include layouts that convey information (e.g., multi-column formatted documents, technical manuals, resumes, profiles, legal documents, contracts, computer, agendas, transcripts, poems, multiple choice questionnaires, etc.). In some embodiments, the documents are processed a portion at a time (e.g., a paragraph, a column, a page, etc.)

In some embodiments, the one or more data sources 104 may include documents that have been filled in (e.g., completed, etc.) by a person digitally or by hand. For example, the one or more data sources 104 may include surveys, applications, forms, questionnaires, registrations, and other types of documents. The documents may include a request for information and a location for a response. The documents may include a request for information along with a list of predefined and/or selectable answers. The document may include one or more multiple choice questions. For example, the document may include questions with selectable answers on the Likert scale, true/false questions, selectable numerical ranges. In some embodiments, the document includes a predefined space (e.g., location, area, etc.) within which the respondent is to enter a response.

A respondent may be sent the document (with requests for information) from the one or more data sources 104. The document may be sent via a postal service, electronic mail, a website, a facsimile machine, etc. The respondent may supply answers to the requests for information in the document electronically and/or in writing. Responses may be provided by entering a response in the predefined space (e.g., digitally or handwritten). In some embodiments, requests with selectable answers (e.g., multiple choice questions) may include responses for which the respondent has marked (e.g., digitally or by hand) the response to the request. For example, the respondent may add a mark proximate the selected response, encircle the selected response, fill in a bubble (e.g., any closed shape such as oval, square, etc.) near the selected response, etc.

In some embodiments, the one or more data sources 104 are configured to receive from the respondents completed (e.g., the response has been provided) documents. For example, the one or more data sources 104 may include an automated email system that, when an email is received, the email is automatically processed by the data extraction manager system 200. Additionally or alternatively, one or more data sources 104 may include an API to which the respondent can upload a scan, an image, and/or a file of completed documents. In some embodiments, the one or more data sources 104 may notify (e.g., inform, communicate, update, etc.) the data extraction manager system 200 that a new document has been received. For example, the data extraction manager system 200 may subscribe to notifications from the one or more data sources 104. Additionally or alternatively, the data extraction manager system 200 may periodically poll the one or more data sources 104 to determine if new documents have been received.

The OCR system 106 may be configured to convert the contents of the document to plain text. The OCR system 106 may include, for example, any commercially available OCR system. Additionally or alternatively, the OCR system 106 may be a component of the data extraction manager system 200 (e.g., using available OCR software). The system may use this type of private OCR system 106 for increased security. The text extraction tool may convert an image-based document (e.g., PDF file, PostScript, tagged image file format (TIFF), etc.) plain text that can be processed by a computer (e.g., the American Standard code for Information Interchange (ASCII)). In some embodiments, the plain text is stored in a plain text file format for later processing. For example, the plain text may be stored in plain text file formats such as TXT or markup languages such as hypertext markup language (HTML), JavaScript Object Notation (JSON), extensible markup language (XML), tau epsilon chi (TeX), etc. (e.g., into a text format (e.g., JSON). JSON is a text format that is completely language independent, but uses conventions that are familiar to programmers. JSON may also be better than OCR because JSON retains positional relationships in the text (positional encoding).

The documents processed by the OCR system 106 may include non-text-based information (e.g., charts, graphs, trend lines, flow charts, or other graphical elements) and/or special text structures (e.g., tables, rows, columns, etc.). This information may be recognized by the OCR system 106 as different from the text of the body of the document and may indicate the presence of special structures (e.g., non-text-based information and/or special text structures) in the output.

The OCR system 106 may return output in the JSON text format. The output may include an object for any special structures in the document with a key-value pair for the location of the special structure within the original document. The key-value pair for the location may include, for example, the X-Y position of each of the four corners for each of the tables in the document or the X-Y position of each cell in the tables, or the key-value pair for the location may include the two X limits of the table and the two Y limits of the table. Each PDF analyzed by a text extraction tool may have the same orientation and coordinates. The X-Y positions may describe a table, row structure, column structure, and/or cell structure.

In some embodiments, the OCR system 106 returns an output with tables inline with the text using a markdown language. The system may use the same markdown symbols to indicate different locations or different markdown symbols to indicate different locations. For example, the first appearance of the markdown symbol indicates the start (or top) of a table and a second appearance of the same markdown symbol indicates the end (or bottom) of the table. The markdown symbols may also indicate a first (e.g., left) side of the table and a second (e.g., right) side of the table. Markdown symbols (e.g., within text) may provide characteristics of the table. The markdown system may provide information to the system, so the system may render the table. For example, the vertical bar or pipe character, '|', may be used to mark the start of a new column within a row of the table, and the vertical bar followed by a newline character (e.g., '|/n') may be used to represent a new row. The markdown language may also use hyphen characters, '-', to separate a header row from a content row within a table. When analyzing the position of each cell, the system may consider each cell as having a single row of text, regardless of the number of lines of text in each cell. For more information about markdown symbols, see www-.markdownguide.org/extended-syntax/.

In some embodiments, the OCR system 106 returns an output in a first format, and the data extraction manager system 200 may convert the text into a second format (e.g., a common format) prior to processing by other components of the data extraction and population system 100. For example, the data extraction manager system 200 may convert the JSON output (e.g., with location data) to markdown language that includes markdown symbols. The JSON web language may be translated to markdown text indicating one or more boundaries of the table. Modularity is provided by converting to a common text format (e.g., the markdown language) allowing the data extraction and population system 100 to substitute other various OCR systems 106 if there is a cost advantage, computational advantage, or an improvement by one provider of OCR technology.

In some embodiments, the OCR system 106 is configured to recognize a layout of a document being processed (e.g., ingested, etc.). For example, the document may have more than one column and/or switch between different layout types (e.g., one column to two columns). Recognizing the layout of the document may allow the OCR system 106 to recognize characters and convert them to text in reading order. The OCR system 106 may maintain the semantic content included in word ordering by recognizing the layouts and adjusting appropriately. The OCR system 106 may be configured to recognize figures. The OCR system 106 may not extract any text from figures. For example, text from within a figure may not share semantic meaning with nearby text. Retrieval could be compromised because the text from the figure may be incorrectly included in determining a vector embedding for the text. Additionally or alternatively, the text from figures may be included. In some embodiments, the data extraction manager system 200 can select if text from figures should or should not be included in the output from the OCR system 106. For example, the data extraction manager system 200 may determine if text from figures is to be included in the output from the OCR system 106 based on document type and/or downstream processing selections (e.g., if the document will be processed by an MMLM).

In some embodiments, the OCR system 106 is able to distinguish the difference between handwriting (e.g., handwritten characters) and typeset (e.g., printed characters). The OCR system 106 may output the handwritten characters and the typeset (e.g., from a computer or scan from a printed document) in format that allows the data extraction manager system 200 to have knowledge of what information was typeset and what information was handwritten. For example, the OCR system 106 may include multiple outputs, use markup, and/or generate an output using any other suitable method for providing information to the data extraction manager system 200 related to which text was typeset and which text was converted from handwritten characters.

The OCR system 106 may be configured to recognize whether the document would benefit from being processed by the one or more MMLMs 110. For example, the OCR system 106 may detect figures, tables, annotations, and/or other content that may benefit from image-based (e.g., visual, etc.) processing. The OCR system 106 may communicate the existence of such content to the data extraction manager system 200 so that the data extraction manager system 200 can determine whether the document is to be processed by the one or more MMLMs 110 (e.g., based on a criterion) or the OCR system 106 may indicate to the data extraction manager system 200 that the document would benefit from processing by the one or more MMLMs 110 directly. In some embodiments, the OCR system 106 or data therefrom is used to determine if the one or more MMLMs 110 are to be used during ingestion (e.g., index generation, vector embedding) and/or if the one or more MMLMs 110 are to perform data extraction (e.g., after an appropriate document or portion thereof is retrieved).

In some embodiments, the data extraction manager system 200 is configured to perform some or all of the features of the OCR system 106. The data extraction manager system 200 may be configured to recognize the layout of the document, to recognize figures, and/or to recognize handwritten characters as described previously. The data extraction manager system 200 may communicate the layout, the location of the figures or handwritten characters, etc. to the OCR system 106 to facilitate more efficient character recognition (e.g., text generation, conversion, text extraction, etc.). For example, the OCR system 106 may be configured to translate only certain areas of a document or page, thus allowing the data extraction manager system 200 to provide certain layout information to the OCR system 106.

The data extraction manager system 200 may be configured to coordinate the operations of the data extraction and population system 100. For example, the data extraction manager system 200 may initiate (e.g., at the request of a user of the one or more UI clients 102) document gathering from the one or more data sources 104. The data extraction manager system 200 may communicate (e.g., send, deliver, transmit, etc.) the PDFs or other image-based documents to the OCR system 106 for conversion to plain text. The data extraction manager system 200 may separate the document text from the tabular information before chunking (e.g., splitting text into word lengths that are suitable for retrieval augmentation of, for example, 500 words, 1000 words, 1000 characters, etc.). The data extraction manager system 200 may communicate the chunks (both tabular chunks and text chunks) to the text embedder 112 to build an index for semantic search.

Upon receiving a request from a user of the one or more UI clients 102, the data extraction manager system 200 may generate several prompts for data extraction (e.g., identification, summarization, generation, etc.) for processing by LMs (e.g., one or more LLMs 108 and/or one or more MMLM 110). In some embodiments, the data extraction manager system 200 is configured to embed each prompt (e.g., using the text embedder 112 or similar embedding model) and compare the prompt vector embedding to that of the index to identify and retrieve potentially related or relevant chunks (e.g., portions of the documents). The prompts, along with the identified relevant chunks, may be communicated to the LMs by the data extraction manager system 200. In some embodiments, the data extraction manager system 200 is also configured to store the results of a prompt from the LMs. Thereby, the data extraction manager system 200 manages the population of the particular data elements by retrieving both structured and unstructured data, text, tables, etc. from various sources across the local intranet or the internet.

The data extraction manager system 200 may also generate user interfaces for the data extraction and population system 100. For example, the data extraction manager system 200 may communicate instructions (e.g., JavaScript, Cascading Style Sheets, etc.) to generate a user interface to the one or more UI clients 102. The user interface may provide interactive capability with the systems of the data extraction and population system 100. For example, the user interface may provide the ability to initiate data population, configure the data to populate or extract, view results, trace errors, view source material, and/or other interactions that may be appropriate for a particular use case.

In some embodiments, the data extraction and population system 100 includes a prompt generation system 116. The prompt generation system 116 may be configured to generate an extraction prompt or instructions therefor used by the data extraction manager system 200. The prompt generation system 116 may generate a score for a particular version of an extraction prompt. The extraction prompt may be related to the accuracy of the information extracted using the extraction prompt over a number of training submissions (e.g., submissions for which a ground truth value for the extracted data field is known). For example, the score may be calculated by determining the ratio of the training submissions for which the value extracted for the data field using the extraction prompt matches the corresponding ground truth value for the training submission to the total number of training submissions. Other scores may be alternatively or additionally used, including, for example, a distance from a target accuracy, a continuous function of the accuracy, or other suitable metric that improves as the extraction prompt performs better against the training examples.

In some embodiments, the prompt generation system 116 generates a user interface (e.g., on a local or remote device such as a remote computer, a monitor, etc.). For example, the prompt generation system 116 may generate a user interface by transmitting instructions (e.g., JavaScript, Cascading Style Sheets, etc.) to the remote device. The instructions, when executed by the remote device, are configured to cause the remote device to generate the user interface. The user interface may include a view or user interface element that provides the accuracy or other score for the performance of the extraction prompt against the training submissions. The user interface may also include a view or user interface element providing a user the ability to edit the extraction prompt or instructions therefor. The user can use the prompt generation system 116 to add extraction instructions or otherwise edit the extraction prompt and execute the extraction prompt against the training submissions. For example, the user may interact (e.g., click) with a button or other interface element that causes the prompt generation system 116 to transmit the extraction prompt and the related submission content to a language model (e.g., of the one or more LLMs 108 or the one or more MMLMs 110) for extraction. When complete the prompt generation system 116 can update the user interface with the new score (e.g., accuracy). The prompt generation system 116 thereby provides a user with an interface to edit and improve an extraction prompt according to the performance against a number of training submissions.

In some embodiments, the prompt generation system 116 is configured to automatically generate an extraction prompt using the training submissions. For example, the prompt generation system 116 may use a number of pairs of the training submissions and the corresponding ground truth value to prompt a language model with a request to generate instructions that would cause the language model to extract the ground truth value from the training submissions. Additionally or alternatively, the prompt generation system 116 may update existing instructions (e.g., generated as previously described or manually generated or coded) using the training submissions. For example, the prompt generation system 116 may provide the current instructions in the extraction prompt with pairs of the training submissions and the corresponding ground truth value (or pairs of the training submissions for which extraction failed with the current instructions) along with a request to generate additional instructions to improve the accuracy of the instructions. In some embodiments, the prompt generation system 116 uses the systems and/or methods described for generating extractors (e.g., keywords for retrieval, a ranking prompt to order the relevance of retrieved chunks, and/or an extraction prompt) described in U.S. patent application Ser. No. 19/376,796 filed on Oct. 31, 2025, the entire contents of which are herein incorporated by reference.

In some embodiments, the prompt generation system 116 determines a score indicating a fraction of training submissions which the extraction prompt causes an extraction language model to accurately extract the value from the submission content matching the ground truth value corresponding to the submission of the extraction training set. The further the extraction prompt can then be adjusted to improve the score (e.g., manually via the user interface and or automatically as described above).

In some embodiments, the data extraction and population system 100 includes a ground truth labeler 300 configured to label previously unlabeled training submissions (e.g., training submissions for which the ground truth value is not included or otherwise unknown). The ground truth labeler 300 may be used to expand a training data set for improving extraction prompts, etc. For example, the ground truth labeler 300 can receive a smaller set of labeled training data, generate a labeling model to label the previously unlabeled training submissions, and combine the smaller set of labeled training data with the previously unlabeled training submissions that have been labeled using the labeling model. The larger combined set may be provided to the prompt generation system 116 for generation, improvement, and/or adjustments to the extraction prompt. Thereby, the ground truth labeler 300 may be configured to provide a large and/or robust labeled training set from a smaller or minimally sized labeled training set and unlabeled examples of submissions. Advantageously, the ground truth labeler 300 reduces the time required to generate a training set including human-based labeling and/or increases extraction accuracy by provided more examples.

In some embodiments, the ground truth labeler 300 is configured to generate a labeling model to estimate the ground truth value for the unlabeled submissions. The labeling model may be trained using the labeled training submissions. For example, the ground truth labeler 300 may request a number of language models (e.g., of the one or more LLMs 108 or the one or more MMLMs 110) to extract a value for a data field and use the extracted values as inputs to the labeling model. In some embodiments, the labeling model uses weighted voting to determine the estimated ground truth value. The weights of the voting may be adjusted during training of the labeling model according to the language models that more often extract the correct value for the data field. The same weights need not be used for each data field; for example, certain language models may be better at (e.g., provide more accuracy) in extracting one data field than another. The language models used by the ground truth labeler may or may not include the language mode used to perform extraction in the online system (e.g., by the data extraction manager system 200). Similarly, the prompts used ground truth labeler may be the current extraction prompt used by the data extraction manager system 200 or alternative prompts (e.g., simpler and/or configured particularly for the language model the prompt is sent to).

In some embodiments, the ground truth labeler 300 also generates an uncertainty metric (e.g., confidence metric, implausibility metric, confidence score, etc.) indicative of how confident the ground truth labeler 300 is in the estimated ground truth value for an unlabeled training submission. For example, the uncertainty metric may be related to the number of language models that extract the same ground truth value for the data field (e.g., all language models extracting different values represents high uncertainty or low confidence in the estimated ground truth value, whereas all language models extracting the same value represents low uncertainty or high confidence). For submissions that result in a high uncertainty (e.g., low confidence) the ground truth labeler 300 may request alternative validation of the estimated ground truth value. For example, the ground truth labeler 300 may request extraction by additional language models, the ground truth labeler 300 may request extraction using alternative prompts, or the ground truth labeler 300 may request human-in-the-loop validation (e.g., by presenting the estimated ground truth value and the corresponding submission content in a user interface). In some embodiments, the ground truth labeler 300 may request direct quotes or citations from the submission that were used to justify the extracted value. The request for citations may be made in response to high uncertainty, for example, to aid subsequent validation.

The text embedder 112 may be configured to generate a vector embedding for a chunk of text. The vector embedding may refer to a vector representation of the semantic content of the chunk of text. Vectorization gives text numerical values that can be searched, with computational efficiency, for similarity (e.g., using a distance metric); thereby, text with similar semantic content can be identified for retrieval. Similar words would have similar numerical values. For example, hot and cold may have vectors pointing in different directions. The system may not find the word "cat", but with vectors, the system will determine that lion is similar to cat or big+cat. The text embedder 112 may be trained to understand the meaning of the words (female+king=queen).

After the vectors are created, the text embedder 112 may communicate the vector embeddings of the text chunks to the data extraction manager system 200 for storage in an object (e.g., a vector store). In some embodiments, the text embedder 112 may be included as a component of the data extraction manager system 200.

The LLM 108 may be any type of artificial intelligence (AI) configuration. For example, the LLM 108 may include generative pre-trained transformers (GPT), bidirectional encoder representations from transformers (BERT), text-to-text transfer transformers (T5), recurrent neural networks (RNN), or any other AI architecture suitable for a large language model. The LLM 108 may be configured to output a text response from a textual prompt. For example, the LLM 108 may convert text of a prompt into tokens representing a unit of information (e.g., a character, word, prefix, punctuation, etc.) and use the input sequence tokens to predict each output word (or token) consecutively. The prompt communicated to the LLM 108 may include chunks from the documents gathered from the one or more data sources 104 so that the LLM 108 is able to use that information to generate its response. For example, the LLM 108 may be provided a prompt including a request to determine the range of the market capitalization of a company over the last 6 months and one or more table chunks or text chunks that include information that may be relevant for the request.

The LLM 108 may be a publicly available LLM such as Claude. The LLM 108 may be pre-trained on massive corpora of text data, allowing it to learn the statistical properties of language and predict output text based on the prompt. In some embodiments, the LLM 108 may be fine-tuned, for example, to extract specific data from tabular and/or textual input. Fine-tuning a LLM may refer to the process of taking a pre-trained model and further training it on a specific dataset to adapt it to a particular task or domain. Fine-tuning may allow the LLM 108 to leverage its existing knowledge while improving its performance on the new, specialized data. For example, by focusing on the correlations found in the particular task or domain.

The one or more MMLMs 110 may be designed to process and/or integrate information from various modalities of input (e.g., text, images, audio, video, etc.). In some embodiments, the input layer of the one or more MMLMs 110 includes a channel for each available modality. For example, there may be an audio channel and an image channel. The image channel may also support text represented visually in the document (e.g., on a page, etc.). The one or more MMLMs 110 may encode the different modalities into a common format that can be processed by one or more hidden layers within the one or more MMLMs 110. For example, the one or more MMLMs 110 may include convolutional layers for imaged-based data and/or transformer layers or other attention mechanisms to process textual data. The one or more MMLMs 110 may also include layers that combine (e.g., fuse, integrate, etc.) information across different input modes to generate an output. The output may include similar modalities as the input data. For example, the output may include text, images, audio, video, and/or other relevant formats based on the task and/or the prompt to the one or more MMLMs 110.

The one or more MMLMs 110 may be configured to use the image-based input modality to better understand context of any text on the page. For example, image-based input to the one or more MMLMs 110 may allow the one or more MMLMs 110 to understand the flow (e.g., reading order) of the text within a document. The image-based input may also allow the one or more MMLMs 110 to recognize relationships between figures and/or tables and text within a document. The image based one or more MMLMs 110 may be configured to segment various areas of the document or a page within the document based on relationships between the text, figures, and/or other visual cues. For example, the one or more MMLMs 110 may distinguish handwritten characters from typeset. In some embodiments, the one or more MMLMs 110 are configured to accept input in a specific format or of a specific file type. The data extraction manager system 200 may convert a document from the OCR system 106 to the accepted file type prior to sending the document to the one or more MMLMs 110. For example, a PDF may be converted to a portable network graphic (PNG) prior to communication to the one or more MMLMs 110. Additionally or alternatively, the one or more MMLMs 110 may include pre-processing that converts several different file types to the file type required by the one or more MMLMs 110.

In some embodiments, the documents processed by the data extraction and population system 100 include forms, applications, surveys, etc. for which the document or portion thereof (e.g., page, section, etc.) includes a request for information. The document or portion thereof may also include one or more predefined responses. For example, the document or portion thereof may include multiple-choice, multiple-select, and/or ranking type questions. The one or more MMLMs 110 may be configured to recognize the selections of predefined responses from the respondent to the request for information. For example, the one or more MMLMs 110 may recognize circles around text, check marks, filled in boxes or bubbles, as a selection of the related text. In some embodiments, the MMLM is configured (e.g., trained, fine-tuned, etc.) to determine the portion of the text that represents the request for information (e.g., the question, survey directions, etc.) and determine the text that represents the predefined responses. The one or more MMLMs 110 may be configured or prompted to process (e.g., consider) this information separately when generating a response.

In some embodiments, the one or more MMLMs 110 are used during document ingestion.

The data extraction manager system 200 and/or the OCR system 106 may be configured to recognize that the document includes images, figures, layouts, tables, and/or other content that may benefit from processing. For example, the data extraction manager system 200 may consider a trade-off between the added cost and computations of using the one or more MMLMs 110 against the potential for improved retrieval (and therefore extraction) accuracy if the one or more MMLMs 110 are used. In some embodiments, the data extraction manager system 200 may request the one or more MMLMs 110 to create a vector embedding of the document or portion thereof (e.g., page, paragraph, section, etc.).

Additionally or alternatively, the data extraction manager system 200 may request the one or more MMLMs 110 to generate a summary (e.g., a text-based summary) of the document or portion thereof. After a summary of the document or portion thereof is generated the one or more LLMs 108 may be used to create a vector embedding for the index.

The one or more UI clients 102 may provide users, administrators, and/or developers of the data extraction and population system 100 access to its features. In some embodiments, the one or more UI clients 102 are used to generate a user interface that allows for interaction with the components of the data extraction and population system 100. For example, the one or more UI clients 102 may be used to initiate data population, configure the data to populate or extract, view results, trace errors, view source material, and/or other interactions that may be appropriate for a particular use case. The one or more UI clients 102 provide various inputs (e.g., selecting user interface objects, entering text into fields, etc.) and various outputs (e.g., display, print, email, or transmission to another system) to/from the data extraction and population system 100.

The network 114 can include routers, switches, antennas, computers, and any other hardware required to communicate information between the components of the data extraction and population system 100 (e.g., from the data extraction manager system 200 to the one or more LLMs 108 or the one or more MMLMs 110). A portion of the network 114 can be wireless and/or a portion of the network 114 can be wired. The network 114 can include one or more networks with routers to facilitate data transfer between the different networks.

In one use case where the data extraction and population system 100 is particularly useful is to extract data for the underwriting process of insurance policies. For example, directors and officers liability insurance and/or environmental insurance require extracting large amounts of information for which there is no central repository. The information may be collected about the company, the directors and officers, and/or any business locations. Manually searching for this information is error prone and requires a large time investment for the underwriters. Moreover, much of the data that is to be extracted for insurance underwriting may be found in financial tables of image-based documents (e.g., PDFs) making the systems and methods of separating tabular information and text information described herein particularly useful in such use cases.

Continuing with the example of insurance underwriting, the user of the data extraction and population system 100 may be an insurance underwriter. They may have a specially curated set of data elements that they require to perform the underwriting process of different types of insurance policies. A type of insurance policy may be considered a task for which the data extraction and population system 100 is configured to populate the data elements of an ontological data store related to that type of insurance policy. The insurance policy may be associated with one subject (e.g., companies, people, buildings, etc.) for which the insurance policy is to be underwritten. After data is populated, the underwriter may review the information and or generate a report. For regulatory purposes, the data used to generate the report may require citation to the source of the information. Systems and methods described herein may allow for such traceability and generation of the appropriate citation.

Data Extraction/Population System

FIG. 2 shows a block diagram of the data extraction manager system 200, according to some embodiments. In some embodiments, the data extraction manager system 200 is configured to coordinate the processes performed by the data extraction and population system 100 during the data extraction and population. The data extraction manager system 200 of FIG. 2 is shown as a single entity (e.g., hardware). However, it is contemplated that the components and/or instruction sets included in the data extraction manager system 200 could be distributed over any number of computer hardware devices and in any manner of architecture (e.g., local network, cloud-based, etc.).

The data extraction manager system 200 is shown to include a communications interface 202, and one or more processing circuits 204 having one or more processors 206 and memory 208.

The communications interface 202 may be configured to facilitate communication between the data extraction manager system 200 and other components of the data extraction and population system 100. For example, the communications interface 202 may transmit information onto the network 114 and/or receive information from the network 114.

The one or more processors 206 may be general purpose or specific purpose processors, an application specific integrated circuit (ASIC), one or more field programmable gate arrays (FPGAs), a group of processing components, or other suitable processing components. The one or more processors 206 may be configured to execute computer code and/or instructions stored in the memory 208 or received from other computer readable media (e.g., CDROM, network storage, a remote server, etc.). The one or more processors 206 may be configured in various computer architectures, such as graphics processing units (GPUs), distributed computing architectures, cloud server architectures, client-server architectures, or various combinations thereof. A first set of the one or more processors 206 can be implemented by a first device, such as an edge device, and a second set of one or more processors 206 can be implemented by a second device, such as a server or other device that is communicatively coupled with the first device and may have greater processor and/or memory resources.

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. The memory 208 may include database components, object code components, script components, or any other type of information structure for supporting the various activities and information structures described in the present disclosure. The memory 208 may be communicably connected to the processors and can include computer code for executing (e.g., by the processors) one or more processes described herein. For example, many of the components of the data extraction manager system 200 illustrated in FIG. 2 may be implemented as instruction sets stored by the memory 208 and executed by the one or more processors 206.

In FIG. 2, the data extraction manager system 200 is shown to include a coordinator 212, a data manager 220, an ingestion manager 240, a generative AI manager 260, an interface manager 280, and enabling services 290, according to some embodiments. The coordinator 212 may be configured to control the timing and flow of data through the other circuitry of the data extraction manager system 200. For example, the coordinator 212 may cause the modules or circuits to execute in a specific order to perform the function of the data extraction manager system 200. In some embodiments, the coordinator 212 may route the information and/or outputs of other modules that are dependent on the information or use the information as an input.

The data manager 220 may be configured to manage the data gathering process of the data extraction and population system 100, including gathering documents from the one or more data sources 104. The ingestion manager 240 may be configured to identify image-based documents (e.g., PDFs) and coordinate the processing of the image-documents with the OCR system 106. The ingestion manager 240 may also be configured to separate text from other information that may be in documents (e.g., tables, graphs, etc.) and manage the creation of a semantic search index using the text embedder 112. The generative AI manager 260 may be configured to generate prompts (e.g., from templates) to cause an LM (e.g., of the one or more LLMs 108 or the one or more MMLMs 110) to extract data from retrieved documents. The generative AI manager 260 may coordinate the retrieval of relevant portions of documents (e.g., table chunks and/or text chunks) to supply as part of the prompt to the LM. The interface manager 280 may provide for interaction with a user of the data extraction and population system 100 and/or an administrator of the data extraction manager system 200. In some embodiments, the enabling services 290 provide deployment support, security, and monitoring for the data extraction and population system 100.

In some embodiments, the data manager 220 includes a request manager 222, a data scraper 224, internal data storage 226, and an ingestion initializer 228.

In some embodiments, the request manager 222 coordinates the document gathering for a particular task. The request manager 222 may be configured to receive a request to begin data gathering for a particular task. The request manager 222 may, at the request of a user (e.g., through the user interface on the one or more UI clients 102), cause the data scraper 224 to begin searching the one or more data sources 104 for documents that may contain information to be used to populate the data elements or data model. In some embodiments, the request manager 222 may communicate information related to the particular sources of the one or more data sources 104 that should be searched for information. For example, the request manager 222 may receive a set of particular sources of the one or more data sources 104 that should be searched. Additionally or alternatively, the request manager 222 may receive a type of request for which the data scraper 224 has a predetermined list of potential sources. In some embodiments, the request manager 222 may report status back to the user (e.g., to the one or more UI clients 102) in the form of a percent complete. The request manager 222 may also accept individual sources from the user (e.g., from the one or more UI clients 102). For example, the user may provide a data source that the data scraper 224 is not preprogrammed to search. Additionally or alternatively, the user may upload documents to the data extraction manager system 200 that can be stored by the request manager 222 using the internal data storage 226.

The data scraper 224 may be configured to gather information from various sources, including the one or more data sources 104, additional data sources linked by a user (e.g., from the one or more UI clients 102), and/or documents uploaded by the user (e.g., after scanning a hard copy, receiving an email, etc.). The data scraper 224 may search databases, webpages, emails, and other internal and/or external sources of documents (e.g., text, data, image-based documents, etc.). The data scraper 224 may include a list of particular sources of the one or more data sources 104 that are to be searched for a particular task. For example, if the task includes gathering financial information, the data scraper 224 may gather data from Dun and Bradstreet using a POST request or by navigating to a particular web page. Additionally or alternatively, the data scraper 224 may use a web-based search engine (e.g., Google, Bing, etc.) and gather documents (e.g., text, PDFs, etc.) from a number of the top search results (e.g., top 10, top 50, etc.). In some embodiments, the data scraper 224 searches pre-approved websites that are returned from the search engine (e.g., websites that have been vetted to maintain currency and accuracy).

To gather documents, the data scraper 224 may visit a webpage and perform a keyword search or a semantic search to find information that may be used for a particular task. For example, the data scraper 224 may perform a keyword search or a semantic search against the file names of any documents stored in the one or more data sources 104. For plain text documents and/or webpages, the data scraper 224 may identify a keyword or a section that is semantically related to the task and gather the text for a number of words, characters, or sentences before and after the identified area of the text. The data scraper 224 may combine text from multiple identified areas if the resulting text is overlapping. By gathering data both before and after the identified area the data scraper 224 may gather any information that may be useful for populating the data model both in its current form and potentially gathering information for future versions of the data model.

The data scraper 224 may be configured to store the gathered text and/or documents in the internal data storage 226 for processing by the OCR system 106 and/or chunking. In some embodiments, the data scraper 224 searches through all the one or more data sources 104 prior to an index for retrieval augmentation being built. Alternatively, each document may be added to the index as it is gathered, for example, to speed up operations by processing in parallel (e.g., gathering data while building the index) and/or to use internal data storage 226 more efficiently by discarding information that is deemed not useful. In some embodiments, the data scraper 224 may search the one or more data sources 104 until it finds an amount of documentation, or a number of documents related to each search or data that is to be populated. As such, the data scraper 224 may be configured to ensure that the data extraction and population system 100 has a level of information available that is expected to successfully populate all or a threshold percentage of the data.

In some embodiments, the data manager 220 may be configured to periodically (e.g., based on a schedule) search for updates of the documents from the one or more data sources 104. The schedule may be entered by a user (e.g., via a user interface on the one or more UI clients 102). As updates to the documents are found and/or new documents are found, the ingestion manager 240 may add the new information to the retrieval index.

In some embodiments, the internal data storage 226 includes storage for both processed and unprocessed documents. The internal data storage 226 may include a data model and/or an ontology that includes structured storage for documents with properties for the document name, type (e.g., imaged-based, plain text, etc.), source (e.g., from which of the one or more data sources 104), if the document has been chunked, etc. The internal data storage 226 may include storage for each chunk of the documents, with properties that link the source document to enable traceability, the page of the source document from which the chunk is from, a chunk ID (e.g., sequential number, globally unique identifier, GUID, hash code, etc.), if the chunk is a table chunk or a text chunk, etc. The internal data storage 226 may include a vector store to store the vector embeddings of the chunks for the index. The vector store may be maintained separately from the other objects of the data model so as to allow efficient semantic search during retrieval augmentation. The internal data storage 226 may include prompt templates for a particular task or data elements to be populated. For example, the given data population task may include several data elements that are to be populated by the data extraction and population system 100 and the internal data storage 226 may include prompt templates that are used to cause the LM to extract the data from the documents for the particular data element (and thus allowing the data extraction and population system 100 to extract the data elements from the one or more data sources 104). The internal data storage 226 may include the data elements that are to be populated by the data extraction and population system 100. For example, at the initiation of a request (e.g., by the request manager 222) the data elements to be populated may be provided to the internal data storage 226 and populated during the data extraction and population process.

The internal data storage 226 may include storage for all the requests of the data extraction and population system 100 in a single data lake. Additionally or alternatively, a data lake may be generated for each request, providing data isolation and the ability to move the data between systems on a per request basis. The internal data storage 226 may be organized based on request, user id, or any other key to provide efficient operation.

The internal data storage 226 may be any type of non-transitory, computer readable storage medium. For example, internal data storage 226 may store data in magnetic hard disk, solid state drives, optical drives, RAM, and/or any other suitable storage medium. The internal data storage 226 may be distributed across one or more computer system, for example, communicably connected over the network 114.

The system may include remote access to data, standardizing data and allowing remote users to share information in real time. The system may allow users to access data (e.g., data from the database, text from the documents, table data, etc.), and receive updated data in real time from other users. The system may store the data (e.g., in a non-standardized format) in a plurality of storage devices, provide remote access over a network so that users may update the data that was in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system may allow remote users to share data in real time in a standardized format, regardless of the format (e.g. non-standardized) that the information was input by the user. This standardization of data improves communication between devices, improves the functioning of the system and improves the sharing of the data. In particular, the communications are streamlined without having to conduct data conversions because the users and systems may share data (e.g., in real time) in a standardized format.

In some embodiments, the ingestion manager 240 may include an OCR manager 242, a markup decoder 244, a table chunker 246, a text chunker 248, a chunk tracer 250, an indexer 252, an information separator 254, and a document type manager 256. These components may provide functionality allowing the data extraction manager system 200 to identify image-based documents (e.g., PDFs) and coordinate the processing of the image-based documents with the OCR system 106 and prepare the text for retrieval within the RAG architecture of the data extraction and population system 100.

The OCR manager 242 may coordinate the interaction with the OCR system 106. The OCR manager 242 may be configured to receive image-based documents and output plain text files for those image-based documents. For example, the OCR manager 242 may request all unprocessed imaged-based documents from the internal data storage 226 and generate requests for processing by the OCR system 106. The OCR manager 242 may include instructions for communicating the documents to the OCR system 106, tracking their progress, and returning results back into the internal data storage 226. In some embodiments, the OCR manager 242 may have error handling code if the OCR system 106 is not able to appropriately process the documents. For example, the OCR manager 242 may flag the document as unusable, generate a request for the data scraper 224 to obtain additional documents from the one or more data sources 104 that include similar information, and/or use a secondary or back-up OCR system to perform the conversion to plain text.

In some embodiments, the OCR manager 242 may convert the output of the OCR system 106 into a standardized format. The OCR manager 242 may convert the output of the OCR system 106 into plain text using a markdown language to indicate various text structures and/or tables. For example, the OCR system 106 may return plain text in JSON format, and the OCR manager 242 may convert the JSON format into markdown. In some embodiments, more than one OCR system 106 is used, for example, as an alternative if an error occurs or the system is down. The OCR manager 242 may convert all outputs from an OCR system 106 into the format of the primary OCR system 106 or into a common format. In some embodiments, the text information from the one or more data sources 104 contains tables that are not image-based (e.g., Word documents or spreadsheets). Such documents may be provided to the OCR manager 242 for processing into the common markdown even if the document does not require OCR. For example, the OCR manager 242 may be able to read data directly from the Office Open XML (OOXML) structure of the documents. Additionally or alternatively, the OCR manager 242 may be configured to use inter-process communication, object linking and embedding, and/or component object model automation to extract plain text and tables from non-image-based, rich text formats.

The markup decoder 244 may be configured to separate tabular information from text. In some embodiments, the markup decoder 244 uses markdown language to determine information that is tabular and separate from text information. For example, the OCR manager 242 may communicate plain text returned from the OCR system 106 to the markup decoder 244. The plain text may use certain markdown symbols to indicate data as part of a table. In some embodiments, the plain text output of the OCR system 106 includes the vertical bar or pipe character, '|', to mark the start of a new column within a row of the table, and the vertical bar followed by a newline character (e.g., '|/n') may be used to represent a new row. The markdown language may also use hyphen characters, '-', to separate a header row from a content row within a table.

The markup decoder 244 may be configured to find certain patterns in the plain text (e.g., with markdown symbols) to determine where a table begins. Regular expressions can be used with wildcards in order to identify a table in plain text (e.g., via a text-based search). For example, the regular expression '\|.*?\|\n\n' may be used to find text (e.g., data, etc.) that is in a row of a table. After finding a row from a table, the markup decoder 244 may generate a new entry in the internal data storage 226 (e.g., a table entry) to store the rows of the table. For example, the rows of the table may be cut from the plain text and moved to the table entry until the next text that does not satisfy the regular expression. After this process, the plain text may have the tabular information removed (e.g., and is ready to be broken into text chunks) and the table entry may have the tabular information.

The table chunker 246 may be configured to generate table chunks from the table entry generated by the markup decoder 244. For example, a table chunk may include the entirety of the table entry. Alternatively, the table chunker 246 may be configured to generate a table chunk including a number of rows of the table entry. For example, the table chunker 246 may break the tables into 50 row chunks or 100 row chunks. The number of rows may be tailored (e.g., through configuration of the data extraction manager system 200) based on a trade-off between the ability for the retrieval process to identify the correct information to send to the LLM 108 and the amount of data that is provided to the LLM 108 and therefore the computational cost, monetary cost, and energy cost of using the LLM 108.

In some embodiments, the table chunker 246 is configured to generate a separate table chunk for the table header. It is contemplated that the table header typically has the most text in a table. In addition, the table header may have text that can be vectorized into an embedding to allow for semantic search of the tables. For example, semantic search may be performed on the headers of each table, and if a header satisfies a similarity criterion during the search, the table or a portion thereof associated with the header may be provided to the LLM 108 during processing of the prompt. The LLM 108 may be configured to understand tabular information in a certain format (e.g., the markdown provided by the OCR system 106, a JSON format wherein each cell is an object with text content or data in ASCII format, a row index, and a column index, or another suitable tabular representation). The table chunker 246 may convert (e.g., transform) the tabular representation of the OCR system 106 or the markup decoder 244 to the tabular representation used by the LLM 108.

The text chunker 248 may be configured to generate chunks of text from the plain text remaining after tables have been removed from the document. A number of text chunks may be generated from a single document. The text chunks may be of a fixed length (e.g., 500 words, 500 characters, 1000 tokens, etc.). The text chunks may be overlapping. For example, the contribution of a set of words to the semantic meaning of a chunk may be higher if the words are in the center of the chunk (e.g., because they are able to use the context of more nearby words) than at the end and therefore chunks may overlap by 50% of the length of the chunks. In some embodiments, the amount of overlap of text chunks is optimized (e.g., offline) and used to configure the data extraction manager system 200. Accuracy of the semantic search retrieval may be calculated for a set of training data (e.g., multiple documents) and used to determine a best amount of overlap or a best fixed length.

The length of the text chunk may be optimized based on an objective that includes a trade-off of the semantic search accuracy the accuracy of the data population LLM 108, and the processing time, computation cost, energy cost, or real cost used to execute the LLM 108. For example, longer text chunks may allow the LLM 108 additional background information during processing, but increase computational expense. Additionally, the accuracy of the semantic search may be poor for both chunks that are short (e.g., too little information) and chunks that are too long (e.g., so much information that the semantic meaning cannot be summarized in the vector embedding). In some embodiments, the length of the text chunk is adaptive, for example, based on the type of request, the data to be populated, the type of document, etc.

In some embodiments, the chunk tracer 250 is configured to add metadata to the text chunks and/or the table chunks. The metadata may be added to improve the document retrieval and/or provide traceability of the data that the LLM 108 extracts. For example, the chunk tracer 250 may associate a flag (or tag) with a chunk indicating the chunk is a table chunk. The flag may be a separate property in the data store (e.g., data model, ontology, etc.) used to store the chunks or the flag may be embedded in the chunk itself. The flag may be a binary flag that includes a True (1) or False (2) value next to a chunk, wherein a value of (1) indicates that the chunk is a table chunk. The flag may found using a regular expression (regexp), for example, "TABLES" may be added to table chunks. The flag may identify which chunk is a table chunk or a text chunk, based on the chunks having a similar table pattern. Adding metadata that indicates whether the table chunk allows the retrieval process to search only tabular information for certain data (e.g., that is known to be stored in tables for the particular field of use, task, etc.).

The chunk tracer 250 may be configured to store a chunk identifier, a document identifier, and/or a page identifier so that if data extraction fails or is questionable, the user is able to trace the source documentation that was used to populate a specific data element. The metadata used for tracing a chunk may be stored as part of the data store and/or the metadata may be stored in the vector store of the index (e.g., keyed based on the location within the vector). Upon failure or request by the user or the one or more UI clients 102, the chunk tracer 250 may return the document chunk identifier, a document identifier, and/or a page identifier. Additionally or alternatively, the chunk tracer 250 may be configured to retrieve the entirety of the chunk text or the table using the identifiers for viewing, verification, or reporting purposes. In some regulated industries, it may be necessary to include the reference material (e.g., as a footnote or citation) to show that the system is accurately populating the data elements and/or is unbiased.

Source documents (e.g., from the one or more data sources 104) may update or change over time. Therefore, it may be advantageous to periodically obtain documents for a specific task (e.g., data population job, etc.). However, if the documents change after some data has been extracted, traceability may be lost. To prevent loss of traceability, the chunk tracer 250 may include with the chunks a creation timestamp and an access timestamp. In some embodiments, the chunk tracer 250 may link chunks from different versions of the same document. The user may be provided with all chunks (e.g., original and updated) related to extracted information, the times the chunks were created, and the times the chunks were accessed, allowing the user to view historical information related to the information extracted and decide if the information should be updated or data extraction should be repeated.

The indexer 252 is configured to create a searchable index of the chunks generated by the table chunker 246 and/or the text chunker 248. In some embodiments, the indexer 252 generates vector embeddings of the text of the chunks. The indexer 252 may coordinate with the text embedder 112 to generate a vector embedding for a text chunk. The vector embedding may refer to a vector representation of the semantic content of the text chunk. Vectorization gives the text chunk numerical values that can be searched, with computational efficiency, for similarity (e.g., using a distance metric); thereby, text chunks with similar semantic content to a prompt can be identified for retrieval. Similar words would have similar numerical values. For example, hot and cold may have vectors pointing in different directions. The system may not find the word "cat", but with vectors, the system will determine that lion is similar to cat or big+cat. The text embedder 112 may be trained to understand the meaning of the words (female+king=queen).

In some embodiments, the table chunks are also indexed by the indexer 252 based on semantic meaning, for example, of their header row. Additionally or alternatively, the indexer 252 may generate an index including full text for the table headers. Full text of table headers allows for more specificity in a search of tabular data. For example, specific headers may always be available in certain types of tables and can be found by keyword search and or regular expressions.

The indexer 252 may return an index including a vector data store for the vector embeddings and/or a separate index for table chunks including the full text of the table headers. The index may be stored in the internal data storage 226 until used by the retrieval augmentation process.

In some embodiments, the indexer 252 is configured to determine if the index creation for a particular document or portion thereof would benefit (e.g., significantly) from processing by the one or more MMLMs 110. For example, the indexer 252 may recognize that the document includes images, figures, layouts, tables, and/or other content that may benefit from spatial context awareness from the one or more MMLMs 110. The indexer 252 may compare an amount of such content and/or consider a trade-off between the added cost and computations of using the one or more MMLMs 110 against the potential for improved retrieval (and therefore extraction) accuracy if the one or more MMLMs 110 are used. In some embodiments, the text embedder 112 may generate a comprehension score (e.g., a coherency score, a logic score, a consistency score, etc.) that represents the level of flow of the words from the document provided to the text embedder 112. The comprehension score may be compared to a threshold value to determine whether a chunk is to be processed by the one or more MMLMs 110. If the comprehension score is greater than the threshold value, the index may be created by producing a vector embedding from the text of the chunk using the text embedder 112. If the comprehension score is less than the threshold value, the portion of the document (e.g., page, etc.) associated with the chunk may be processed by the one or more MMLMs 110 prior to the text embedder 112. For example, the indexer 252 may request that the one or more MMLMs 110 summarize the portion of the document, and then request the text embedder 112 to generate an embedding of the summary for the index.

In some embodiments, the ingestion manager 240 includes an information separator 254. The information separator 254 may be configured to separate text related to the request for information and other text (e.g., text of the response and/or predefined and selectable responses). In some embodiments, the information separator 254 uses characters provided by the OCR system 106 to separate the text of the request from the other text. For example, the information separator 254 may use markup provided by the OCR system 106 and/or recognize sentences ending with a question mark character as at least part of the request. Indexing and therefore document retrieval and data extraction may be improved by separating the text of the request from the other text. For example, if the other text includes predefined answers that can be selected by the respondent, the responses that are not selected may add confounding information that causes the text embedder 112 to generate poor vector embeddings for the document or portion thereof being ingested.

The ingestion manager 240 may include a document type manager 256. The document type manager 256 may be configured to recognize the type of the document. The document type manager 256 may flag each document and/or portion thereof (e.g., chunk, etc.) with the type of document. For example, the type of document may be stored with the metadata of the chunk. Other components (e.g., instruction sets, etc.) of the data extraction manager system 200 may use the document type to configure the method by which the chunk is to be processed (e.g., retrieval parameters, chunking parameters, the LM to be used, etc.). Additionally or alternatively, the document type manager 256 may flag (e.g., add flags to the metadata of a chunk) the type of processing to be performed by the other components of the data extraction manager system 200. The flags may be based on the document type for the chunk and/or one or more additional aspects of the document (e.g., length, existence of figures, etc.) detected during the ingestion process. The flags may be used by the other components in order to select various features for processing of the chunk.

Documents from the one or more data sources 104 may include questions filled in (e.g., completed, etc.) by a respondent. For example, the documents may include surveys, applications, forms, questionnaires, registrations, etc. In some embodiments, the ingestion manager 240 may be configured to determine if the response provided by the respondent is valid (e.g., appropriate, follows the instructions, etc.). The ingestion manager 240 may reject various documents if it is determined that the response was provided incorrectly. Documents may be rejected if more than one answer is selected to a multiple-choice question, if selections are indicated in an inappropriate manner, or based on other situations that may arise from a person filling out a form incorrectly. In some embodiments, the ingestion manager 240 uses the one or more LLMs 108 and/or the one or more MMLMs 110 to determine if the response is valid. The ingestion manager 240, for example, may request that the LM determine an appropriateness score for the response.

If a response is determined to be invalid, the ingestion manager 240 may generate a request for the information to be completed. For example, an email may be created and communicated to the respondent indicating that the response was not accepted. In some embodiments, the document or portion thereof (e.g., page, question, etc.) including the incorrect response is not added to the index. The data extraction manager system 200 may extract the data from other documents of the one or more data sources 104. Additionally or alternatively, the data extraction manager system 200 may wait for the response to be appropriately provided. In some embodiments, the ingestion manager 240 may still add the document or portion thereof with the invalid response to the index and if the document is retrieved with no data extracted the data extraction manager system 200 may indicate that a valid response is required. For example, the system may generate an email to request a new response and/or indicate on a user interface that the obtaining a valid response to the request associated with the missing data may result in an accurate extraction.

In some embodiments, the ingestion manager 240, additionally or alternatively, is configured to determine if any response was provided for a request for information. For example, the ingestion manager 240 may determine whether a question was left blank or whether no selection was indicated. The ingestion manager 240 may perform different remediation based on whether no response was provided or if the response is invalid. For example, if no response is provided, the ingestion manager 240 may generate a new request for information and communicate the request to the respondent, whereas if the response is invalid, the ingestion manager 240 may indicate the chunk for processing by the one or more MMLMs 110 which may be capable of adapting to the unexpected method for responding to the request.

In some embodiments, the generative AI manager 260 includes a prompt manager 262, a semantic searcher 264, a keyword searcher 266, an LM manager 268, a response validator 270, and response storage 272. These components may provide functionality allowing the data extraction manager system 200 to use an LM (e.g., of the one or more LLMs 108 and/or the one or more MMLMs 110) to extract specific data from the documents found by the data manager 220 and processed by the ingestion manager 240 and store that data in the data store.

The prompt manager 262 may populate prompt templates that are stored within the internal data storage 226. For example, the prompt manager 262 may be configured to insert retrieved documents (e.g., by the semantic searcher 264 and/or the keyword searcher 266) into the prompt before the prompts are sent to the LM (e.g., via the LM manager 268). The prompt manager 262 may sequentially process prompts stored in the internal data storage 226 or the prompts may be processed in parallel, e.g., by multiple of the one or more processors 206 on the same or different computer hardware. The internal data storage 226 may store a number of prompt templates, (e.g., to extract data from the documents for each of the data elements to be populated). The prompt manager 262 may select the appropriate prompt templates for the current data population task (e.g., as provided by the user via the one or more UI clients 102).

The prompt manager 262 may use the semantic searcher 264 and the keyword searcher 266 to retrieve chunks (e.g., both table chunks and text chunks) to augment the prompt sent to the LM. The semantic searcher 264 may search based on a similarity criterion or ranking using a distance metric (e.g., Euclidean distance, cosine distance) within the index of vector embeddings produced by the indexer 252. The keyword searcher 266 may search based on one or more other criteria or scores. For example, the keyword searcher 266 may search based on the number of keyword matches or the number of regular expression matches and choose the documents that have the largest number of matches. In some embodiments, the keyword searcher 266 is used for searching the table chunks, whereas the semantic searcher 264 is used to search the vector embedding index. Alternatively, both the keyword searcher 266 and the semantic searcher 264 may be used to search both table chunks and text chunks. For example, a weighted function that combines the similarity scores of the semantic searcher 264 and the matching score of the keyword searcher 266 may be used to score both table chunks and text chunks.

Documents from the one or more data sources 104 may include questions filled in (e.g., completed, etc.) by a respondent. For example, the documents may include surveys, applications, forms, questionnaires, registrations, etc. In some embodiments, the prompt manager 262 may be configured to generate one or more prompts for an LM (e.g., the one or more LLMs 108 and/or the one or more MMLMs 110) to determine if the response provided by the respondent is valid (e.g., appropriate, follows the instructions, etc.). The generative AI manager 260 may reject any response for which the LM indicates the document used to extract the information was a request for information from a respondent and the response was not valid for one or more reasons. For example, the prompt manager 262 may generate a prompt requesting that the LM determines an appropriateness score for the response.

If a response is determined to be invalid, the generative AI manager 260 may cause a request for the information to be generated. For example, an email may be created and communicated to the respondent indicating that the response was not accepted. In some embodiments, the document or portion thereof (e.g., page, question, etc.) including the incorrect response is not added to the index. In some embodiments, the prompt manager 262, additionally or alternatively, is configured to generate a prompt for determining if any response was provided to for a request for information. For example, a prompted LM may determine whether a question was left blank or whether no selection was indicated. Different remediation can be performed based on whether no response was provided or if the response is invalid. For example, if no response is provided, the data extraction manager system 200 may generate a new request for information and communicate the request to the respondent, whereas if the response is invalid, the data extraction manager system 200 may indicate the chunk for processing by the one or more MMLMs 110 which may be capable of adapting to the unexpected method for responding to the request.

In some embodiments, the search criteria, score, and/or distance metric is modified based on the prompt (e.g., the particular data the prompt is requesting the LM to extract). For example, the prompt template may include search (e.g., query, retrieval) parameters such as a type of search and/or parameters for the search that are to be used while performing retrieval augmentation (e.g., while querying for relevant chunks) for a particular prompt. Advantageously, by storing the parameters for the semantic searcher 264 and/or the keyword searcher 266 with the prompt template, the retrieval augmentation can be tailored for each data element that is to be populated by the data extraction and population system 100. For example, a prompt template may indicate that only table chunks should be searched.

In some embodiments, the search performed by the semantic searcher 264 and the keyword searcher 266 is hierarchical. Multiple sets of search parameters may be associated with the prompt or the particular data to extract. The semantic searcher 264 and the keyword searcher 266 may first use a primary (e.g., first, most narrow, etc.) set of search parameters to identify relevant chunks for retrieval augmentation. If the generative AI manager 260 determines that the relevant chunks do not satisfy a retrieval criterion, the semantic searcher 264 and the keyword searcher 266 may use a secondary (e.g., second, broadening, etc.) set of search parameters. For example, the retrieval criterion may include a threshold number of chunks that must be exceeded, a threshold number of words that must be included in the chunks, chunks from at least a number of different document types, or any other desired criterion that may ensure accuracy of the LM's response. In some embodiments, the semantic searcher 264 and the keyword searcher 266 continue to use increasingly broad search/retrieval parameters from the multiple sets until the retrieval criterion is achieved.

After identifying one or more relevant chunks using the semantic searcher 264 and/or the keyword searcher 266, the generative AI manager 260 may provide the one or more relevant chunks to the LM with the prompt. In some embodiments, a search reach criterion may also be used by the generative AI manager 260. The search reach parameter defines a number of chunks related (e.g., adjacent, nearby) to the one or more relevant chunks. For example, for each identified relevant chunk, the generative AI manager 260 may include all the chunks that are from the same page as the identified relevant chunk or all the chunks that satisfy the search reach criterion with the identified relevant chunk. Advantageously, in such a system the chunks generated and stored in the index can be smaller, for example, to have a concise semantic meaning for improved retrieval, and the LM is provided with contextual information adjacent to the relevant chunk to help with information extraction.

The LM manager 268 may coordinate the interaction between the data extraction manager system 200 and the LMs (e.g., of the one or more LLMs 108 and/or the one or more MMLMs 110). The LM manager 268 may be configured to receive populated prompts to communicate to the LM. The LM manager 268 may include instructions for communicating the prompts to the LM, tracking the progress in processing the prompts, causing the results to be validated by the response validator 270, and storing the response (e.g., in the internal data storage 226 and/or the response storage 272). The LM manager 268 may post jobs (e.g., tasks, prompts, etc.) to the LM using an API provided by the LM. Additionally, the LM manager 268 may use the API to request the response to a particular prompt.

In some embodiments, the LM manager 268 may be configured to convert a document from the one or more data sources 104 to a file type suitable for the one or more MMLMs 110 prior to sending the document and/or the prompt. The whole page or other portion (e.g., area, paragraph, etc.) of a document associated with a relevant chunk identified by the semantic searcher 264 and/or the keyword searcher 266 may be retrieved and provided to the LM manager 268 for conversion. For example, a page of a PDF may be converted to a PNG prior to communication to the one or more MMLMs 110. Additionally or alternatively, the one or more MMLMs 110 may include pre-processing that converts several different file types to the file type required by the one or more MMLMs 110.

In some embodiments, the LM manager 268 provides the prompt for information extraction, the one or more relevant chunks (e.g., found by the semantic searcher 264 and/or the keyword searcher 266), and a request for the LM to identify the used chunks that were used by the LM to extract the information. To provide traceability each chunk may be given a unique identifier (e.g., a chunk identifier, a document and page identifier, etc.) and the LM can include in its response the identifier of the chunks used during processing. The identifiers provided to the LM may be globally unique or may be unique only to the current prompt (e.g., if 23 chunks are provided to the LM, the integers 1-23 may be used as unique identifiers related to the scope of that prompt). The used chunks may be stored with the response of the LM to be displayed, reported, cited, etc. for trace-ability and/or regulatory reasons. Additionally or alternatively, the used chunks may be stored and/or displayed responsive to an error or other undesired condition identified with the LM or the response to the current prompt.

The response validator 270 is configured to check the accuracy of the responses obtained from the LM. The response validator 270 may include various guardrails to ensure that the response is appropriate. Each prompt template may store information about the expected response (e.g., type, length, acceptable range if numeric, etc.) and the response validator 270 may execute checks stored in the prompt template and/or a set of common checks that are executed against all responses. For example, the prompt template may indicate that the response should be numeric, and if the LM returns a response that is not numeric, the response validator 270 can flag the response before storing it in the response storage 272. In some embodiments, the response validator 270 is configured to parse the response from the LM to determine if the response provided by the respondent is valid (e.g., appropriate, follows the instructions, etc.). For example, the response validator 270 may detect text indicating that the respondent's answers to the request for information are not valid. In some embodiments, the prompt manager 262 generates a prompt that indicates the response provided by the LM should be in a particular output format (e.g., to facilitate parsing the prompt and determining whether the respondent answered the request for information appropriately). The response validator 270 may reject any response for which the LM indicates the document used to extract the information was a request for information from a respondent and the response was not valid for one or more reasons.

If a response is determined to be invalid, the generative AI manager 260 may cause a request for the information to be generated. For example, an email may be created and communicated to the respondent indicating that the response was not accepted. In some embodiments, the document or portion thereof (e.g., page, question, etc.) including the incorrect response is not added to the index. In some embodiments, the response validator 270, additionally or alternatively, is configured to determine if any response was provided for a request for information. Different remediation can be performed based on whether no response was provided or if the response is invalid. For example, if no response is provided, the data extraction manager system 200 may generate a new request for information and communicate the request to the respondent, whereas if the response is invalid, the data extraction manager system 200 may indicate the chunk for processing by the one or more MMLMs 110 which may be capable of adapting to the unexpected method for responding to the request.

In response to detecting a potential error, the response validator 270 may store additional tracing information with the response from the LM. Tracing information may include the chunk identifier, the page identifier, and/or the document identifier (e.g., as stored by the chunk tracer 250) from any of the chunks that were provided to the LM as part of the retrieval augmentation process. In some embodiments, the response validator 270 may store the tracing information with all responses even if no error occurs, for example, for display or regulatory purposes.

Responses may be stored in response storage 272 and/or internal data storage 226. In some embodiments, the data extraction manager system 200 stores all data in the internal data storage 226 and there is no independent data store for the data that is being populated by the data extraction and population system 100. The response storage 272 may be of the same type or a different type from the internal data storage 226. The response storage 272 may store data in magnetic hard disk, solid state drives, optical drives, RAM, and/or any other suitable storage medium. The response storage 272 may be distributed across one or more computer system, for example, communicably connected over the network 114.

The interface manager 280 may be configured to allow interaction with the data extraction manager system 200. The interface manager 280 is shown to include a client interface generator 282, an admin interface generator 284, and APIs 286. The client interface generator 282 and/or the admin interface generator 284 may provide instructions to the one or more UI clients 102 (e.g. JavaScript, Cascading Style Sheets) that instruct the one or more UI clients 102 how to generate the user interface within a client application (e.g., an internet browser, a proprietary application, etc.). In some embodiments, the interface manager 280 can provide APIs 286 that cause various functionality of the data extraction manager system 200 to be triggered. For example, the client interface generator 282 may cause the one or more UI clients 102 to generate a user interface that includes checkboxes (e.g., to select the task or the data elements to be populated) and a button to send the request to begin processing. Upon interaction with the button (e.g., a click, etc.) the user interface may use the APIs 286 to post a request to begin processing of the selected task or data elements to be populated.

The client interface generator 282 may include instructions to generate a user interface for user centric operations. The user of the data extraction and population system 100 may also be responsible for validating the data, making decisions based on the populated data, generating reports using the data, etc. and the client interface generator 282 may focus on the user centric operations. The client interface generator 282 may provide instructions for a user interface from which particular data that is to be populated can be selected. In some embodiments, certain task includes groups of data that is to be populated. For example, a task could be "analysis number 1," which includes a particular set of data elements that is to be populated. The client interface generator 282 may provide instructions to allow the user (e.g., via the one or more UI clients 102) to add additional data elements to the list of data that is to be populated.

The client interface generator 282 may also include instructions to allow the user to select an appropriate subject of the analysis. Example subjects include, companies, people, places, or any other subject for which it would be useful to gather large amounts of data from disparate sources. For example, a task may be to extract data to underwrite an insurance contract with a company or to collect financial information related to a publicly traded company. The client interface generator 282 may be configured to allow the user (via the generated user interface) to run a task against several subjects (e.g., for comparison). In some embodiments, the client interface generator 282 provides instructions to generate a user interface that allows the user to schedule requests for extracting the data. For example, the data extraction may be done periodically to account for changes in the data that may have occurred and/or to allow time varying data to be displayed on trend-lines, bar charts, radar plots, etc. Additionally or alternatively, the client interface generator 282 may allow the user to schedule multiple subjects to be processed at different times (e.g., to avoid initializing additional cloud computing resources and being charged peak rates).

In some embodiments, instructions communicated to the one or more UI clients 102 from the client interface generator 282 include the ability to view errors that have occurred during the processing of a task. For example, errors detected by the response validator 270 may be displayed on the UI along with any tracing information that may be stored by the chunk tracer 250 with the retrieved chunks used by the LM.

The admin interface generator 284 may have much of the same functionality as the client interface generator 282, for example, with additional configuration ability. For example, the instructions provided by the admin interface generator 284 may allow for the chunk size to be configured during processing. Additionally or alternatively, the admin interface generator 284 may change the parameters (e.g., weighting of a distance metric or a match metric) of the semantic searcher 264 and/or the keyword searcher 266 to adjust how the chunks are retrieved.

The enabling services 290 provide various enabling services, according to some embodiments. The enabling services 290 are shown to include a deployment manager 292, a system monitor 294, and a security manager 296. The components of the enabling services 290 together ensure smooth operation of the data extraction manager system 200 and the data extraction and population system 100.

The deployment manager 292 may be configured to allow developers to deploy new versions of the data extraction manager system 200 while maintaining the data extraction manager system 200 operational. Deployments of the data extraction manager system 200 may be container based, allowing the data extraction and population system 100 to scale the number of servers implementing the data extraction manager system 200 to scale as user demand changes. Requests for processing may be communicated to a first version of the data extraction manager system 200 while an updated second version of the data extraction manager system 200 is generated (e.g., initiated). Once the second version of the data extraction manager system 200 is fully operational, the first version may be decommissioned.

The system monitor 294 may be configured to monitor the operations of the data extraction and population system 100. For example, the system monitor 294 may monitor the request queue and/or memory usage and decide if additional computing environments should be provisioned. For example, the system monitor 294 may determine to add computing resources to the data extraction manager system 200, purchase additional processing or prioritized processing of the OCR system 106, an LM (e.g., of the one or more LLMs 108 and/or the one or more MMLMs), or the text embedder 112. In some embodiments, the system monitor 294 is configured to automatically provision the additional computational power. Additionally or alternatively, the system monitor 294 may generate alerts indicating that the queue is large or processing could otherwise be improved with additional resources. The alerts may be displayed on the admin interface generator 284.

In some embodiments, the security manager 296 is configured to secure data stored within the data extraction manager system 200. The security manager 296 may maintain login information with the request identifiers that are associated with a particular user. In addition, the security manager 296 may associate various roles (e.g., user, admin, developer) with a login.

The security manager 296 may include a filtering tool that is remote from the end user and provides customizable filtering features to each end user. The filtering tool may provide customizable filtering by filtering access to the data.

The filtering tool may identify data or accounts that communicate with the server and may associate a request for content with the individual account. The system may include a filter on a local computer and a filter on a server. The filtering tool may identify information or accounts that communicate with the server and associate a request for content with the individual account. The system may include a filter on a local computer and a filter on a server.

Figure 3:
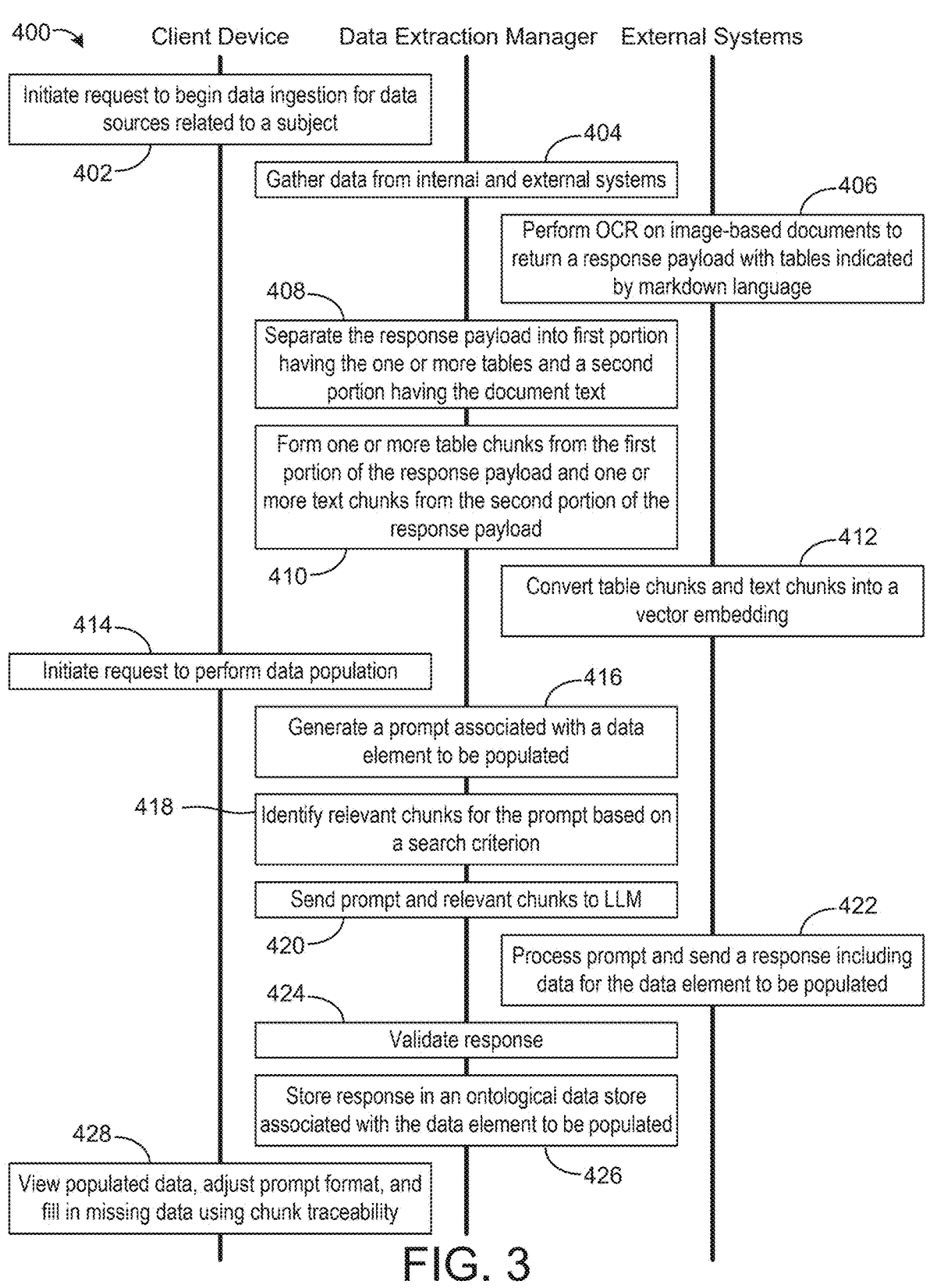
FIG. 3 is swim lane diagram illustrating steps within a method for data extraction and population including the components that perform the steps, according to some embodiments.

FIG. 3 shows a swimlane diagram 400 illustrating certain operations within a method for data extraction and population and indicating the components or systems that perform the steps, according to some embodiments. The first swimlane is labeled "client device" and may refer steps that are performed by a user of the data extraction and population system 100, for example, using the one or more UI clients 102. The second swimlane is labeled "data extraction manager" and may refer to steps that are performed by the data extraction manager system 200. The third swimlane is labeled 'external systems" and may represent steps that are performed by the OCR system 106, the LM, or the text embedder 112. In general, the flow of the swimlane diagram 400 is from top to bottom. However, some steps can be performed in different orders and/or in parallel.

The client device may initiate request to begin data ingestion for data sources related to a subject (e.g., topic, company, person, place, etc.) in step 402. A user may, from the one or more UI clients 102, select a task, one or more data elements to be populated, and/or a subject about which to populate the data. The user interface may activate one of the APIs 286 of the interface manager 280, causing the data extraction manager system 200 to begin processing the request. The data extraction manager system 200 may gather data from internal and external systems (e.g., the one or more data sources 104) in a step 404. For example, data may be gathered using the data scraper 224 as described herein. The external systems (e.g., in this case the OCR system 106) may perform OCR on image-based documents to return a response payload with tables indicated by markdown language in operation 406. For example, some of the gathered documents may be image-based (e.g., a PDF) that require conversion to plain text, while other documents may be already text based (e.g., from a website, etc.). The OCR system 106 ensures that text and tables are in a machine-readable format prior to further processing.

The data extraction manager system 200 may separate the response payload into a first portion having the one or more tables and a second portion having the document text in the step 408. In some embodiments, the step 408 is performed by the markup decoder 244. The markdown provided by the OCR system 106 may use symbols to represent a tabular structure (e.g., the vertical bar or pipe character, 'I' may indicate the start of a table row and a new column within that row). The markup decoder 244 may search for certain patterns in the plain text (e.g., with markdown symbols) to determine where a table begins. In some embodiments, a text-based search or regular expressions can be used with wildcards in order to identify a table in plain text. For example, regular expression '\|.*?\|\n\n' may be used to find text (e.g., data, etc.) that is part of a table. After finding a row from a table, the portion of the table may be moved into another entry of the data store (e.g., the internal data storage 226). After this process, the plain text (e.g., the first portion of the response payload) may have the tabular information removed, and the second portion of the response payload may have only the tabular information.

One or more table chunks from the first portion of the response payload and one or more text chunks from the second portion of the response payload are formed in step 410. For example, the table chunker 246 and the text chunker 248 may be used to generate table chunks and/or text chunks as described herein. Step 410 may include generating the table chunks that include the whole table, or a number of rows or columns of the table. Text chunks may include a number of characters, words, or tokens (e.g., 2000 characters, 500 words, 1000 tokens, etc.). In some embodiments, the token length is optimized based on a trade-off between the amount of information that is communicated to the LLM 108 (e.g., related to the cost, number of computations, or energy usage) and the accuracy of the result.

In some embodiments, the table chunks and text chunks are converted into a vector embedding in step 412. For example, the data extraction manager system 200 may use the text embedder 112 to generate a vector embedding of the table chunks and/or text chunks. Embedding the chunks may convert the text into a vector or array of numbers that represent the semantic meaning of the text. The table chunks and the text chunks may be converted into vector embeddings and stored in the index for semantic search during retrieval augmentation. Alternatively, only the text chunks are converted into vector embeddings, and the table chunks may be searched by text-based keyword search of the header column and/or the first row. After step 412 is performed, the ingestion process (e.g., the gathering and preparation of documents for the RAG system of the data extraction and population system 100) may be complete and the data extraction and population system 100 ready to respond to requests for data population.

In step 414 of the swimlane diagram 400, the user, by way of the one or more UI clients 102, may initiate request to perform data population. For example, the user may choose one or more data elements to populate, develop an ontology or data model, or otherwise indicate what data is to be extracted from the documents prepared in the ingestion process before initiating the request. In some embodiments, the request to begin data ingestion of step 402 and the request to perform data population of step 414 are included together, and the other components of the data extraction and population system 100 perform all steps to extract the data without user interaction.

The steps 416-426 of the swimlane diagram 400 describe how one or more data elements are extracted using a single prompt. In some embodiments, the steps 416-426 are repeated for a number of prompts to extract a number of data elements requested by the user. The steps 416-426 may be performed sequentially, in parallel, or in a combination of both sequential processing and parallel processing.

In step 416 a prompt associated with a data element to be populated may be generated. Prompt generation may be performed by the prompt manager 262 and may include selecting an appropriate template prompt for the data element from the internal data storage 226. The swimlane diagram 400 may continue with identifying relevant chunks for the prompt based on a search criterion in step 418. For example, the semantic searcher 264 and the keyword searcher 266 may generate scores indicative of the relevance for the various chunks indexed in step 412. Separating the tabular information from the text information, among other advantages, allows the table chunks and text chunks to be searched differently. For example, certain prompts may only search for table chunks by keyword, while other prompts may search based on a weighted score of both a semantic search process and a keyword search process. Step 418 may include identifying all chunks for which the generated score is exceeds a threshold (e.g., less than a threshold for a distance metric or greater than a threshold for a similarity score) or choosing a number of the highest scoring chunks. The identified chunks or portions of documents associated with the chunks may be augmented with the prompt in step 420 and sent (e.g., communicated), to the LM (e.g., of the one or more LLMs 108 and/or the one or more MMLMs).

In some embodiments, step 422 includes processing the prompt and communicating a response including data for the data element to be populated. For example, the LM may send the response to the data extraction manager system 200. The response may be validated in step 424. Accuracy of the responses obtained from the LM may be checked by the response validator 270. Each prompt template may store information about the expected response (e.g., type, length, acceptable range if numeric, etc.) which may used to determine if the response is appropriate for the type of data requested by the response. For example, in step 424, if a result is expected to be numeric, it is possible to check the semantic meaning of the response and determine if it is a number. Errors, for example, no response and/or data flagged in step 426 may be subjected to additional processing. For example, the identifier of the chunks identified in step 418 or the document and page of the source information for the chunk may be stored with the prompt so the user can trace the reason for the response and validate the data or note the reason for the error and populate the data manually.

After validation in step 424, the data of the response may be stored in an data store associated with the data element to be populated. For example, the data may be stored as a key value pair where the data element is the key, and the value is the response from the LM generated in step 422. Stored data may be delivered to a user interface and may be viewed by the user in step 428. In the event of an error, the user may adjust prompt format, and/or fill in missing data using chunk traceability in step 428.

FIGS. 4-7 show various flows of operations representing various aspects of the present disclosure. Each of the flows of operation may illustrate all or a portion of the process of extracting data using a large language model with retrieval augmentation, according to some embodiments. FIGS. 4-6 may emphasize various aspects of some embodiments and therefore some steps (e.g., operations) may be omitted from the flow of operations, the flow of operations may start after some steps have been completed, may end assuming some operations are performed after completing the flow of operations. In particular, FIG. 4 is related to improvements to both data extraction using a large language model and document retrieval by appropriate processing of both tabular and textual data within a RAG framework; FIGS. 5A-C are related to improvements to accuracy by allowing parameters of the retrieval process to be associated with a particular prompt (e.g., query parameters are associated with a prompt or request to extract particular information, a data element, etc.); and FIG. 6 is related to providing traceability to source documentation within the RAG framework, allowing a user to see exactly where information is sourced.

FIG. 4 shows a flow of operations 500 for coordinating data extraction and population, according to some embodiments. The flow of operations, for example, may be performed by the data extraction manager system 200 of the data extraction and population system 100. The flow of operations 500 may include receiving a response payload that includes document text of the document and one or more tables of the document represented using markdown language in operation 502. The response payload may be generated from an optical character recognition tool (e.g., the OCR system 106). The data extraction manager system 200 may receive from the OCR system 106 a response payload with tables inline with the text using a markdown language. For example, the first appearance of the markdown symbol indicates the start (or top) of a table and a second appearance of the same markdown symbol indicates the end (or bottom) of the table. The markdown symbols may also indicate a first (e.g., left) side of the table and a second (e.g., right) side of the table. Markdown symbols (e.g., within text) may provide characteristics of the table. The markdown system may provide information to the system, so the system may render the table. For example, the vertical bar or pipe character, '|', may be used to mark the start of a new column within a row of the table, and the vertical bar followed by a newline character (e.g., '|/n') may be used to represent a new row. The markdown language may also use hyphen characters, '-', to separate a header row from a content row within a table. When analyzing the position of each cell, the system may consider each cell as having a single row of text, regardless of the number of lines of text in each cell. Additionally or alternatively, the response payload from the OCR system 106 may use JSON to indicate the location of the tabular data. A component of the data extraction manager system 200, for example, the OCR manager 242, may convert JSON into a format in which the tables are represented by markdown symbols, which can be received by the processors for further processing during later operations of the flow of operations 500.

The flow of operations 500 may include separating, using the markdown language, the response payload into a first portion having the one or more tables and a second portion having the document text in operation 504. The operation 504 may be performed by the markup decoder 244. During operation 504 certain patterns in the plain text may be found (e.g., with markdown symbols) to determine where a table begins. For example, the regular expression '\|.*?\|\n\n' may be used to find text (e.g., data, etc.) that is in a row of a table. After finding a row from a table, the markup decoder 244 may generate a new entry (e.g., a location to store the first portion of the response payload having the tabular data) in the internal data storage 226 (e.g., a table entry) to store the rows of the table. The rows of the table may be cut from the plain text and moved to the table entry until the next text that does not satisfy the regular expression. After this process, the plain text (e.g., the second portion) may have the tabular information removed (e.g., and be ready to be broken into text chunks) and the table entry or first portion may have the tabular information.

The flow of operations 500 may include forming, by the one or more processors using a chunking methodology, one or more table chunks from the first portion of the response payload and one or more text chunks from the second portion of the response payload in operation 506. The operation 506 may be performed by the table chunker 246 and text chunker 248 as described with reference to those components of the data extraction manager system 200. For example, the table chunks may include a fixed or adaptive number of rows, the entire table, etc. and the text chunks may include a fixed or adaptive number of characters, words, etc.

The flow of operations 500 may include generating, by the one or more processors, an index for the one or more table chunks and the one or more text chunks in operation 508. Generating the index may include converting the one or more table chunks and the one or more text chunks into vector text embeddings using a text embedding model. For example, the operation 508 may be performed by the indexer 252. The indexer 252 may coordinate with the text embedder 112 to generate a vector embedding for a text chunk. Vectorization gives the text chunk numerical values that can be searched, with computational efficiency, for similarity (e.g., using a distance metric); thereby, text chunks with similar semantic content to a prompt can be identified for retrieval. By generating vector embeddings of the text chunks and/or the table chunks, an index may be created for which chunks can be searched (e.g., queried for retrieval) based on their similarity to a prompt for data extraction.

In some embodiments, the flow of operations 500 includes associating a document identifier and a page identifier associated with table chunks and text chunks. The chunk identifier, document identifier, and/or page identifier may be stored with the chunk. Advantageously, the retrieved chunks or portions of the documents (e.g., the sources used by the LM during prompt processing) may be cited for regulatory reasons, in the scenario of an erroneous response, or a response that the user of the system finds questionable.

The flow of operations 500 may include identifying a relevant table chunk of the one or more table chunks or a relevant text chunk of the one or more text chunks based on a search criterion related to a prompt for a large language model in operation 512. Identifying a relevant table chunk or a relevant text chunk may include performing a semantic search (e.g., using a distance metric to compare an embedding of the prompt to an embedding of the chunk in the index), a keyword search (e.g., by counting a number of keyword or phrase matches), or a combination of both a semantic search and a keyword search. For example, the operation 512 may be performed by the generative AI manager 260 using the semantic searcher 264 and/or the keyword searcher 266 as described herein.

The flow of operations 500 may include sending (e.g., communicating, transmitting, etc.) the prompt and the relevant table chunk or the relevant text chunk to a large language model in operation 514. For example, the operation 514 may be performed by the LM manager 268. The prompt may include a request for extracting a data element from the documents (e.g., that have been converted to text chunks and table chunks). The LM (e.g., of the one or more LLMs 108 and/or the one or more MMLMs) may generate a response to the prompt that includes the data element. The flow of operations 500 may include storing a response from the large language model to the prompt and the relevant table chunk or the relevant text chunk in the data store in operation 516. For example, the data element may be populated in the data store with the information from the response. In some embodiments, a request for the LMs (e.g., of the one or more LLMs 108 and/or the one or more MMLMs to identify the chunks used during data extraction is also provided with (e.g., as part of) the prompt. The LM may return the identifiers of the used chunks. The used chunks and/or the text or tables thereof may be displayed or reported with the extracted information. Providing the user access to the information used by the LM may allow inaccuracies and/or hallucinations by the LLM to be detected, traced, and analyzed for root cause.

FIGS. 5A-C are related to improvements to accuracy by allowing parameters of the retrieval process to be associated with a particular prompt (e.g., query parameters associated with a prompt or request to extract particular information, a data element, etc.). FIG. 5A shows a flow of operations 520 for retrieval augmentation according to retrieval parameters associated with a prompt (e.g., a request to extract particular information from one or more source documents or a request to populate particular information within a data store). The flow of operations 520 may include acquiring, by the one or more processors, an extraction prompt configured to cause a large language model to extract requested data from retrieved chunks of the one or more chunks in operation 522. The prompts and/or prompt templates may include various additional data associated with the prompt. For example, an expected data type for the extracted information may be associated with the prompt. Additionally or alternatively, one or more retrieval parameters may be associated with the prompt. In some embodiments, the retrieval parameters are used to specify specific filters, techniques, etc. for searching a RAG index. Each prompt (e.g., request to extract different information) may retrieve relevant chunks in a specific (e.g., unique, tailored, custom) manner by way of different retrieval or search parameters. For example, the operation 522 may be performed by obtaining the current prompt from the internal data storage 226 by the prompt manager 262.

The flow of operations 520 may include identifying, by the one or more processors, one or more relevant chunks according to retrieval parameters associated with the extraction prompt, the one or more relevant chunks identified from an index of one or more chunks from one or more documents, the index including vector text embeddings of the one or more chunks in operation 524. The operation 524 may be performed by the generative AI manager 260 using the semantic searcher 264 and or the keyword searcher 266. Different retrieval parameters may be used to tailor the identification of chunks for extraction of particular information. For example, a chunk type designation, a document type designation, a search type designation, regular expressions, a weighted hybrid search, and/or a search reach criterion may be used independently or in combination to customize a search. In some embodiments, more than one set of retrieval parameters is provided in a hierarchy. Subsequent sets of retrieval parameters may broaden the search criteria and be used if the relevant chunks found using the first set of retrieval parameters does not satisfy a retrieval criterion (e.g., number of chunks identified, etc.).

A chunk type designation may be used to specify if the relevant chunks (e.g., retrieved chunks or chunks provided to the LLM) are to be retrieved from table chunks, text chunks, or any other type of chunk that is referenced in the index, or a combination thereof. A document type designation may be used to specify the type of document from which the relevant chunks should originate. For example, each chunk may have an associated source document type property stored with the index. During the search (e.g., as part of the query), chunks may be filtered based on the document type. A search type designation may be used to specify if the search is to be performed using a semantic search (e.g., comparing the vector embeddings of the chunks), a keyword search, or a combination of the two search types. In some embodiments, if both semantic search and keyword search are to be used together the retrieval parameters may include weighting parameters describing how to combine the results of the keyword search and the semantic search so that an overall relevance score can be used to rank the chunks and/or compare to a threshold to determine the relevant chunks.

After one or more relevant chunks are identified, those relevant chunks may be provided to the LMs (e.g., of the one or more LLMs 108 and/or the one or more MMLMs) with the prompt. In some embodiments, a search reach criterion is also be used to provide additional chunks related to the one or more relevant chunks. The search reach parameter defines a number of chunks related (e.g., adjacent, nearby) to the one or more relevant chunks. For example, for each identified relevant chunk, the generative AI manager 260 may include all the chunks that are from the same page as the identified relevant chunk or all the chunks that satisfy the search reach criterion with the identified relevant chunk. Advantageously, in such a system the chunks generated and stored in the index can be smaller, for example, to have a concise semantic meaning for improved retrieval, and the LM is provided with contextual information adjacent to the relevant chunk to help with information extraction.

The flow of operations 520 may include sending, by the one or more processors, the prompt and the one or more relevant chunks to a large language model in operation 526. For example, the operation 526 may be performed by the LM manager 268. Advantageously, the high degree of specificity provided by the retrieval parameters (e.g., while executing a query) will reduce the number of computations necessary to complete the search and retrieve the relevant documents for the LM, provide information to the LM with increased relevance, and may reduce the amount of data that is sent over the network to the LM. The flow of operations 520 may include storing a response from the large language model to the extraction prompt and the one or more relevant chunks in operation 528. For example, data may be stored in internal data storage 226 allowing a user of the data extraction manager system 200 access to the extracted information (e.g., data elements, properties of an ontology, etc.) for viewing, report generation, etc.

FIG. 5B shows detailed operations included in some embodiments of the operation 524. For example, more than one set of retrieval parameters may be associated with a prompt or data to extract. A hierarchical list of retrieval parameters may be used to iteratively broaden the search until the relevant chunks satisfy a retrieval criterion (e.g., identified more than a threshold number of chunks, etc.). The operation 524 may include identifying, by the one or more processors, the one or more relevant chunks according to a first set of retrieval parameters in operation 530.

In some embodiments, the operation 524 includes determining, by the one or more processors, whether the one or more relevant chunks satisfy a retrieval criterion in operation 532. If the data scraper 224 was not able to find many documents from the one or more data sources 104 a small number of chunks or no chunks may be identified in operation 530. If no chunks are provided to the LM the LM may be unable to extract the requested information. The retrieval criterion may be based on a number of chunks determined to provide consistently accurate responses from the LM. If the retrieval criterion is satisfied at block 534, the flow may continue to sending the one or more relevant chunks to the large language model (e.g., in operation 526 of the flow of operations 520). If the retrieval criterion is not satisfied at block 534, a second set of retrieval parameters may be used, potentially to identify more relevant chunks and satisfy the retrieval criterion in operation 536. The operations 532-536 may continue with broadening retrieval parameters until the retrieval criterion is satisfied. During the second and subsequent identification steps, it is contemplated that the search may be performed relative to the previous search for computational efficiency. For example, if the second search adds table chunks to a search that previously included only text chunks, it is not necessary to search the text chunks again with the same retrieval parameters.

FIG. 5C shows a flow diagram for the operation 524 in more detail, according to some embodiments. In some embodiments, the retrieval parameters may include a chunk type designation. The chunk type designation may be used to cause filtering, by the one or more processors, of one or more table chunks having tabular data from one or more text chunks having text data according to a chunk type designation in an operation 538. The chunk type designation may indicate that one or more relevant chunks are to be retrieved from the one or more table chunks, the one or more text chunks, or both the one or more table chunks and the one or more text chunks. Operation 538 may reduce the number of candidate chunks that are provided to the LM (e.g., if the chunk type designation specifies only table chunks or only text chunks). In some embodiments, the retrieval parameters may include a document type designation. The document type designation may be used to cause filtering of one or more chunks according to a document type designation in an operation 540. The document type designation may indicate one or more document types from which the chunks are to originate, thereby reducing the number of candidate chunks that may be provided to the LM (e.g., if the document type designation does not indicate all document types).

In operation 542, the remaining candidate chunks may be searched according to a search type designation indicating the one or more relevant chunks are to be searched using a semantic search, a keyword search, or both the semantic search and the keyword search. Performing a semantic search may include generating, by the one or more processors, distance metrics between the vector text embeddings and a vector text embedding of the extraction prompt in operation 544, and performing a keyword search may include generating, by the one or more processors, keyword scores between the one or more chunks and a keyword associated with the extraction prompt in operation 546. For example, a keyword score may be equal to a number of keyword matches or a function thereof. Additionally or alternatively, regular expressions can be used during a keyword search. In some embodiments, weighting parameters are provided as part of the retrieval parameters. The weighting parameters may be used to define a weighted function of the keyword scores and the distance metrics of the candidate chunks by which to rank or select the relevant chunks. For example, the operation 524 may include comparing, by the one or more processors, a weighted function of the keyword scores and the distance metrics of the one or more chunks according to weighting parameters in an operation 548.

In some embodiments, a search reach criterion is also be used to provide additional chunks related to the one or more relevant chunks as shown in operation 550. The operation 524 may include identifying, by the one or more processors, one or more reached chunks that satisfy a search reach criterion with a relevant chunk. The search reach criterion may define a number of chunks related (e.g., adjacent, nearby) to the one or more relevant chunks that are to be provided to the LM. For example, for each identified relevant chunk, the generative AI manager 260 may include all the chunks that are from the same page as the identified relevant chunk or all the chunks that satisfy the search reach criterion with the identified relevant chunk. Advantageously, in such a system the chunks generated and stored in the index can be smaller, for example, to have a concise semantic meaning for improved retrieval, and the LM is provided with contextual information adjacent to the relevant chunk to help with information extraction.

FIG. 6 shows a flow of operations 560 related to providing traceability to source documentation within the RAG framework, according to some embodiments. The flow of operations 560 may include generating, by one or more processors, a plurality of chunks from a document in operation 562. The plurality of chunks may include table chunks, text chunks, or any other type of chunk suitable for a data extraction process. For example, the plurality of chunks may be generated by the table chunker 246 and the text chunker 248.

In some embodiments, the flow of operations 560 includes associating, by the one or more processors, (i) a document identifier for the document and a page identifier or (ii) a chunk identifier for each chunk of the plurality of chunks in operation 564. The document identifier and page identifier or the chunk identifier allow source content of the chunk to be retrieved under certain scenarios (e.g., responsive to an error, during report generation, etc.). The document identifier and page identifier or the chunk identifier may be associated with a chunk by storing the information in a database with the chunk. For example, the data model for a chunk may include properties for storing the document identifier, page identifier, and/or chunk identifier. The operation 564 may be performed by the chunk tracer 250 during the data ingestion process.

Source documents (e.g., from the one or more data sources 104) may update or change over time. Therefore, it may be advantageous to periodically obtain documents for a specific task (e.g., data population job, etc.). However, if the documents change after some data has been extracted, traceability may be lost. In some embodiments, the flow of operations 560 includes maintaining, by the one or more processors, a usage history and/or a version history for each chunk of the plurality of chunks in operation 566. For example, each time a document changes, new chunks may be created, and the new chunks may store each revision of their respective information or new chunks may be created. Using the revision history and usage history, it may be possible to provide the date and the content of a document that was used to extract the information, or if new chunks are generated when a document changes, the old chunks may be stored (e.g., for traceability), but decommissioned (e.g., no longer searched for retrieval purposes). In addition, the usage history of chunks or the number of times a chunk has been used (e.g., usage counts) may be displayed on a UI to determine which of the one or more data sources 104 are often used for information extraction. For example, the usage history may allow one to optimize the one or more data sources 104, potentially eliminating subscriptions to less useful of the one or more data sources 104. The chunk tracer 250 may perform the operation 566.

In some embodiments, the flow of operations 560 includes identifying, by the one or more processors, one or more relevant chunks from the plurality of chunks based on a search criterion related to a prompt for a large language model, wherein the prompt includes a request to extract particular information using the one or more relevant chunks in operation 568 (e.g., as performed by the semantic searcher 264 and/or the keyword searcher 266). The one or more relevant chunks may be combined with a prompt for the LM to extract particular information from the chunks (and therefore from the source documents). The flow of operations 560 may include recording, by the one or more processors, a timestamp for each chunk used by the large language model in operation 570. As the one or more chunks are identified for retrieval a timestamp may be associated with the chunk (e.g., stored with the chunk) indicating when the relevant chunk was chosen for retrieval. In some embodiments, the timestamps allow traceability by comparing the timestamp a chunk was used to the version history of the chunk.

The flow of operations 560 may include transmitting a prompt to the large language model in operation 572. The prompt may include a request to extract particular information using the one or more relevant chunks and the prompt may also include the one or more relevant chunks. In some embodiments, the prompt may also include request for the large language model to identify used chunks of the one or more relevant chunks used to extract the particular information. To provide traceability each chunk may be given a unique identifier (e.g., a chunk identifier, a document and page identifier, etc.) and the LM can include its response the identifier of the chunks used during processing. The identifiers provided to the LM may be globally unique or may be unique only to the current prompt (e.g., if 23 chunks are provided to the LM, the integers 1-23 may be used as unique identifiers related to the scope of that prompt). In some embodiments, the prompt may also include a request for the LM to report any errors encountered by the LM.

The flow of operations 560 may include storing the particular information from a response to the prompt from a large language model with (i) the document identifiers associated with the one or more used chunks and the page identifiers associated with the one or more used chunks or (ii) the chunk identifiers for the one or more used chunks in operation 574. The document identifiers, page identifiers, and/or chunk identifiers may be used to provide an association between the extracted, particular information and the source documentation. The association may be used to provide traceability between the data elements populated with the particular information and the source documentation, allowing for error correction and citation generation in user interfaces and or generated reports.

The flow of operations 560 may include generating, by the one or more processors, a user interface including the particular information and/or a citation to the document generated from (i) the document identifiers associated with the one or more used chunks and the page identifiers associated with the one or more used chunks or (ii) the chunk identifiers for the one or more used chunks in operation 576. For example, the interface manager 280 may create the interface to allow a user to view the extracted information with the source information (e.g., to allow for human-in-the-loop validation). The flow of operations 560 may also include generating, by the one or more processors, a citation list based on the document identifiers and page identifiers associated with the one or more used chunks in operation 578. A citation list may be used at the end of a report, presentation, or other such document that may require information sources to be cited. The citation list may also include each extracted, particular information with the citation to the source information (e.g., for regulatory purposes). Providing the user access to the information used by the LLM 108 may allow inaccuracies and/or hallucinations by the LLM to be detected, traced, and analyzed for root cause.

Figure 7:
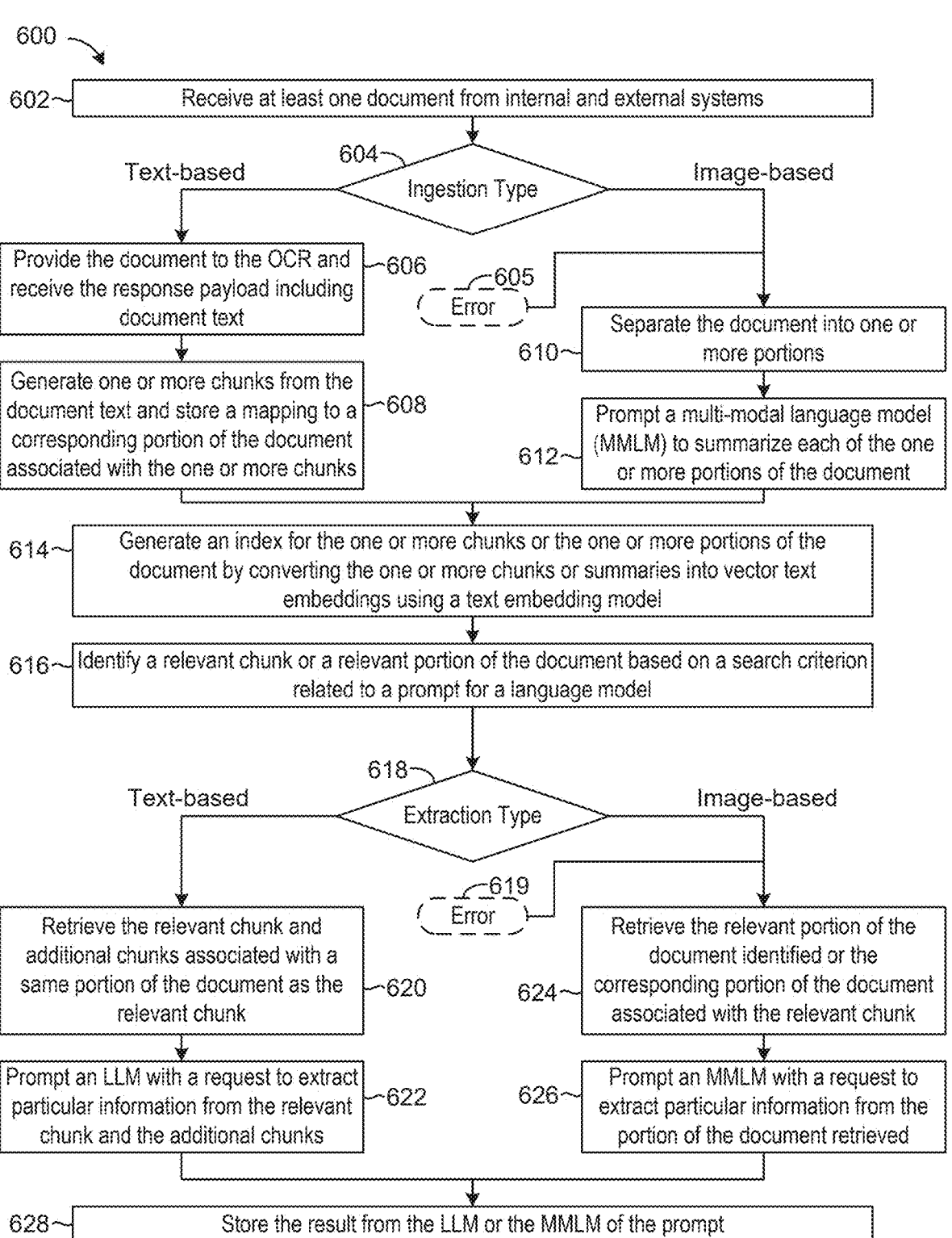
FIG. 7 is a flow of operations for extracting information using a hybrid retrieval augmented generation system with a large language model and multi-modal language model, according to some embodiments.

FIG. 7 shows a flow of operations 600 for coordinating data extraction and population using LMs (e.g., the one or more LLMs 108 and/or the one or more MMLMs 110) according to some embodiments. The flow of operations 600 shows a text-based side (e.g. on the left) and an image-based side (e.g., on the right). The path (e.g., text-based or image-based) used to traverse the flow of operations 600 may be independently chosen for ingestion and/or extraction. The path may also be independently chosen for each document, each page, each file, each task (e.g., group of data to extract), or any other appropriate level of granularity. The flow of operations 600 may be performed by the data extraction manager system 200.

The flow of operations 600 may provide several advantages. Some documents may be difficult for a text-based LLM (e.g., the one or more LLMs 108) to extract information from. Several examples of such documents are described herein. One such type of document, for example, includes selections of multiple-choice questions that are responded to by hand (e.g., with pen or pencil). The visual information included in such documents (e.g., a selection of a response, a layout, etc.) may be properly identified and used by an MMLM (e.g., of the one or more MMLMs 110) to aid in the extraction process. The image-based path using the MMLM may greatly improve extraction accuracy for some documents. The image-based path, however, may use significantly more computations than the text-based path, due in part to the larger number of parameters and general additional complexity associated with the MMLM. In addition, using the MMLM may increase network traffic by communicating larger image-based files. Advantageously, the flow of operations 600 provides the capability for the path chosen to be based on the type of document, the processing request, etc. allowing for the executing system to use the more costly (e.g., computationally) image-based path when necessary or when the benefit of the additional accuracy outweighs the added cost. Additionally or alternatively, if text-based extraction fails (e.g., the response validator 270 determines the response was missing, incorrect, etc.) the flow of operations 600 may proceed to executing the image-based extraction as a backup method.

Advantages are also provided during the ingestion phase. An index may be generated for chunks (e.g., portions of the document) using a text-based approach and/or using an image-based approach. Surprisingly, indexes created using the text-based approach may provide similar accuracy to indexes created using the image-based approach for many scenarios. Thus, by using the text-based path for document ingestion (e.g., indexing), computational expense may be significantly reduced while providing similar accuracy. During ingestion, the flow of operations 600 also provides the ability for certain documents to be ingested using the image-based approach (e.g., for certain document types and/or responsive to a failure or error in the text-based path).

The flow of operations 600 may also provide advantages to a system that is upgraded from a text-based only approach. By executing the flow of operations 600, a system for which many documents have already been ingested may obtain the advantages of using one or more MMLMs 110 without generating a new retrieval index. Instead, documents may be retrieved using text-based chunks, but an image associated with the text-based chunks may be provided to the one or more MMLMs 110. In some scenarios, data ingestion may have a very long processing time and re-embedding data (generating a new index) may have a high cost and/or be time consuming, especially if performed using the one or more MMLMs 110 in the image-based ingestion path.

The flow of operations 600 may include receiving at least one document from internal and/or external systems in operation 602. For example, the data manager 220 may receive (e.g., obtain, acquire, get, etc.) a document from the one or more data sources 104. The document may be of any of the types described herein. For example, the document may be a file, record, report, article, form, data, application, questionnaire, etc.). The document may include text, tables, columns, rows, charts, graphics, images, and/or other content. The document may be image-based, include text encoded for computer readability (e.g., plain text), and/or a combination of image-based and plain text.

In some embodiments, the flow of operations 600 includes a decision 604 to determine if the desired ingestion type is text-based or image-based. For example, the ingestion manager 240 may determine the desired ingestion type. The desired ingestion type may be based on various criteria. In some embodiments, the ingestion type is based on the document type (e.g., image-based or text-based, file type, purpose of the document, etc.). Additionally or alternatively, the ingestion type may be based on the one or more data sources 104 from which the document was obtained. For documents indicating text-based ingestion, the flow of operations 600 may proceed to operations 606 and 608. For documents indicating image-based ingestion, the flow of operations 600 may proceed to operations 610 and 612.

The flow of operations 600 may include providing the document to the OCR and receiving the response payload including document text in the operation 606. For example, the OCR manager 242 may communicate the document to the OCR system 106 and receive the response payload from the OCR system 106. In some embodiments, the response payload may include document text and table text (e.g., using a markup language as described herein). Other indications and/or markups may be provided by the OCR system 106. For example, the payload may include an indication of handwritten characters and/or typeset. Additionally or alternatively, the payload may include an indication of the text layout and/or where figures occur within the text.

Text-based ingestion in the flow of operations 600 may include generating one or more chunks from the document text and storing a mapping to a corresponding portion of the document associated with the one or more chunks in operation 608. Chunks may refer to segments of the document text that was returned from the OCR system 106. Chunks may also include tabular data, for example, using a markup language. In some embodiments, the tabular data is separated from the document text. For example, each table may be stored in a corresponding single chunk or a number of chunks. The operation 608 may include dividing the document text into chunks of a fixed length (e.g., 500 characters, 100 words, 4 sentences, etc.). In some embodiments, the fixed length may vary by an amount to complete a portion of the text of a coarser granularity. For example, if the fixed length 500 characters for a chunk, the operation 608 may choose a larger number of characters to complete the word with the 500th character or choose a smaller number of characters, thus not including the word that would have the 500th character. The decision may be fixed (e.g., the operation 608 may always choose a smaller number of characters) or the decision may be based on the particular situation for the current chunk being processed (e.g., it may choose the smaller or larger number of characters based on which would cause the resulting chunk to be closest to a 500 character target).

The operation 608 may also include storing a mapping between a corresponding portion of the document for the one or more chunks. For example, a document identifier and/or a page identifier may be associated with each chunk. The mapping may map a chunk to a specific portion of the document that included the chunk. The portion of the document may, for example, be a page, a section, a paragraph, a line, or any other appropriate division of the document that may be retrieved based on a chunk in other operations of the flow of operations 600. In some embodiments, the operation 608 stores a mapping between a chunk and a page of the document that included the chunk. During retrieval, the mapping may be used to retrieve the page having a relevant chunk, for example, to provide to an MMLM (e.g., of the one or more MMLMs 110).

Text-based document ingestion has previously been described with the flows of operations 500 (e.g., operations 502-510) in FIG. 4 and the swimlane diagram 400 in steps (402-410) in FIG. 3. Such operations and/or other similar operations described herein (e.g., those performed by the ingestion manager 240) may replace similar operations within the flow of operations 600.

At any operation of the text-based data ingestion path (e.g., the operations 606 and 608) any error may occur (represented by error block 605). If it is determined that the error may be avoided by performing image-based processing, the flow of operations may switch paths to the image-based document ingestion including operations 610 and 612. The error represented by the error block 605 may occur in other operations of the flow of operations 600. For example, if indexing fails and the document has not undergone image-based processing, the flow of operations 600 may continue to the operation 610. Embedding failures may be detected by the text embedder 112. The indexer 252 and/or another component of the data extraction manager system 200 may request the text embedder 112 to output a comprehension score (e.g., a coherence score, etc.) to indicate whether the output of the OCR had a coherent and understandable semantic meaning. For example, a low coherence score may indicate the text from different sections of the document, from figures, etc. was included in a chunk and image-based ingestion may provide an improvement. In some embodiments, error detection is performed by the component of the data extraction manager system 200 that is executing the current operation. For example, error detection within operations 606, 608, and 614, may be performed by a corresponding instruction set of the ingestion manager 240.

For documents indicating image-based ingestion, the flow of operations 600 may proceed to operations 610 and 612. Image-based ingestion may include separating the document into one or more portions in the operation 610. A portion may refer to a page, a section, an area, and/or any portion of a document that can be individually provided to the one or more MMLMs 110. The flow of operations 600 may include prompting a multi-modal language model (MMLM) to summarize each of the one or more portions of the document during the operation 612. For example, the generative AI manager 260 may communicate a request for summarization and a portion of the document to the one or more MMLMs 110 sequentially until each of the portions have been summarized. In some embodiments, the portion of the document is converted to an file type accepted by the one or more MMLMs 110 (e.g., an image-based file type such as a PNG) prior to being sent for summarization. In some embodiments, the summaries received from the MMLM are stored as chunks so that downstream processing of the flow of operations 600 can be performed by the same process (e.g., using the same instructions, etc.) regardless of whether a document or portion thereof was processed using the image-based path or the text-based path.

In some embodiments, the one or more MMLMs 110 are not used to perform data ingestion. Using the one or more MMLMs 110 may cause additional computations to be performed, for example, because of the larger network structure. The text-based path may be used for document ingestion in such embodiments.

The flow of operations 600 may include generating an index for the one or more chunks or the one or more portions of the document by converting the one or more chunks or summaries into vector text embeddings using a text embedding model in the operation 614. Index generation may be performed by the indexer 252. The operation 614 may include generating for each chunk a vector embedding for the text of the chunk. The vector embedding may represent the semantic meaning of the chunk. For example, the vector embedding may be generated by averaging a vector embedding for each word of the chunk. In some embodiments, context and word order may be considered when generating the vector embedding for a chunk. For example, the operation 614 may execute a network model using a transformer-based architecture to generate the embedding. Generating an index has previously been described with reference to the operation 508. The operation 508 and other similar operations described herein (e.g., those performed by the ingestion manager 240 including the indexer 252) may replace similar operations within the flow of operations 600.

The operations 602-614 of the flow of operations 600 may describe document ingestion. After documents have been ingested, the extraction portion of the flow of operations 600 may be used to extract data from the documents (e.g., that may have been converted to chunks during the ingestion process). Extraction may begin with retrieving relevant chunks and/or portions of the documents. Extraction may also be performed with either of two paths (e.g., a text-based path and an image-based path).

The flow of operations 600 may include identifying a relevant chunk or a relevant portion of the document based on a search criterion related to a prompt for a language model. In some embodiments, a prompt that is to be sent to an LM (e.g., the one or more LLMs 108 and/or the one or more MMLMs 110) is converted into a vector embedding. For example, the same embedding model used to generate the index during the operation 614 may be used during the operation 616. After the prompt has been embedded, the vector embedding of the prompt may be compared to the vector embeddings of the index (e.g., for the chunks and/or the portions of the document that were ingested). The chunks and/or portions of the document having embeddings that satisfy a matching criterion with the prompt embedding or those that have the highest matching score (e.g., the lowest distance metric) to the prompt embedding may be identified as relevant and used in later processing. Additionally or alternatively, the keywords (e.g., from the prompt, etc.) may be used to identify relevant chunks and/or portions of the document. For example, keyword and/or regular expression searches may be performed on the chunks and/or the summaries of the portions of the document. Those chunks (and/or summaries) having the highest keyword frequency or having a keyword frequency above a threshold may be identified as relevant in operation 616. Identifying relevant chunks has previously been described with reference to operations 512 of FIG. 4, the operation 524 of FIGS. 5A-C, and operation 568 in FIG. 6. Such operations and other similar operations described herein (e.g., those performed by the semantic searcher 264 and/or the keyword searcher 266) may replace similar operations within the flow of operations 600.

In some embodiments, the flow of operations 600 includes a decision 618 to determine if the desired extraction type is text-based or image-based. For example, the generative AI manager 260 may determine the operational path to perform data extraction. The desired extraction type may be based on various criteria. In some embodiments, the extraction type is based on the document type (e.g., image-based or text-based, file type, purpose of the document, etc.). Additionally or alternatively, the extraction type may be based on the one or more data sources 104 from which the document was obtained. In some embodiments, the extraction type is based on the chunk that is identified as relevant in the operation 616. For example, the ingestion manager 240 may label each chunk during document ingestion to indicate whether the chunk should be processed using the text-based path or the image-based path. For chunks or portions of the document indicating text-based extraction, the flow of operations 600 may proceed to operations 620 and 622. For documents indicating image-based ingestion, the flow of operations 600 may proceed to operations 624 and 626.

Text-based extraction in the flow of operations 600 may include retrieving (e.g., getting, obtaining, etc.) the relevant chunk (e.g., identified for retrieval in the operation 616) in the operation 620. In some embodiments, additional chunks associated with a same portion of the document as the relevant chunk are also retrieved in the operation 620. The additional chunks may be identified and/or retrieved using the mapping from the operation 608. For example, the generative AI manager 260 and/or the prompt manager 262 may perform the operation 620. In some embodiments, chunk identification and retrieval is performed in one step, for example, if the vector embedding is stored with the chunk.

Text-based extraction may also include prompting an LLM (e.g., the one or more LLMs 108) with a request to extract particular information from the relevant chunk and the additional chunks in the operation 622. Similar operations and have previously been described herein (e.g., those performed by the prompt manager 262 and/or the LM manager 268 and in the operations 514 or 526) and may replace the operation 622 within the flow of operations 600.

At any operation of the text-based data extraction path (e.g., the operations 620 and 622) any error may occur (represented by error block 619). If it is determined that the error may be avoided by performing image-based processing, the flow of operations may switch paths to the image-based data extraction including operations 624 and 626. Extraction failures may be detected by the text response validator 270 as described herein.

Image-based extraction in the flow of operations 600 may include retrieving (e.g., getting, obtaining, etc. to be passed to an LM) the relevant portion of the document identified in the operation 616 or a portion of the document corresponding to the relevant chunk (e.g., identified for retrieval in the operation 620) in the operation 624. The portion of the document corresponding to the relevant chunk may be used, for example, if the document having the relevant chunk was ingested using the text-based process. The portion of the document corresponding to the relevant chunk may be retrieved using the mapping. For example, the generative AI manager 260 and/or the prompt manager 262 may also perform the operation 620. The portion of the document retrieved may be appropriate for image-based extraction. The flow of operations 600 may also include prompting an MMLM with a request to extract particular information from the portion of the document retrieved in operation 626. For example, the prompt manager 262 and/or LM manager 268 may prompt the one or more MMLMs 110. In some embodiments, the portion of the document is converted to a file type accepted by the one or more MMLMs 110 (e.g., an image-based file type such as a PNG). In some embodiments, both the image-based portion of the document (e.g., page) and the relevant chunk (e.g., text extracted from the document) are provided to the one or more MMLMs 110. The one or more MMLMs 110, for example, may allow simultaneous input (e.g., by the same prompt) by two modalities or a first prompt may request that the MMLM store the text from the relevant chunk for consideration when responding to a second prompt that also includes the prompt to extract information and the image-based portion of the document (e.g., a second modality) associated with the relevant chunk.

Performing extraction using the image-based path (e.g., operations 624 and 626) is advantageous because it allows the information to be extracted using context including location of the text, figures, images, and other visual information. In some embodiments, the documents processed by the flow of operations 600 include forms, applications, surveys, etc. for which the document or portion thereof (e.g., page, section, etc.) includes a request for information. The document or portion thereof may also include one or more predefined responses. For example, the document or portion thereof may include multiple-choice, multiple-select, and/or ranking type questions. The one or more MMLMs 110 may be configured to recognize the selections of predefined responses from the respondent to the request for information. For example, the one or more MMLMs 110 may recognize circles around text, check marks, filled in boxes or bubbles, as a selection of the related text. In some embodiments, the MMLM is configured (e.g., trained, fine-tuned, etc.) to determine the portion of the text that represents the request for information (e.g., the question, survey directions, etc.) and determine the text that represents the predefined responses. The one or more MMLMs 110 may be configured or prompted to process (e.g., consider) this information separately when generating a response.

In some embodiments, the operation 626 includes prompting the MMLM to determine if a response was provided to the request for information in the document. If the MMLM determines that no response was provided, the flow of operations may generate a new request (e.g., an email, webform, etc.) for the respondent. The request may include the request for information and/or the request may be a reminder or an indication that no response was provided. Similar processing may be performed if the response is not appropriate of communicated using an incorrect method (e.g., circling text rather than filling in a bubble, etc.). For example, the operation 626 may also include prompting the MMLM to determine if an appropriate response was provided. The operation 626 may include generating a chain-of-thoughts prompt, first asking the MMLM to determine if a response was provided and, if a response was provided, asking the MMLM if the response was provided in an appropriate manner. After a new response is obtained from the respondent, the new response can be ingested (e.g., operations 602-614) and the extraction process (e.g., prompt) may be run again (e.g., the operations 616-626). The index and chunks for the new document (filled in request for information) may replace those created during ingestion of the incorrect or incomplete document.

In some embodiments, the flow of operations 600 includes storing the result from the LLM or the MMLM of the prompt. For example, the LM manager 268 may receive a response from the one or more LLMs 108 or the one or more MMLMs 110, the response validator 270 may validate the response, and/or the generative AI manager 260 may store the result in the response storage 272.

It is contemplated that systems performing the flow of operations 600 (e.g., the data extraction manager system 200) are not required to implement both text-based and image-based paths for both ingestion and extraction. At least one benefit of the disclosure herein is that the additional accuracy provided by image-based extraction using the one or more MMLMs 110 can be provided without significant computational expense incurred if all documents were ingested using the image-based approach. For example, this benefit may be provided by first storing a mapping between a chunk and a portion of a document and retrieving the original document or portion thereof (e.g., image, PDF, etc.) during extraction to be provided to the one or more MMLMs 110. Thus, only portions of documents considered relevant are processed by the one or more MMLMs 110. Additionally or alternatively, a data extraction process that already implements a fully text-based approach may not require that documents be re-ingested or the index of chunks be rebuilt.

In some embodiments, the text-based ingestion of the documents has already been performed. To save development time and overall system complexity, image-based ingestion may not be implemented by the data extraction manager system 200 and/or be available when performing the flow of operations 600. The configuration of the flow of operations 600 allows for modular approaches. For example, the decision 604 may always direct the flow of operations 600 to text-based ingestion if image-based ingestion has not yet been implemented in the data extraction manager system 200. It is noted that the decision 604 may not perform an active step.

If image-based ingestion is not implemented, operational flow may automatically flow from operation 602 to the operation 606.

Ground Truth Labeling System

Figure 8:
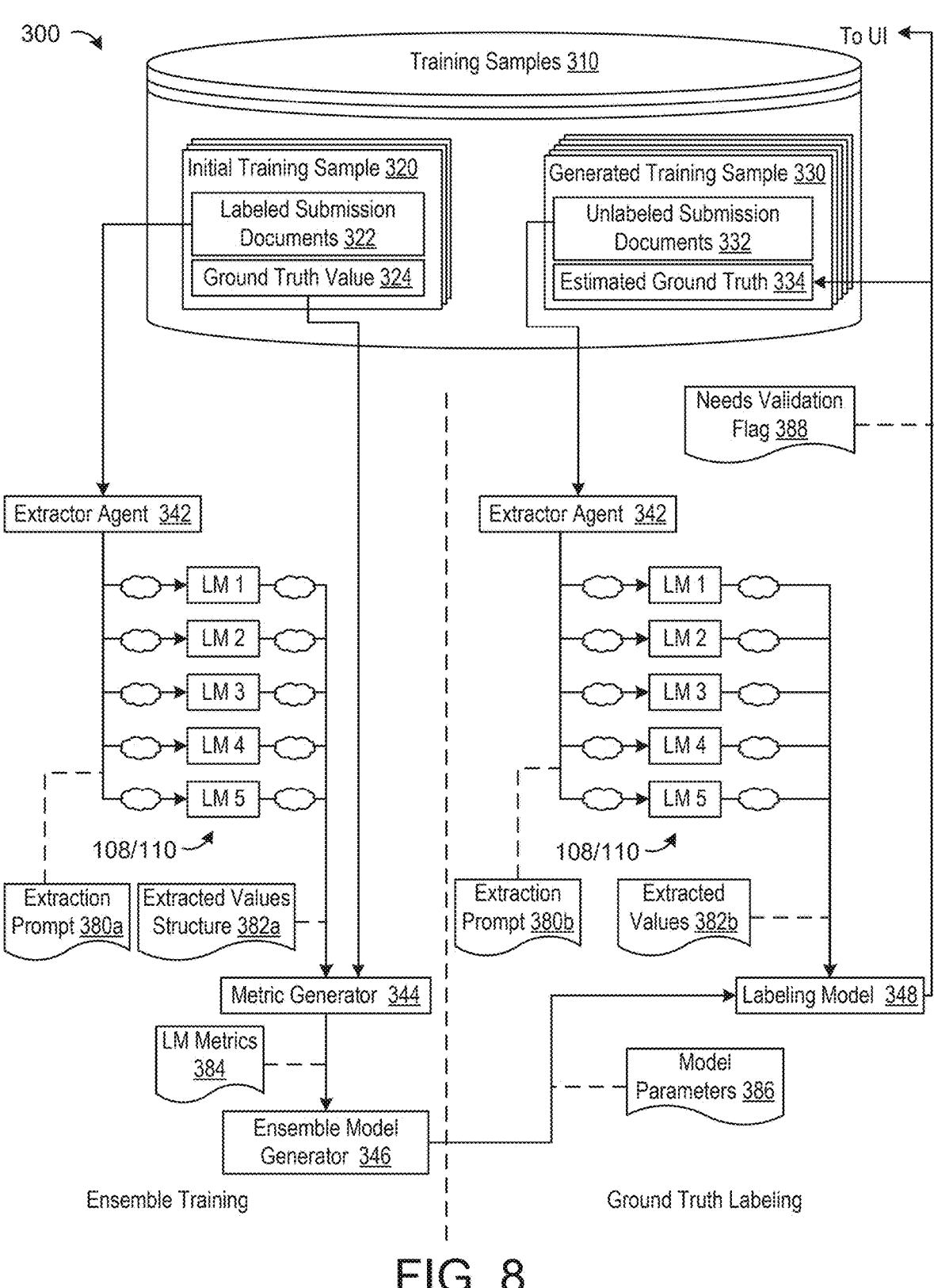
FIG. 8 is a data flow diagram for a ground truth labeling system of the data extraction and population system of FIG. 1, according to some embodiments.

FIG. 8 shows a data flow through the ground truth labeler 300 during labeling of previously unlabeled submission documents according to some embodiments. The ground truth labeler 300 is shown to include a database having training samples 310, an extractor agent 342, a metric generator 344, an ensemble model generator 346, and a labeling model 348. At a high-level overview, the extractor agent 342 prompts a number of language models (shown as LM 1-5 of the one or more LLMs 108 and/or the one or more MMLMs 110) to extract a data field from the content of labeled submission documents 322. The metric generator 344 compares the values extracted for the data field to the ground truth value corresponding to the submission from the ground truth value 324 and generates metrics or other indications of correctness that are used by the ensemble model generator 346 to generate the labeling model 348 or parameters for the labeling model 348. After the labeling model 348 is generated and/or trained, the extractor agent 342 prompts the same language models with a request to extract the data field from unlabeled submission documents 332. The results of the extraction are provided to the labeling model 348, which can generate an estimated ground truth 334 for the unlabeled submission documents 332. The initial training samples 320 and the generated training samples 330 can then be combined to form a training set for creation of an extraction prompt. Although the data flow in FIG. 8 is shown for a single data field, it should be understood that the data flow can be repeated for each data field that is to be extracted from a submission. For example, the ground truth labeler 300 may create a labeling model 348 (or a set of parameters therefor) for each of the data fields and estimate ground truth values for those data fields.

To facilitate understanding of the data flow in FIG. 8, and possible variations thereof, an exemplary embodiment of the data flow within the ground truth labeler 300 is described. This embodiment is not intended to be limiting and no step or procedure is intended to be essential to the ground truth labeler 300.

In the exemplary embodiment, the ground truth labeler 300 includes training samples 310. Training samples are received from an external system, provided by a user, and/or collected over time. The training samples include initial training samples 320 that have been previously labeled (e.g., the ground truth value for the data field is known) and generated training samples 330 for which the ground truth value is unknown and the ground truth labeler 300 seeks to estimate the ground truth value for the data field. Each initial training sample 320 corresponds to a submission and includes labeled submission documents 322 and a ground truth value 324, whereas each generated training sample 330 also corresponds to a submission but includes unlabeled submission documents 332 and a location (e.g., allocated memory, storage, etc.) to store the estimated ground truth 334 for that submission.

In the exemplary embodiment, the labeled submission documents 322 are provided to the extractor agent 342, which in turn prompts a number of language models (e.g., shown as LMs 1-5) to extract a value for the data field from the labeled submission documents 322. The entirety of the labeled submission documents 322 is provided to the language models with the prompt or as context for the prompt, for example, to avoid inaccuracies in retrieval of relevant chunks of the labeled submission documents 322 from propagating into extraction of the data field within the ground truth labeler 300. The extractor agent 342 uses extraction prompt 380*a* when prompting the language models. The extracted values from each of the language models are received and used to create the extracted values structure 382*a*. In the exemplary embodiment, the language models are included in a remote system or multiple different remote systems. The prompt and the response from the language model are therefore communicated over the network 114 as indicated by the corresponding icon in FIG. 8.

Depending on the configuration of the individual language models, the extraction prompt 380*a* is tailored for each of the language models, for example, to conform to the requirements of the language model with regard to how the labeled submission documents 322 are provided, how the API is addressed, etc.

In the exemplary embodiment, the extracted values structure 382*a* is a matrix (or similar array) with rows representing an initial training sample 320 and columns representing a language model. The extracted values structure 382*a* includes, for each combination of initial training sample 320 and language model, the value that was extracted by the language model for the data field matching the ground truth value 324 for the initial training sample 320. That is, element ij of the extracted values structure 382*a* is the value that the $j^{th}$ language model extracted from the labeled submission documents 322 of the $i^{th}$ initial training sample 320.

The metric generator 344 uses the extracted values structure 382*a* to generate metrics used by the ensemble model generator 346 in order to generate the labeling model 348 or parameters thereof. In the exemplary embodiment, the labeling model 348 uses a majority vote algorithm to determine the estimated ground truth 334. For example, the value for the data field that is extracted by the largest number of language models is used as the estimated ground truth 334. It is noted that in determining whether two values are the same, a tolerance (e.g., a similarity criterion) may be used to account for floating-point accuracy or other rounding functionality that may be performed differently by the language models (but be insignificant). While the majority vote algorithm does not require any parameters to determine the estimated ground truth 334, the model parameters are used to determine an uncertainty metric that indicates whether the estimated ground truth 334 should be separately validated.

In the exemplary embodiment, the metric generator 344 determines the value that was extracted by the largest number of language models (e.g., within some tolerance)

and thereby generates a corresponding estimated ground truth for the $i^{th}$ initial training sample 320 (e.g., row of the extracted values structure 382*a*). The metric generator 344 also generates the number, $I_i$, equal to the largest number of language models that extracted the same value for each of the $i^{th}$ initial training sample 320, and a flag, $c_i$, indicating whether the estimated ground truth for the $i^{th}$ initial training sample 320 matched the ground truth value 324 for the corresponding $i^{th}$ initial training sample 320.

In the exemplary embodiment, the metric generator 344 generates an uncertainty metric (shown as LM metrics 384) for each possible number of language models that may extract the estimated ground truth value. There is a different uncertainty metric if the estimated ground truth value wins the majority vote with a single vote (e.g., all extracted values are different and $l_i$=1) or the estimated ground truth value wins the majority vote with three votes (e.g., three language models extract the same value, $l_i$=3). In the exemplary embodiment shown in FIG. 8 with five language models, five metrics are generated for each data field, for example, one metric for each number of votes the winning estimated ground truth value could have. The uncertainty metric for a given value of $l_i$=L is based on the ratio of the number of times the estimated ground truth value matches the corresponding ground truth value 324 within the set of initial training samples 320 for which $l_i$ is equal to the given number. For example, the ratio can be described by:

$$r_L = \frac{\sum_{i:l_i=L} c_i}{n_{l_i=L}}$$

where $\sum_{i:l_i=L} c_i$ is the number of initial training samples 320 where the estimated ground truth value matches the corresponding ground truth value 324 and the number of language models that extracted the same value as the estimated ground truth (e.g., those winning the vote) is equal to $L_i$ and $n_{l_i=L}$ is the number of initial training samples 320 where the number of language models that extracted the same value as the estimated ground truth (e.g., those winning the vote) is equal to L.

The uncertainty metric is provided to the ensemble model generator 346 and used to generate a threshold (part of the model parameters 386) that is used by the labeling model 348 to determine whether the estimated ground truth 334 can be accepted or is subjected to further review (e.g., by additional language models or by human intervention within a user interface). For example, the ensemble model generator 346 compares the uncertainty metric for various values of L to a predefined value (e.g., configured by a user or otherwise specified) and determines the smallest value of L for which the uncertainty metric is below the predefined value. The smallest value of L is provided to the labeling model 348 as the threshold and is used to route an estimated ground truth 334 of a generated training sample 330 for further review if the value of L for the generated training sample 330 is less than L. The ratio itself, the Gini impurity, entropy of the initial training sample 320 for which the number of language models that extracted the same value as the estimated ground truth (e.g., those winning the vote) is equal to L, or a combination thereof can be used as the uncertainty metric.

After the labeling model 348 has been trained, which for the exemplary embodiment includes generating the threshold value of $l_i$ that is used to flag generated training samples 330 for further review, the unlabeled submission documents 332 of the generated training samples 330 can be processed. The unlabeled submission documents 332 are provided to the extractor agent 342, which prompts each of the language models (again shown as LM 1-5) with the extraction prompts 380b. In the exemplary embodiment, the extraction prompts 380b are the same as those used during ensemble training (e.g., the extraction prompts 380a). The extracted results 382b are received from the language models and provided to the labeling model 348.

In the exemplary embodiment, the labeling model 348 determines the estimated ground truth 334 by determining the value that was extracted by the most language models and determines the number ($l_i$) of language models that extracted the common value (e.g., the estimated ground truth 334). The value for $l_i$ is compared to the threshold provided by the ensemble model generator 346. If $l_i$ is smaller than the threshold, the labeling model 348 sets the needs validation flag 388 to "true" or "1," causing the estimated ground truth 334 to be presented to the user interface for validation. The generated training samples 330 that have a needs validation flag 388 set to true are not used for subsequent training until the validation flag 388 has been reset by the UI after appropriate validation.

Advantageously, the size of the training samples 310 that have ground truth values, either initially provided or estimated by the ground truth labeler 300, is increased. The large number of samples can be used by the prompt generation system 116 to improve the overall extraction process. For example, the prompt engineers creating extraction prompts have a larger set of data with which extraction prompts can be tested and the accuracy calculated. In addition, the combined set of the training samples 310 can be used for any automated prompt generation or prompt improvement process of the prompt generation system 116.

Figure 9:
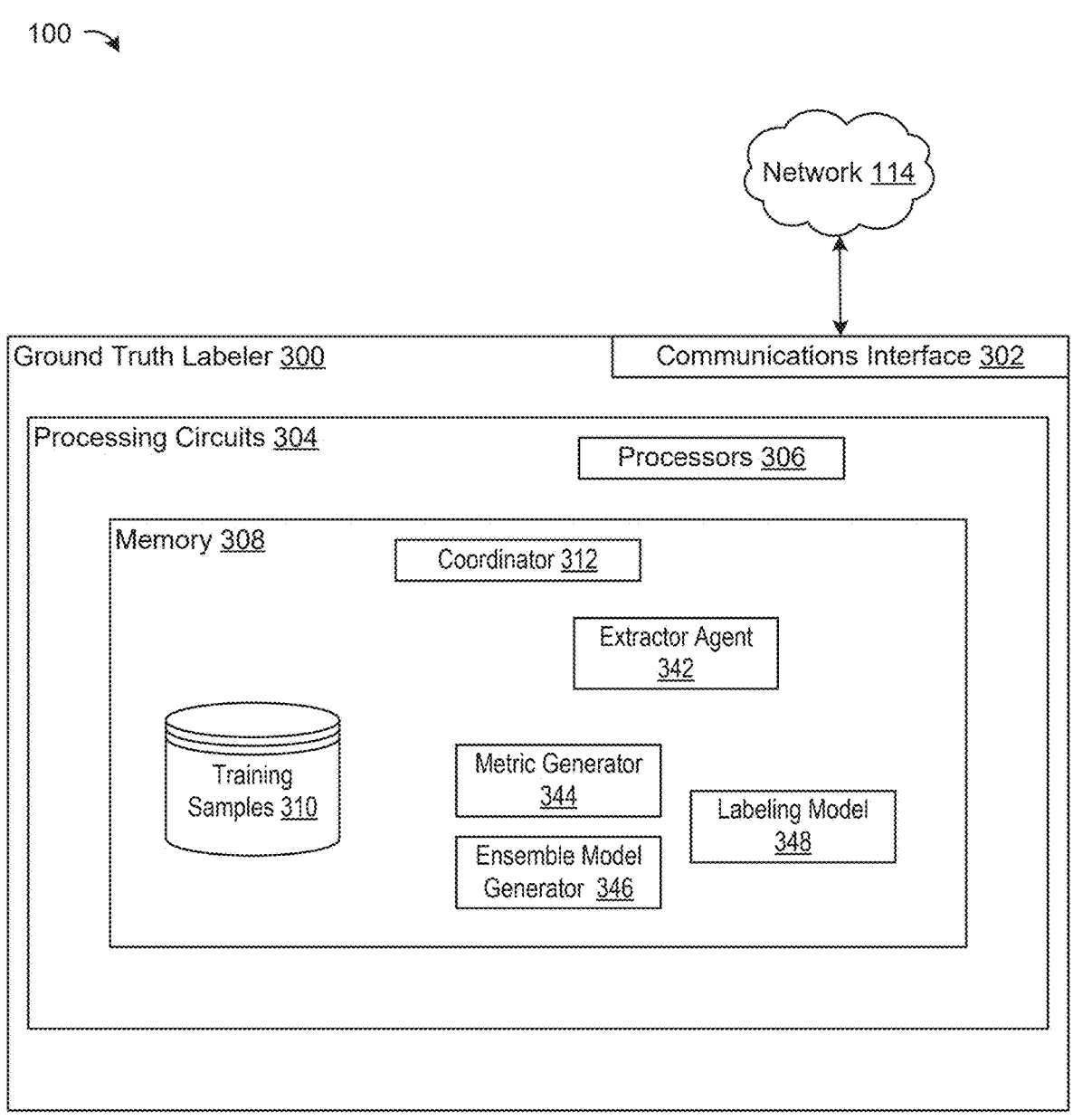
FIG. 9 is a schematic block diagram of the ground truth labeling system of FIG. 8, according to some embodiments.

FIG. 9 shows a block diagram of the ground truth labeler 300 according to some embodiments. The ground truth labeler 300 is shown to include a communications interface 302 and one or more processing circuits 304. The architectural structure of the ground truth labeler 300 may be similar to that of the data extraction manager system 200. For example, the communications interface 302 may be similar to the communications interface 202. In addition, the one or more processing circuits 304 include one or more processors 306 and memory 308. The one or more processing circuits 304, one or more processors 306, and the memory 308 of the ground truth labeler 300 may be distributed among several hardware devices (e.g., computers, server blades, processing units, graphics processing units, tensor processing units, etc.).

Similar to the data extraction manager system 200, the one or more processors 306 may be general purpose or specific purpose processors, an application-specific integrated circuit (ASIC), one or more field programmable gate arrays (FPGAs), a group of processing components, or other suitable processing components. The one or more processors 306 may be configured to execute computer code and/or instructions stored in the memory 308 (e.g., communicably coupled to the one or more processors 306) or received from other computer-readable media (e.g., CD-ROM, network storage, a remote server, etc.). The memory 308 may include one or more devices (e.g., memory units, memory devices, storage devices, etc.) for storing data and/or computer code for completing and/or facilitating the various processes described in the present disclosure. The memory 308 may include random access memory (RAM), read-only memory (ROM), hard drive storage, temporary storage, non-volatile memory, flash memory, optical memory, or any other suitable memory for storing software objects and/or computer instructions. The memory 308 may include database components, object code components, script components, or any other type of information structure for supporting the various activities and information structures described in the present disclosure.

The memory 308 is shown to include the instruction sets or circuits described with reference to the data flow in FIG. 8. For example, the memory 308 may include the training samples 310, a coordinator 312, the extractor agent 342, the metric generator 344, the ensemble model generator 346, and the labeling model 348. As described with reference to FIG. 8, the ground truth labeler 300 is configured to estimate ground truth values for unlabeled submission documents 332 in the training samples 310, thereby expanding the set of training samples 310 that can be used for generating prompts (e.g., extraction prompts used by the data extraction manager system 200).

The coordinator 312 may be configured to control the timing and flow of data through the other circuitry of the ground truth labeler 300. For example, the coordinator 312 may cause the instructions or circuits to execute in a specific order to cause the ground truth labeler 300 to label the unlabeled submission documents 332 by estimating (e.g., determining, predicting, etc.) the ground truth value for the unlabeled submission documents 332. In some embodiments, the coordinator 312 routes the information and/or outputs of other modules that are dependent on the information or use the information as an input. For example, the coordinator 312 may cause the data to flow through the ground truth labeler 300 as described by the data flow in FIG. 8.

The ground truth labeler 300 may include an extractor agent 342 configured to coordinate extraction of a data field from a number of language models (e.g., from the one or more LLMs 108 and/or the one or more MMLMs 110). Any combination and any number of the language models may be used by the ground truth labeler 300. In some embodiments, the language models used by the data extraction manager system 200 to extract a value from submission documents are the same language models as those used by the ground truth labeler 300. Alternatively, the language models used by the ground truth labeler 300 may be wholly different from those used by the data extraction manager system 200, or there may be partial overlap (e.g., some of the language models used by the ground truth labeler 300 are also used by the data extraction manager system 200).

In some embodiments, the extractor agent 342 scales based on the number of requests. For example, the ground truth labeler 300 may, in parallel, train the labeling model 348 for multiple data fields and the extractor agent 342 may provision additional computational resources to execute multiple requests simultaneously. Similarly, the extractor agent 342 may include several different versions, for example, a different version of the extractor agent 342 may be provided for each language model used by the ground truth labeler 300. Each extractor agent 342 may include the appropriate instructions, prompts, API credentials, etc. to interact with the corresponding language model for which it is responsible.

In some embodiments, the extractor agent 342 generates one or more extraction prompts 380a for the language models, including submission documents (e.g., the labeled submission documents 322 or the unlabeled submission documents 332, depending on whether the extractor agent 342 is currently operating for ensemble model training or ground truth labeling), and a request to extract a value for the data field from the submission documents. The request may include metadata for the data field. For example, the request may include the name of the data field and/or a description of the data field. In some embodiments, the extractor agent 342 uses the current version of the extraction prompt or instructions thereof used by the data extraction manager system 200. Alternatively, the extractor agent 342 may use alternative extraction prompts (e.g., customized for the language model, for larger context histories, etc.)

In some embodiments, the extractor agent 342 provides the entirety of all the submission documents for a training sample 310 to the language models. Thereby, the extractor agent 342 ensures that the language model has the necessary reference documentation including the ground truth value for training sample 310. Although the document or content having the ground truth value is sure to be provided to the language model in this scenario, a large amount of unnecessary contextual data may result in poor extraction results. Alternatively, the extractor agent 342 may provide only relevant chunks of the submission documents. For example, chunks may be provided for the submission documents similar to how chunks are generated and retrieved in the ingestion manager 240 and the generative AI manager 260 of the data extraction manager system 200. Providing only relevant chunks may allow the language model to focus on provided content while reducing token count for lower energy use and computational costs; however, errors in retrieval may be introduced into the labeling procedure.

Although the language models are described as alternative and distinct language models, it is understood that in some embodiments, the extractor agent 342 may generate additional responses by querying the same language model with different prompts (e.g., providing alternative metadata, retrieving relevant portions of the submission documents in different ways, or otherwise changing the prompt). The additional responses may be processed as if they come from a separate language model for the purposes of subsequent processing.

The response from each of the language models is retrieved or received by the ground truth labeler 300. During ensemble training, the responses to prompts including several labeled submission documents 322 are collected by the ground truth labeler 300 and provided to the metric generator 344. The responses may be stored using any suitable data structure. For example, the coordinator 312 may generate the extracted values structure 382a in the form of an object array, each element having the extracted value, an identifier for the language model that extracted the value, and an identifier for the labeled submission document 322 from which the response was extracted. As another example, the coordinator 312 may arrange the extracted values received from the language models in a matrix, table, or similar structure wherein the rows represent the initial training sample 320 and/or the labeled submission documents 322 thereof and the columns represent the language model that extracted the value.

The extracted values structure 382a is provided to the metric generator 344, where it is used to generate the language model metrics 384. The metric generator 344 may be configured to determine a number of different metrics used by the ensemble model generator 346 to determine parameters for the labeling model 348. The metric generator 344 may compare the values extracted by the language models in the extracted values structure 382a with the ground truth value 324 for the corresponding initial training sample 320. For example, if the extracted values structure 382a is an object array, the metric generator 344 adds a flag to each element of the object array indicating whether the language model of the element extracted the ground truth value 324 for the initial training sample 320 of the element. Alternatively, for example, when the extracted values structure 382a is a matrix, the metric generator 344 may generate a corresponding matrix indicating whether the language model represented by the $j_{th}$ column correctly extracted the ground truth value 324 for the initial training sample 320 corresponding to the $i_{th}$ row. In addition, the metric generator 344 may be configured to extract cumulative statistics for each initial training sample 320 and/or each language model. For example, the metric generator 344 may determine the maximum number of language models ($l_i$) that estimated the ground truth value for each of the initial training samples 320 and/or the overall accuracy of any individual language model (e.g., the fraction of the initial training samples 320 for which the individual language model matches the ground truth value 324 for the corresponding labeled submission documents 322 of the initial training sample 320).

The metric generator 344 can generate the uncertainty metric for the unlabeled submission (e.g., Gini impurity, entropy, etc.) based on a distribution of the values extracted by the plurality of language models for the unlabeled submission. Uncertainty metrics calculated by the metric generator 344 can be used to generate a threshold above which the labeling model 348 sets the needs validation flag 388. The labeling model 348 can, during estimating a ground truth value of unlabeled submission documents 332, also calculate the uncertainty metric and compare the uncertainty metric to the threshold.

In some embodiments, the metric generator 344 generates the uncertainty metric based on the distribution of the values extracted by the language models. For example, the values extracted for a particular solution may be treated as a probability mass function for which the Gini impurity and/or the entropy may be calculated. The probability of each extracted value may be assigned according to the number of language models that extracted the value. Further, the probability may also be based upon the accuracy of the language model that extracted the value.

In some embodiments, the metric generator 344 generates the Gini impurity for a training sample (e.g., an initial training sample 320 during ensemble training or a generated training sample 330 during ground truth labeling). The Gini impurity describes the impurity or heterogeneity of the extraction results of the language models used by the ground truth labeler 300. For example, the Gini impurity may be calculated by:

$$GI = 1 - \sum_{e=1}^{N_E} \left( \frac{n_e}{N_L} \right)^2$$

where $N_L$ is the number of language models (e.g., five in the exemplary embodiment), $N_E$ is the number of unique extracted values from the language models, $n_e$ is the count of the extracted values that are equal to the eth extracted value, and $N_L$ is the total number of language models used. For example, if five language models are used and two language models extract the same value (e.g., to within some tolerance) and the other three language models each extract a distinct value, then there are four unique extracted values, and GI is calculated as $(1 - 0.4^2 - 0.2^2 - 0.2^2 - 0.2^2 = 0.72)$. The Gini impurity can provide a method for comparing the uncertainty of an ensemble model. The labeling model 348 may generate a needs validation flag 388 if the impurity of a generated training sample 330 is above a given threshold. Advantageously, the impurity can be compared even when additional language models become available or if one or more of the language models are not available.

In some embodiments, the Gini impurity is modified to include a weight based on the accuracy of a particular language model. For example, $n_e$ may represent the sum of a weighted value of each language model that extracted a particular value.

In some embodiments, the uncertainty metric uses a least confidence metric based on the ratio of the number of language models that extracted the estimated ground truth value (e.g., the number of language models that contributed to the winning vote) to the total number of language models. For example, the least confidence metric can be calculated using:

$$LC = 1 - \frac{n_{max}}{N_L}$$

where $n^{max}$ is the number of language models that extracted the estimated ground truth. Using the example, from above, the uncertainty in the scenario where there are four unique extracted values would be (1−0.4=0.6). Similarly, the uncertainty metric can be based on the margin between the first and the second most likely class of the ground truth. The margin can be subtracted from one to calculate the uncertainty. For example, if four unique values are extracted from five language models, margin based uncertainty may be calculated as (1−(0.4−0.2)=0.8).

In some embodiments, the entropy of a training sample 310 is calculated. Entropy may be used for the same or similar reasons as the Gini impurity. For example, if the entropy of a generated training sample 330 is greater than a threshold value, the labeling model 348 may generate a needs validation flag 388. The entropy of a training sample may be calculated by:

$$\text{entropy} = -\sum_{e=1}^{N_E} \left(\frac{n_e}{N_L}\right) \log_2\left(\frac{n_e}{N_L}\right).$$

Using the same example as above, the entropy where there are four unique extracted values would equal 1.97 (0.58+ 0.46+0.46+0.46=1.97). Similarly, if there are three unique values, the entropy would be (0.44+0.46+0.46=1.37).

Other uncertainty metrics may also be used. For example, uncertainty may be based on the values extracted. In some embodiments, the metric generator 344 determines the variance or the standard deviation of the values extracted (e.g., for numerical values). If values are not numeric the categorical values can be first converted to a numerical representation.

In some embodiments, the ensemble model generator 346 is configured to generate parameters for the labeling model 348 that are used to determine the estimated ground truth 334 for a generated training sample 330 and whether the needs validation flag 388 should be generated for the generated training sample 330 based on the metrics generated by the metric generator 344.

In some embodiments, the labeling model 348 uses a voting algorithm to determine the estimated ground truth 334 for a generated training sample 330. As described with reference to the exemplary embodiment, the estimated ground truth 334 is based on a majority voting algorithm. A standard majority voting does not require parameters as the estimated ground truth 334 from the model is the value which was extracted by the most language models.

Alternatively, the labeling model 348 may be based on a weighted voting algorithm. The weighted voting algorithm selects an estimated ground truth 334 for a generated training sample 330 as the extracted value that has the largest associated score, where the score is equal to the sum of the weights of the language model that extracted that value. The ensemble model generator 346 may be configured to determine the weights associated with each of the language models as model parameters 386. The weights may be based on the accuracy of an individual extraction model. For example, the weights may be based upon the fraction of the initial training samples 320 that a particular language model extracted the correct corresponding ground truth value 324. In some embodiments, the weight of the language model is equal to the accuracy of the language model on the initial training samples 320. In some embodiments, the ensemble model generator 346 generates a decision tree for determining the estimated ground truth 334. For example, the decision tree may execute the weighted voting algorithm.

In some embodiments, the ensemble model generator 346 determines model parameters 386 used by the labeling model 348 to generate the needs validation flag 388. In some embodiments, the labeling model 348 generates the needs validation flag 388 by comparing an uncertainty metric (e.g., the Gini impurity or entropy) to a threshold value. The ensemble model generator 346 generates model parameters 386 that are used to calculate the uncertainty metric. For example, the ensemble model generator 346 may generate the weights used in a weighted Gini impurity or entropy.

In some embodiments, the ensemble model generator 346 generates a threshold value for the uncertainty metric (e.g., the Gini impurity or entropy) at which the needs validation flag 388 is generated. For example, the ensemble model generator 346 may determine the uncertainty threshold by finding the greatest uncertainty metric for which the accuracy on the initial training samples 320 remains above a threshold accuracy. The uncertainty threshold may be provided to the labeling model 348 as part of the model parameters 386. If the uncertainty metric of a generated training sample 330 is greater than the greatest uncertainty metric for which the accuracy on the initial training samples 320 is above the accuracy threshold, the needs validation flag 388 may be generated.

Because the number of initial training samples 320 is small, there may be a wide range for the true accuracy of the labeling model 348 under certain scenarios. The accuracy used to determine a threshold uncertainty metric may be decreased according to the number of samples used to generate the uncertainty (e.g., the number of samples having a particular uncertainty metric or a particular number of language models that identified the same estimated ground truth 334). In some embodiments, the accuracy used to determine the threshold uncertainty metric is the lower bound of an accuracy confidence range (e.g., based on a Bernoulli or binomial distribution).

In some embodiments, the labeling model 348 receives the model parameters 386 from the ensemble model generator 346 for use during labeling of the generated training samples 330 with an estimated ground truth 334. Estimating the ground truth value for the unlabeled submission documents 332 may be performed with various model configurations. For example, the labeling model 348 may include a majority vote algorithm (e.g., standard majority vote or weighted majority vote). The labeling model 348 may include a decision tree or other classification model (e.g., perceptron machine, logistic regression classifier, etc.), to determine which of the estimated values from the language models should be used as the estimated ground truth 334.

The labeling model 348 also includes a detection model that generates the needs validation flag 388. As described above, executing the detection model may include comparing an uncertainty metric to a threshold. In some embodiments, multiple uncertainty metrics are calculated by the labeling model 348 and used (e.g., Gini impurity, entropy, the number of language models that extracted the same value, and/or whether a particular language model extracted the same value as the majority). Multiple uncertainty metrics may be combined into a classification model to determine whether or not the needs validation flag 388 should be set. For example, the classifier of the needs validation flag 388 may be trained to identify situations when the estimated ground truth 334 (e.g., by majority vote, etc.) is incorrect using any of the uncertainty metrics described herein, including which language models made up the majority.

FIG. 10 shows the flow of operations 700 for increasing the size of a training data set by determining the ground truth value for unlabeled submission documents using an ensemble of language models according to some embodiments. The increased size of an augmented training data set can improve extraction accuracy by providing a greater variety of data for prompt engineering. For example, the augmented training data set may be used to identify keywords used to retrieve chunks of a submission that include the relevant portions having the information to be extracted, to generate prompts used to rank the retrieved chunks according to their relevance and/or the likelihood they include the information to be extracted, and the extraction prompt that is sent to the language model with the relevant chunks to extract the information.

Flow of operations 700 is shown to begin with receiving labeled submissions in operation 702. The labeled submissions may include (i) content of a submission including documents, web sources, emails, questionnaires, etc. (e.g., that make up an application such as for employment or for insurance protection) and (ii) ground truth values for data fields that would be extracted from the submission during processing of the submission. The data fields, for example, may include financial data, previous employers, or any other information that may be used to complete processing of the submission. For example, the labeled submissions may come from the one or more UI clients 102 or the one or more data sources 104 and be stored in the training samples 310 as initial training samples 320. The ground truth values for the labeled submissions may have been previously extracted by a human in the loop and/or similarly validated.

During operation 702, unlabeled submissions may also be received. The unlabeled submissions may have similar content (e.g., documents, web sources, emails, questionnaires, etc.) but are missing ground truth values for the submissions. For example, after completing operation 702, the ground truth labeler 300 may include labeled submissions, each having a ground truth value for a data field and unlabeled submissions without a corresponding ground truth value for the data field. It is noted that subsequent steps of the operations 700 can be performed on a data field-by-data field basis, that is, operations 704-714 may be performed for a first data field in the submission content and then repeated for a second data field in the submission content. The classification of a labeled submission and an unlabeled submission may change as the data field that is being processed changes. For example, submissions may be partially labeled and therefore have a ground truth value when processing the first data field, but be without a ground truth value when processing the second data field.

The flow of operations 700 may include prompting each language model of a set of language models to extract a value for the data field from submission content within each labeled submission in operation 704. To prompt a language model, operation 704 may include generating the text of the prompt and/or preparing the submission content that goes with the prompt (e.g., all of the submission document and/or relevant chunks). The operation 704 may also include transmitting the prompt and the submission content to the language model. For example, the operation 704 may include performing a post and/or get request to an API endpoint for the language model to send the prompt. Submission content may be included with the prompt and/or provided separately. The operation 704 may be performed by the extractor agent 342 and any of the operations described as performed by the extractor agent 342 may be included in the operation 704.

The flow of operations 700 may include recording the responses from the language models in the operations 706. For example, the operation 706 may include recording the results in a matrix or an object array (e.g., list, etc.). The operation 706 may also include comparing the values extracted from each of the language models to the ground truth value stored with the labeled submission and storing a value indicating whether the extracted value for each combination of labeled submission and language model from the set of language models matches the corresponding ground truth. In some embodiments, additional statistics related to the ability of the language model to extract the correct ground truth value from the labeled submission documents are also calculated. For example, operation 706 may include determining the accuracy of an individual language model, the Gini impurity of a labeled submission, or the entropy of a submission. The operation 706 may be performed by the metric generator 344 and any operations described as performed by the metric generator 344 may be included in the operation 706.

After the results have been received and statistics generated in operation 706, those results may be used to generate a labeling model in the operation 708. In some embodiments, the labeling model is configured to estimate (i) a ground truth value for an unlabeled submission and (ii) an uncertainty metric related to the estimated ground truth value. The operation 708 may also include generating a threshold value for the labeling model to which the uncertainty metric can be compared to determine whether the estimated ground truth value requires additional review (e.g., human-in-the-loop validation, review by additional language models, etc.). In some embodiments, the labeling model has a preconfigured form; for example, the labeling model may use a weighted voting algorithm across each of the language models to determine the estimated ground truth. The operation 708 may include generating parameters for the preconfigured form of the labeling model. For example, the operation 708 may include generating weights for a weighted voting algorithm. Parameters may also include those defining a decision tree, weights for generating a weighted Gini impurity or entropy, or the threshold to which an uncertainty metric is compared. The operation 708 may be performed by the ensemble model generator 346 and any operations described as performed by the ensemble model generator 346 may be included in the operation 708.

In some embodiments, the operations 704-708 are performed iteratively for each data field an extractor or extraction prompt is to be trained. Alternatively, all operations 704-716 are performed (e.g., an extractor or extraction prompt is generated for the data field prior to moving on to the next data field).

In operation 710, the flow of operations 700 is shown to proceed to applying the labeling model generated in the previous steps to each of the unlabeled submissions. For each of the unlabeled submissions, the operation 710 includes applying the labeling model to generate the estimated ground truth value for the unlabeled submission and the uncertainty metric associated with the estimated ground truth. In order to generate the estimated ground truth value, the language models are prompted with the appropriate extraction prompt and submission content for the relevant data field (e.g., by the extractor agent 342). The extraction responses can be received by the extractor agent 342 from the language models, aggregated, and provided to the labeling model 348, which applies the previously generated ensemble voting or weighted voting algorithm to determine the estimated ground truth value for that submission and data field. During the operation 710, the labeling model 348 also may compute an uncertainty metric related to the estimated ground truth value, for example based on the number of agreeing language models (e.g., those that extracted the value that ultimately won the vote to be the estimated ground truth value), entropy, or Gini impurity of the extraction results. In some embodiments, the operation 710 includes recording or storing the estimated ground truth value and its associated uncertainty metric for the generated training sample corresponding to the unlabeled submission document. For example, the estimated ground truth value may be added to the unlabeled submission so that it may be used as if it were labeled in subsequent training operations. The operation 710 can be executed iteratively for each data field of interest.

In operation 712, the ground truth labeler 300 is shown to evaluate those generated training samples 330 for which the computed uncertainty metric exceeds a predetermined threshold value. For example, the operation 712 may include generating an indication that the estimated ground truth value corresponding to the submission should be validated for any unlabeled submissions resulting in an uncertainty exceeding a threshold. The operation 712 may be performed by the labeling model 348 and may include other operations performed by the labeling model 348, including setting the needs validation flag 388 when the threshold is exceeded. By setting the needs validation flag 388 in the operation 712, the estimated ground truth value corresponding to the submission and data field can be indicated as being subjected to further validation. This indication may be used to trigger additional review mechanisms, such as querying supplementary language models, invoking other automated escalation protocols, or presenting the estimated ground truth value to a human-in-the-loop validation system through a user interface. Unlabeled submissions with an uncertainty metric below the threshold are considered to have sufficiently reliable estimated ground truth values and may not require further validation.

In some embodiments, unlabeled submissions that require human-in-the-loop validation (e.g., the uncertainty metric exceeded the threshold) are subjected to a supplementary procedure to facilitate human validation. For example, each language model may be prompted with a request to provide the paragraph, section, chunk, or other portion of the submission content from which the extracted value was obtained. The identified passages may be provided (e.g., in the user interface) to the human validator for rapid validation. Instead of searching the entirety of the submission content, the human validator may be able to simply read each passage supplied by the language models and determine which is correct. Labeling time is thereby reduced significantly even for unlabeled submissions that do require human interaction.

In operation 714, the flow of operations 700 advances to the generation of an extraction training set for the data field under consideration. The extraction training set may include the union of all labeled submissions and their corresponding ground truth values, along with the unlabeled submissions for which estimated ground truth values have been computed (and, where applicable, validated). In some embodiments, the unlabeled submission with the estimated ground truth value (e.g., a generated training sample 330) is used in subsequent training only if either the uncertainty metric was below the threshold or the value was validated by a human. The expanded training set may enhance the diversity and coverage of data available for model training and prompt engineering, supporting subsequent improvements in extraction accuracy and robustness. The inclusion of both initial (human-labeled and verified) and generated (ensemble-model-estimated) ground truth values may facilitate more comprehensive benchmarking, prompt optimization, and iterative system refinement.

In operation 716, the extraction training set generated in operation 714 is shown to be used to produce an optimized extraction prompt for the data field. The prompt generation process may involve analysis of the training set to identify features (document types, names, etc.), representative document structures, or keywords commonly associated with the target data field. This information may be identified and further used by the prompt generation system 116 to synthesize one or more candidate extraction prompts suitable for use with language models in future extraction tasks. The prompt generation system 116 may generate the extraction prompts with the goal of maximizing extraction performance and accuracy when applied to subsequent submission documents, may leverage the augmented training data set created by the preceding operations, and may result in an extraction prompt that is better tuned to the characteristics of the available data, thereby supporting continuous improvement of the extraction workflow.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation.

Exemplary Embodiments

An embodiment of the present disclosure relates to a method for labeling ground truth values for data fields within submission content. The method includes prompting, by one or more processors, a plurality of language models to extract a value for a data field from the submission content for a plurality of labeled submissions having a ground truth value for the data field. The method also includes generating, by the one or more processors, a data structure including an entry for each combination of a submission from the plurality of labeled submissions and a language model of the plurality of language models, the entry indicating whether the value for the data field extracted by the language model from the submission content of the submission matches the ground truth value corresponding to the data field for the submission. The method also includes determining, by the one or more processors, parameters for a labeling model configured to generate an estimated ground truth value and an uncertainty metric based for the data field on inputs including the value extracted by each of the plurality of language models. The method also includes generating, by the one or more processors, the estimated ground truth value and the uncertainty metric for an unlabeled submission by applying the labeling model to values for the data field extracted by each language model of the plurality of language models from the submission content for the unlabeled submission and responsive to the uncertainty metric for the unlabeled submission satisfying an uncertainty threshold, generating, by the one or more processors, an indication to validate the estimated ground truth value for the unlabeled submission.

In some embodiments, the unlabeled submission is one of a plurality of unlabeled training submissions used to determine an extraction prompt to extract the value for the data field.

In some embodiments, the method also includes generating, by the one or more processors, the estimated ground truth value for each training submission of the plurality of unlabeled training submissions; generating, by the one or more processors, an extraction training set including the estimated ground truth value corresponding to each training submission of the plurality of unlabeled training submissions, the plurality of unlabeled training submissions, and the plurality of labeled submissions, and the ground truth value corresponding to each of the plurality of labeled submissions; and determining a score indicating a fraction of submissions of the extraction training set for which the extraction prompt causes an extraction language model to extract the value for the submission of the extraction training set matching the ground truth value corresponding to the submission of the extraction training set.

In some embodiments, the method also includes adjusting the extraction prompt to improve the score.

In some embodiments, the extraction language model is not included in the plurality of language models.

In some embodiments, the extraction prompt is a first extraction prompt and prompting, by the one or more processors, the plurality of language models to extract the value for the data field from the submission content for the plurality of labeled submissions uses a second extraction prompt different than the first extraction prompt.

In some embodiments, the labeling model is configured to generate the estimated ground truth value based on a weighted voting algorithm and determining the parameters for the labeling model includes determining a weight for each language model of the plurality of language models in the weighted voting algorithm.

In some embodiments, the labeling model is configured to generate the uncertainty metric based on a number of language models from the plurality of language models that extracted the estimated ground truth value.

In some embodiments, the uncertainty metric for the unlabeled submission is either a Gini impurity or an entropy based on a distribution of the values extracted by the plurality of language models for the unlabeled submission.

In some embodiments, the estimated ground truth value is a value extracted by a largest number of language models of the plurality of language models and the uncertainty metric is related to the largest number of language models that extract the estimated ground truth value.

Another embodiment relates to a system for labeling ground truth values for data fields within submission content including one or more processing circuits configured to prompt a plurality of language models to extract a value for a data field from the submission content for a plurality of labeled submissions having a ground truth value for the data field. The one or more processing circuits are also configured to generate a data structure including an entry for each combination of a submission from the plurality of labeled submissions and a language model of the plurality of language models, the entry indicating whether the value for the data field extracted by the language model from the submission content of the submission matches the ground truth value corresponding to the data field for the submission. The one or more processing circuits are also configured to determine parameters for a labeling model configured to generate an estimated ground truth value and an uncertainty metric based for the data field on inputs including the value extracted by each of the plurality of language models. The one or more processing circuits are also configured to generate the estimated ground truth value and the uncertainty metric for an unlabeled submission by applying the labeling model to values for the data field extracted by each language model of the plurality of language models from the submission content for the unlabeled submission and responsive to the uncertainty metric for the unlabeled submission satisfying an uncertainty threshold, generate an indication to validate the estimated ground truth value for the unlabeled submission.

In some embodiments, the unlabeled submission is one of a plurality of unlabeled training submissions used to determine an extraction prompt to extract the value for the data field.

In some embodiments, the one or more processing circuits are also configured to generate the estimated ground truth value for each training submission of the plurality of unlabeled training submissions; generate an extraction training set including the estimated ground truth value corresponding to each training submission of the plurality of unlabeled training submissions, the plurality of unlabeled training submissions, and the plurality of labeled submissions, and the ground truth value corresponding to each of the plurality of labeled submissions; and determine a score indicating a fraction of submissions of the extraction training set for which the extraction prompt causes an extraction language model to extract the value for the submission of the extraction training set matching the ground truth value corresponding to the submission of the extraction training set.

In some embodiments, the one or more processing circuits are configured to adjust the extraction prompt to improve the score.

In some embodiments, the extraction language model is not included in the plurality of language models.

In some embodiments, the extraction prompt is a first extraction prompt and prompt the plurality of language models to extract the value for the data field from the submission content for the plurality of labeled submissions uses a second extraction prompt different than the first extraction prompt.

In some embodiments, the labeling model is configured to generate the estimated ground truth value based on a weighted voting algorithm and determining the parameters for the labeling model includes determining a weight for each language model of the plurality of language models in the weighted voting algorithm.

In some embodiments, the labeling model is configured to generate the uncertainty metric based on a number of language models from the plurality of language models that extracted the estimated ground truth value.

In some embodiments, the estimated ground truth value is a value extracted by a largest number of language models of the plurality of language models and the uncertainty metric is related to the largest number of language models that extract the estimated ground truth value.

Another embodiment is related to a system for labeling ground truth values for data fields within submission content including one or more processing circuits configured to prompt a plurality of language models to extract a value for a data field from the submission content for a plurality of labeled submissions having a ground truth value for the data field. The one or more processing circuits are also configured to generate a data structure including an entry for each combination of a submission from the plurality of labeled submissions and a language model of the plurality of language models, the entry indicating whether the value for the data field extracted by the language model from the submission content of the submission matches the ground truth value corresponding to the data field for the submission. The one or more processing circuits are also configured to generate a labeling model. The labeling model is configured to, for a corresponding submission, generate estimated ground truth value based on the value for the data field extracted for the corresponding submission by a largest number of language models and an uncertainty metric for the corresponding submission based on the largest number of language models for the corresponding submission. The one or more processing circuits are also configured to generate the estimated ground truth value and the uncertainty metric for each training submission of a plurality of unlabeled training submissions using the labeling model. The one or more processing circuits are also configured to responsive to the uncertainty metric for a training submission satisfying an uncertainty threshold, generate an indication to validate the estimated ground truth value for the training submission. The one or more processing circuits are also configured to generate an extraction training set including the estimated ground truth value corresponding to each training submission of the plurality of unlabeled training submissions, the plurality of unlabeled training submissions, and the plurality of labeled submissions, and the ground truth value corresponding to each of the plurality of labeled submissions and adjust an extraction prompt to improve a score indicating a fraction of submissions of the extraction training set for which the extraction prompt causes an extraction language model to extract the value for the submission of the extraction training set matching the ground truth value corresponding to the submission of the extraction training set.

These embodiments are illustrative only and should not be considered limiting.

What is claimed is:

1. A method for labeling ground truth values for data fields within submission content, the method comprising:
    prompting, by one or more processors, a plurality of language models to extract a value for a data field from the submission content for a plurality of labeled submissions having a ground truth value for the data field;
    generating, by the one or more processors, a data structure comprising an entry for each combination of a submission from the plurality of labeled submissions and a language model of the plurality of language models, the entry indicating whether the value for the data field extracted by the language model from the submission content of the submission matches the ground truth value corresponding to the data field for the submission;
    determining, by the one or more processors, parameters for a labeling model configured to generate an estimated ground truth value and an uncertainty metric for the data field based on inputs comprising the value extracted by each of the plurality of language models;
    generating, by the one or more processors, the estimated ground truth value and the uncertainty metric for an unlabeled submission by applying the labeling model to values for the data field extracted by each language model of the plurality of language models from the submission content for the unlabeled submission; and
    responsive to the uncertainty metric for the unlabeled submission satisfying an uncertainty threshold, generating, by the one or more processors, an indication to validate the estimated ground truth value for the unlabeled submission.

2. The method of claim 1, wherein the unlabeled submission is one of a plurality of unlabeled training submissions used to determine an extraction prompt to extract the value for the data field.

3. The method of claim 2, further comprising:
    generating, by the one or more processors, the estimated ground truth value for each training submission of the plurality of unlabeled training submissions;
    generating, by the one or more processors, an extraction training set comprising the estimated ground truth value corresponding to each training submission of the plurality of unlabeled training submissions, the plurality of unlabeled training submissions, the plurality of labeled submissions, and the ground truth value corresponding to each of the plurality of labeled submissions; and
    determining, by the one or more processors, a score indicating a fraction of submissions of the extraction training set for which the extraction prompt causes an extraction language model to extract the value for the submission of the extraction training set matching the ground truth value corresponding to the submission of the extraction training set.

4. The method of claim 3, further comprising adjusting, by the one or more processors, the extraction prompt to improve the score.

5. The method of claim 3, wherein the extraction language model is not included in the plurality of language models.

6. The method of claim 2, wherein:
    the extraction prompt is a first extraction prompt; and
    prompting, by the one or more processors, the plurality of language models to extract the value for the data field from the submission content for the plurality of labeled submissions uses a second extraction prompt different than the first extraction prompt.

7. The method of claim 1, wherein:
    the labeling model is configured to generate the estimated ground truth value based on a weighted voting algorithm; and
    determining the parameters for the labeling model comprises determining a weight for each language model of the plurality of language models in the weighted voting algorithm.

8. The method of claim 1, wherein the labeling model is configured to generate the uncertainty metric based on a number of language models from the plurality of language models.

9. The method of claim 1, wherein the uncertainty metric for the unlabeled submission is either a Gini impurity or an entropy based on a distribution of the values extracted by the plurality of language models for the unlabeled submission.

10. The method of claim 1, wherein:

the estimated ground truth value is a value extracted by a largest number of language models of the plurality of language models; and the uncertainty metric is related to the largest number of language models that extracted the estimated ground truth value.

11. A system for labeling ground truth values for data fields within submission content, the system comprising one or more processing circuits configured to:

prompt a plurality of language models to extract a value for a data field from the submission content for a plurality of labeled submissions having a ground truth value for the data field;

generate a data structure comprising an entry for each combination of a submission from the plurality of labeled submissions and a language model of the plurality of language models, the entry indicating whether the value for the data field extracted by the language model from the submission content of the submission matches the ground truth value corresponding to the data field for the submission;

determine parameters for a labeling model configured to generate an estimated ground truth value and an uncertainty metric for the data field based on inputs comprising the value extracted by each of the plurality of language models;

generate the estimated ground truth value and the uncertainty metric for an unlabeled submission by applying the labeling model to values for the data field extracted by each language model of the plurality of language models from the submission content for the unlabeled submission; and responsive to the uncertainty metric for the unlabeled submission satisfying an uncertainty threshold, generate an indication to validate the estimated ground truth value for the unlabeled submission.

12. The system of claim 11, wherein the unlabeled submission is one of a plurality of unlabeled training submissions used to determine an extraction prompt to extract the value for the data field.

13. The system of claim 12, wherein the one or more processing circuits are configured to:

generate the estimated ground truth value for each training submission of the plurality of unlabeled training submissions;

generate an extraction training set comprising the estimated ground truth value corresponding to each training submission of the plurality of unlabeled training submissions, the plurality of unlabeled training submissions, the plurality of labeled submissions, and the ground truth value corresponding to each of the plurality of labeled submissions; and determine a score indicating a fraction of submissions of the extraction training set for which the extraction prompt causes an extraction language model to extract the value for the submission of the extraction training set matching the ground truth value corresponding to the submission of the extraction training set.

14. The system of claim 13, wherein the one or more processing circuits are configured to adjust the extraction prompt to improve the score.

15. The system of claim 13, wherein the extraction language model is not included in the plurality of language models.

16. The system of claim 12, wherein:

the extraction prompt is a first extraction prompt; and prompt the plurality of language models to extract the value for the data field from the submission content for the plurality of labeled submissions uses a second extraction prompt different than the first extraction prompt.

17. The system of claim 11, wherein:

the labeling model is configured to generate the estimated ground truth value based on a weighted voting algorithm; and determining the parameters for the labeling model comprises determining a weight for each language model of the plurality of language models in the weighted voting algorithm.

18. The system of claim 11, wherein the labeling model is configured to generate the uncertainty metric based on a number of language models from the plurality of language models.

19. The system of claim 11, wherein:

the estimated ground truth value is a value extracted by a largest number of language models of the plurality of language models; and the uncertainty metric is related to the largest number of language models that extracted the estimated ground truth value.

20. A system for labeling ground truth values for data fields within submission content, the system comprising one or more processing circuits configured to:

prompt a plurality of language models to extract a value for a data field from the submission content for a plurality of labeled submissions having a ground truth value for the data field;

generate a data structure comprising an entry for each combination of a submission from the plurality of labeled submissions and a language model of the plurality of language models, the entry indicating whether the value for the data field extracted by the language model from the submission content of the submission matches the ground truth value corresponding to the data field for the submission;

generate a labeling model configured to, for a corresponding submission, generate:

an estimated ground truth value based on the value for the data field extracted for the corresponding submission by a largest number of language models; and an uncertainty metric for the corresponding submission based on the largest number of language models;

generate the estimated ground truth value and the uncertainty metric for each training submission of a plurality of unlabeled training submissions using the labeling model;

responsive to the uncertainty metric for a training submission satisfying an uncertainty threshold, generate an indication to validate the estimated ground truth value for the training submission;

generate an extraction training set comprising the estimated ground truth value corresponding to each training submission of the plurality of unlabeled training submissions, the plurality of unlabeled training submissions, the plurality of labeled submissions, and the ground truth value corresponding to each of the plurality of labeled submissions; and adjust an extraction prompt to improve a score indicating a fraction of submissions of the extraction training set for which the extraction prompt causes an extraction language model to extract the value for the submission of the extraction training set matching the ground truth value corresponding to the submission of the extraction training set.

\* \* \* \* \*